US012758991B2

(12) United States Patent
Tschan

(10) Patent No.: US 12,758,991 B2
(45) Date of Patent: Oct. 13, 2026

(54) PAINT SPRAY GUN WITH TWO-PART MATERIAL NEEDLE, MATERIAL NEEDLE, FRONT NEEDLE OF A MATERIAL NEEDLE, AND METHOD FOR EXCHANGING A FRONT NEEDLE

(71) Applicant: SATA GmbH & Co. KG, Kornwestheim (DE)

(72) Inventor: Alexander Tschan, Kornwestheim (DE)

(73) Assignee: SATA GmbH & Co. KG, Kornwestheim (DE)

(*) Notice: Subject to any disclaimer, the term of this patent is extended or adjusted under 35 U.S.C. 154(b) by 247 days.

(21) Appl. No.: 18/692,861

(22) PCT Filed: Sep. 15, 2022

(86) PCT No.: PCT/EP2022/075666
§ 371 (c)(1),
(2) Date: Mar. 18, 2024

(87) PCT Pub. No.: WO2023/041658
PCT Pub. Date: Mar. 23, 2023

(65) Prior Publication Data

US 2024/0390922 A1 Nov. 28, 2024

(30) Foreign Application Priority Data

Sep. 17, 2021 (DE) ..................... 10 2021 124 139.1

(51) Int. Cl.
*B05B 1/30* (2006.01)
*B05B 7/08* (2006.01)
*B05B 7/24* (2006.01)

(52) U.S. Cl.
CPC .......... *B05B 1/3046* (2013.01); *B05B 7/0815* (2013.01); *B05B 7/2424* (2013.01); *B05B 7/2489* (2013.01)

(58) Field of Classification Search
CPC ... B05B 1/3046; B05B 7/0815; B05B 7/2424; B05B 7/2489
(Continued)

(56) References Cited

U.S. PATENT DOCUMENTS

| | | | |
|---|---|---|---|
| 40,433 | A | 10/1863 | Sees |
| 327,260 | A | 9/1885 | Hart |

(Continued)

FOREIGN PATENT DOCUMENTS

| | | |
|---|---|---|
| AT | 153883 | 6/1997 |
| AT | 163577 | 3/1998 |

(Continued)

OTHER PUBLICATIONS

Office Action dated Nov. 24, 2021 for U.S. Appl. No. 16/524,740.
(Continued)

*Primary Examiner* — Steven J Ganey
(74) *Attorney, Agent, or Firm* — Fleit Intellectual Property Law; Paul D. Bianco

(57) ABSTRACT

A paint spray gun has a material nozzle for dispensing a coating material; and a material needle for controlling the quantity of dispensed coating material via the material nozzle. The material needle is axially movably mounted in a channel that extends in the axial direction, and the material needle includes front and rear needle releasably connected via a releasable connection in the form of a quick-acting connection. The material needle has at least one contact surface in a region of the front needle which is in an operating state arranged in a material-carrying region of the surrounding channel and/or has at least one contact surface which is arranged in the region of the connection between the front and rear needles. The contact surface in the
(Continued)

operating state rests against a wall of the surrounding channel with the contact surface and the channel forming a sliding bearing.

43 Claims, 17 Drawing Sheets

(58) Field of Classification Search
USPC .... 239/290, 291, 296, 407, 417.3, 525, 526, 239/600
See application file for complete search history.

(56) References Cited

U.S. PATENT DOCUMENTS 459,432 A 9/1891 Anderson
459,433 A 9/1891 Avery
548,816 A 10/1895 Paul
552,213 A 12/1895 Troy
552,715 A 1/1896 Lugrin
563,505 A 7/1896 McCornack
574,880 A 1/1897 Collison
581,107 A 4/1897 Emery
644,803 A 3/1900 Justi
672,012 A 4/1901 Ruper
1,610,190 A 12/1926 Anderson
1,662,496 A 3/1928 Forsgard
1,703,383 A 2/1929 Birkenmaier
1,703,384 A 2/1929 Birkenmaier
1,711,221 A 4/1929 Blakeslee
1,751,787 A 3/1930 Binks
1,889,201 A 11/1932 Holveck
1,958,730 A 5/1934 Tracy
2,004,303 A 6/1935 Wahlin
2,008,381 A 7/1935 Beeg
D99,473 S 4/1936 Bramsen
2,049,700 A 8/1936 Gustafson
2,051,210 A 8/1936 Gustafsson
2,070,696 A 2/1937 Tracy
2,116,036 A 5/1938 Money
2,125,445 A 8/1938 Holveck
2,198,441 A 4/1940 Mollart
2,204,599 A 6/1940 Jenkins
2,269,057 A 1/1942 Jenkins
D133,223 S 7/1942 Tammen
2,356,865 A 8/1944 Mason
2,416,856 A 3/1947 Thomsen
2,416,923 A 3/1947 Jenkins
2,470,718 A 5/1949 Peeps
2,533,953 A 12/1950 Peeps
2,557,593 A 6/1951 Bjorkman
2,557,606 A 6/1951 Liedberg
2,559,091 A 7/1951 Reasenberg
2,578,402 A 12/1951 Dalrymple
2,609,961 A 9/1952 Sapien
2,612,899 A 10/1952 Earle
2,626,188 A 1/1953 Dalrymple
2,646,314 A 7/1953 Peeps
2,721,004 A 10/1955 Schultz
2,743,963 A 5/1956 Peeps
2,844,267 A 7/1958 Petriccione
2,886,252 A 5/1959 Ehrensperger
3,090,530 A 5/1963 Peeps
D196,477 S 10/1963 Kelly
3,159,472 A 12/1964 Revell
D200,594 S 3/1965 Sass
3,240,398 A 3/1966 Dalton, Jr.
D204,306 S 4/1966 Hamm
D205,760 S 9/1966 Hocult et al.
3,327,949 A 6/1967 Eull
D208,903 S 10/1967 Zadron et al.
3,344,992 A 10/1967 Norris
D209,792 S 1/1968 Clark
3,381,845 A 5/1968 MacDonald
3,417,650 A 12/1968 Varrin
3,420,106 A 1/1969 Keller et al.
3,435,683 A 4/1969 Keller et al.
3,463,363 A 8/1969 Zelna
3,482,781 A 12/1969 Sharpe
D217,928 S 6/1970 Falske
3,524,589 A 8/1970 Pelton, Jr.
3,527,372 A 9/1970 Manning
3,583,632 A 6/1971 Schaffer
3,622,078 A 11/1971 Gronert
3,645,562 A 2/1972 Fandetti et al.
3,656,493 A 4/1972 Black et al.
3,714,967 A 2/1973 Zupan et al.
3,746,253 A * 7/1973 Walberg .................... B05B 5/03 239/291
3,747,850 A 7/1973 Hastings et al.
3,771,539 A 11/1973 De Santis
3,840,143 A 10/1974 Davis et al.
3,848,807 A 11/1974 Partida
3,857,511 A 12/1974 Govindan
3,870,223 A 3/1975 Wyant
3,873,023 A 3/1975 Moss et al.
3,938,739 A 2/1976 Bertilsson et al.
4,000,915 A 1/1977 Strom
D245,048 S 7/1977 Pool
4,105,164 A 8/1978 Lau
D252,097 S 6/1979 Probst et al.
4,160,525 A 7/1979 Wagner
4,162,042 A 7/1979 Mommsen
4,171,091 A 10/1979 van Hardeveld et al.
4,210,263 A 7/1980 Bos
4,273,293 A 6/1981 Hastings
4,278,276 A 7/1981 Ekman
4,411,387 A 10/1983 Stern et al.
4,478,370 A 10/1984 Hastings
D276,472 S 11/1984 Harrison
D278,543 S 4/1985 Gintz
4,545,536 A 10/1985 Avidon
4,562,965 A 1/1986 Ihmels et al.
4,572,437 A 2/1986 Huber et al.
4,580,035 A 4/1986 Luscher
4,585,168 A 4/1986 Even et al.
4,614,300 A 9/1986 Falcoff
4,643,330 A 2/1987 Kennedy
4,653,661 A 3/1987 Buchner et al.
4,667,878 A 5/1987 Behr
4,713,257 A 12/1987 Luttermoeller
D293,950 S 1/1988 Ogden et al.
4,730,753 A 3/1988 Grime
4,767,057 A 8/1988 Degli
D298,372 S 11/1988 Taylor, Jr.
4,784,184 A 11/1988 Gates
4,806,736 A 2/1989 Schirico
4,826,539 A 5/1989 Harpold
4,832,232 A 5/1989 Broccoli
4,844,347 A 7/1989 Konhäuser
4,854,504 A 8/1989 Hedger, Jr. et al.
4,863,781 A 9/1989 Kronzer
4,877,144 A 10/1989 Thanisch
D305,057 S 12/1989 Morgan
4,887,747 A 12/1989 Ostrowsky et al.
4,901,761 A 2/1990 Taylor
4,906,151 A 3/1990 Kubis
4,917,300 A 4/1990 Gloviak et al.
4,946,075 A 8/1990 Lundback
4,964,361 A 10/1990 Aebersold
4,967,600 A 11/1990 Keller
4,969,603 A 11/1990 Norman
4,973,184 A 11/1990 La Salle
D313,064 S 12/1990 Lind
D314,421 S 2/1991 Tajima et al.
D314,588 S 2/1991 Denham
4,989,787 A 2/1991 Nikkel et al.
5,020,700 A 6/1991 Krzywdziak et al.
D318,877 S 8/1991 Miranda et al.
5,042,840 A 8/1991 Rieple et al.
D321,597 S 11/1991 Cerny
5,064,119 A 11/1991 Mellette
5,071,074 A 12/1991 Lind
5,074,334 A 12/1991 Onodera
5,078,323 A 1/1992 Frank

(56) References Cited

U.S. PATENT DOCUMENTS

| | | | |
|---|---|---|---|
| 5,078,325 | A | 1/1992 | Waryu |
| 5,080,285 | A | 1/1992 | Toth |
| 5,088,648 | A | 2/1992 | Schmon |
| 5,090,623 | A | 2/1992 | Burns et al. |
| 5,102,045 | A | 4/1992 | Diana |
| 5,119,992 | A | 6/1992 | Grime |
| 5,125,391 | A | 6/1992 | Srivastava et al. |
| 5,135,124 | A | 8/1992 | Wobser |
| 5,143,102 | A | 9/1992 | Blaul |
| 5,165,605 | A | 11/1992 | Morita |
| 5,170,941 | A | 12/1992 | Morita et al. |
| 5,190,219 | A | 3/1993 | Copp, Jr. |
| 5,191,797 | A | 3/1993 | Smith |
| 5,209,405 | A | 5/1993 | Robinson et al. |
| 5,228,488 | A | 7/1993 | Fletcher |
| 5,232,299 | A | 8/1993 | Hiss |
| 5,236,128 | A | 8/1993 | Morita et al. |
| 5,249,746 | A | 10/1993 | Kaneko et al. |
| D341,186 | S | 11/1993 | Albers |
| 5,289,974 | A | 3/1994 | Grime et al. |
| 5,322,221 | A | 6/1994 | Anderson |
| 5,325,473 | A | 6/1994 | Monroe et al. |
| 5,332,156 | A | 7/1994 | Wheeler |
| 5,333,506 | A | 8/1994 | Smith et al. |
| 5,333,908 | A | 8/1994 | Dorney et al. |
| 5,344,078 | A | 9/1994 | Fritz et al. |
| 5,367,148 | A | 11/1994 | Storch et al. |
| D353,836 | S | 12/1994 | Carvelli et al. |
| 5,381,962 | A | 1/1995 | Teague |
| 5,435,491 | A | 7/1995 | Sakuma |
| 5,443,642 | A | 8/1995 | Bienduga |
| 5,456,414 | A | 10/1995 | Burns |
| D365,962 | S | 1/1996 | Gagnon et al. |
| 5,503,439 | A | 4/1996 | LaJeunesse et al. |
| 5,529,245 | A | 6/1996 | Brown |
| 5,533,674 | A | 7/1996 | Feyrer et al. |
| 5,540,385 | A | 7/1996 | Garlick |
| 5,540,386 | A | 7/1996 | Roman |
| D376,637 | S | 12/1996 | Kieffer |
| 5,582,350 | A | 12/1996 | Kosmyna et al. |
| 5,584,899 | A | 12/1996 | Shorts |
| 5,588,562 | A | 12/1996 | Sander et al. |
| 5,592,597 | A | 1/1997 | Kiss |
| 5,609,302 | A | 3/1997 | Smith |
| 5,613,637 | A | 3/1997 | Schmon |
| D380,301 | S | 7/1997 | Kogutt |
| 5,655,714 | A | 8/1997 | Kieffer et al. |
| 5,662,444 | A | 9/1997 | Schmidt, Jr. |
| 5,667,143 | A | 9/1997 | Sebion et al. |
| 5,695,125 | A | 12/1997 | Kumar |
| 5,704,381 | A | 1/1998 | Millan et al. |
| 5,718,767 | A | 2/1998 | Crum et al. |
| D391,403 | S | 3/1998 | Josephs |
| 5,725,161 | A | 3/1998 | Hartle |
| RE35,769 | E | 4/1998 | Grime et al. |
| 5,755,363 | A | 5/1998 | Gantner et al. |
| 5,762,228 | A | 6/1998 | Morgan et al. |
| 5,803,360 | A | 9/1998 | Spitznagel |
| 5,816,501 | A | 10/1998 | LoPresti et al. |
| 5,829,682 | A | 11/1998 | Haruch |
| 5,836,517 | A | 11/1998 | Burns et al. |
| D402,820 | S | 12/1998 | Morison et al. |
| 5,843,515 | A | 12/1998 | Crum et al. |
| 5,853,014 | A | 12/1998 | Rosenauer |
| D405,503 | S | 2/1999 | Edo |
| D405,603 | S | 2/1999 | Takeshi |
| 5,874,680 | A | 2/1999 | Moore |
| 5,884,006 | A | 3/1999 | Frohlich et al. |
| D409,719 | S | 5/1999 | Kaneko |
| D412,965 | S | 8/1999 | Kieffer |
| 5,941,461 | A | 8/1999 | Akin et al. |
| 5,951,190 | A | 9/1999 | Wilson |
| 5,951,296 | A | 9/1999 | Klein |
| 5,954,268 | A | 9/1999 | Joshi et al. |
| D414,636 | S | 10/1999 | Wiese |
| 5,979,797 | A | 11/1999 | Castellano |
| 5,992,763 | A | 11/1999 | Smith et al. |
| 6,006,930 | A | 12/1999 | Dreyer et al. |
| 6,010,082 | A | 1/2000 | Peterson |
| 6,017,394 | A | 1/2000 | Crum et al. |
| 6,019,294 | A | 2/2000 | Anderson |
| 6,036,109 | A | 3/2000 | DeYoung |
| 6,039,218 | A | 3/2000 | Beck |
| 6,050,499 | A | 4/2000 | Takayama |
| 6,053,429 | A | 4/2000 | Chang |
| 6,056,213 | A | 5/2000 | Ruta et al. |
| 6,056,215 | A | 5/2000 | Hansinger |
| 6,089,471 | A | 7/2000 | Scholl |
| 6,089,607 | A | 7/2000 | Keeney et al. |
| 6,091,053 | A | 7/2000 | Aonuma |
| 6,092,740 | A | 7/2000 | Liu |
| 6,105,881 | A | 8/2000 | Kitajima |
| 6,132,511 | A | 10/2000 | Crum et al. |
| D435,379 | S | 12/2000 | Nguyen |
| 6,230,986 | B1 | 5/2001 | Vacher et al. |
| 6,250,567 | B1 | 6/2001 | Lewis et al. |
| 6,267,301 | B1 | 7/2001 | Haruch |
| 6,276,616 | B1 | 8/2001 | Jenkins |
| D448,451 | S | 9/2001 | Turnbull et al. |
| 6,308,991 | B1 | 10/2001 | Royer |
| D457,599 | S | 5/2002 | Karwoski et al. |
| D459,432 | S | 6/2002 | Schmon |
| D459,433 | S | 6/2002 | Schmon |
| 6,402,058 | B2 | 6/2002 | Kaneko et al. |
| 6,402,062 | B1 | 6/2002 | Bending et al. |
| 6,431,466 | B1 | 8/2002 | Kitajima |
| 6,435,426 | B1 | 8/2002 | Copp, Jr. |
| 6,442,276 | B1 | 8/2002 | Doljack |
| 6,450,422 | B1 | 9/2002 | Maggio |
| 6,494,387 | B1 | 12/2002 | Kaneko |
| 6,536,684 | B1 | 3/2003 | Wei |
| 6,536,687 | B1 | 3/2003 | Navis et al. |
| D472,730 | S | 4/2003 | Sparkowski |
| 6,540,114 | B1 | 4/2003 | Popovich et al. |
| 6,543,632 | B1 | 4/2003 | McIntyre et al. |
| 6,547,160 | B1 | 4/2003 | Huang |
| 6,547,884 | B1 | 4/2003 | Crum et al. |
| 6,553,712 | B1 | 4/2003 | Majerowski et al. |
| 6,554,009 | B1 | 4/2003 | Beijbom et al. |
| D474,528 | S | 5/2003 | Huang |
| 6,585,173 | B2 | 7/2003 | Schmon et al. |
| 6,595,441 | B2 | 7/2003 | Petrie et al. |
| 6,612,506 | B1 | 9/2003 | Huang |
| 6,626,382 | B1 | 9/2003 | Liu |
| 6,626,383 | B1 | 9/2003 | Campbell |
| 6,647,997 | B2 | 11/2003 | Mohn |
| 6,661,438 | B1 | 12/2003 | Shiraishi et al. |
| D485,685 | S | 1/2004 | Zupkofska et al. |
| 6,675,845 | B2 | 1/2004 | Volpenheim et al. |
| 6,692,118 | B2 | 2/2004 | Michele et al. |
| 6,712,292 | B1 | 3/2004 | Gosis et al. |
| 6,717,584 | B2 | 4/2004 | Kulczycka |
| 6,732,751 | B2 | 5/2004 | Chiang |
| 6,763,964 | B1 | 7/2004 | Hurlbut et al. |
| 6,766,763 | B2 | 7/2004 | Crum et al. |
| 6,786,345 | B2 | 9/2004 | Richards |
| 6,796,514 | B1 | 9/2004 | Schwartz |
| 6,801,211 | B2 | 10/2004 | Forsline et al. |
| 6,820,824 | B1 | 11/2004 | Joseph et al. |
| 6,843,390 | B1 | 1/2005 | Bristor |
| 6,845,924 | B2 | 1/2005 | Schmon |
| 6,855,173 | B2 | 2/2005 | Ehrnsperger et al. |
| 6,863,310 | B1 | 3/2005 | Petkovsek |
| 6,863,920 | B2 | 3/2005 | Crum et al. |
| 6,874,656 | B2 | 4/2005 | Rohr et al. |
| 6,874,664 | B1 | 4/2005 | Montgomery |
| 6,874,708 | B2 | 4/2005 | Reetz, III |
| 6,877,677 | B2 | 4/2005 | Schmon et al. |
| 6,929,019 | B2 | 8/2005 | Weinmann et al. |
| 6,945,429 | B2 | 9/2005 | Gosis et al. |
| 6,955,180 | B2 | 10/2005 | Kocherlakota et al. |
| 6,962,432 | B2 | 11/2005 | Hofeldt |
| 6,963,331 | B1 | 11/2005 | Kobayashi et al. |
| 7,017,838 | B2 | 3/2006 | Schmon |

(56) References Cited

U.S. PATENT DOCUMENTS

| | | | |
|---|---|---|---|
| 7,018,154 | B2 | 3/2006 | Schmon |
| D519,687 | S | 4/2006 | Zahav |
| 7,032,839 | B2 | 4/2006 | Blette et al. |
| 7,036,752 | B1 | 5/2006 | Hsiang |
| 7,083,119 | B2 | 8/2006 | Bouic et al. |
| 7,090,148 | B2 | 8/2006 | Petrie et al. |
| 7,097,118 | B1 | 8/2006 | Huang |
| D528,192 | S | 9/2006 | Nicholson |
| 7,106,343 | B1 | 9/2006 | Hickman |
| 7,165,732 | B2 | 1/2007 | Kosmyna et al. |
| 7,172,139 | B2 | 2/2007 | Bouic et al. |
| 7,175,110 | B2 | 2/2007 | Vicentini |
| 7,182,213 | B2 | 2/2007 | King |
| D538,050 | S | 3/2007 | Tardif |
| D538,493 | S | 3/2007 | Zimmerle et al. |
| D538,886 | S | 3/2007 | Huang |
| 7,194,829 | B2 | 3/2007 | Boire et al. |
| D541,053 | S | 4/2007 | Sanders |
| D541,088 | S | 4/2007 | Nesci |
| 7,201,336 | B2 | 4/2007 | Blette |
| 7,216,813 | B2 | 5/2007 | Rogers |
| D545,943 | S | 7/2007 | Rodgers et al. |
| 7,246,713 | B2 | 7/2007 | King |
| 7,249,519 | B2 | 7/2007 | Rogers |
| D548,816 | S | 8/2007 | Schmon |
| 7,255,293 | B2 | 8/2007 | Dodd |
| 7,264,131 | B2 | 9/2007 | Tsutsumi et al. |
| D552,213 | S | 10/2007 | Schmon |
| D552,715 | S | 10/2007 | Schmon |
| D554,703 | S | 11/2007 | Josephson |
| 7,328,855 | B2 | 2/2008 | Chatron et al. |
| D563,505 | S | 3/2008 | Schmon |
| 7,374,111 | B2 | 5/2008 | Joseph et al. |
| D570,448 | S | 6/2008 | Wang |
| D571,463 | S | 6/2008 | Chesnin |
| 7,384,004 | B2 | 6/2008 | Rogers |
| 7,389,945 | B2 | 6/2008 | Huang |
| RE40,433 | E | 7/2008 | Schmon |
| D573,227 | S | 7/2008 | Mirazita et al. |
| D574,926 | S | 8/2008 | Huang |
| D574,927 | S | 8/2008 | Larsen |
| D575,374 | S | 8/2008 | Huang |
| 7,410,106 | B2 | 8/2008 | Escoto, Jr. et al. |
| 7,416,140 | B2 | 8/2008 | Camilleri et al. |
| 7,422,164 | B2 | 9/2008 | Matsumoto |
| D579,213 | S | 10/2008 | Aipa |
| D581,107 | S | 11/2008 | Schmon |
| D581,483 | S | 11/2008 | Bass et al. |
| D583,013 | S | 12/2008 | Wang |
| 7,458,612 | B1 | 12/2008 | Bennett |
| 7,472,840 | B2 | 1/2009 | Gregory |
| D588,231 | S | 3/2009 | Pellin |
| 7,533,678 | B2 | 5/2009 | Rosa |
| 7,540,434 | B2 | 6/2009 | Gohring et al. |
| 7,542,032 | B2 | 6/2009 | Kruse |
| 7,568,638 | B2 | 8/2009 | Gehrung |
| D604,394 | S | 11/2009 | Wang |
| 7,614,571 | B2 | 11/2009 | Camilleri et al. |
| D607,086 | S | 12/2009 | Kosaka |
| 7,624,869 | B2 | 12/2009 | Primer |
| D607,972 | S | 1/2010 | Wang |
| D608,858 | S | 1/2010 | Baltz et al. |
| D613,820 | S | 4/2010 | Chou |
| D614,731 | S | 4/2010 | Wang |
| 7,694,893 | B2 | 4/2010 | Zittel et al. |
| 7,694,896 | B2 | 4/2010 | Turnbull et al. |
| D615,586 | S | 5/2010 | Kudimi |
| D616,022 | S | 5/2010 | Kudimi |
| D616,527 | S | 5/2010 | Anderson et al. |
| 7,765,876 | B1 | 8/2010 | Chen |
| D624,668 | S | 9/2010 | Noppe |
| 7,810,744 | B2 | 10/2010 | Schmon et al. |
| 7,819,341 | B2 | 10/2010 | Schmon et al. |
| D627,039 | S | 11/2010 | Yu |
| D627,432 | S | 11/2010 | Escoto et al. |
| 7,823,806 | B2 | 11/2010 | Schmon |
| D629,623 | S | 12/2010 | Lampe |
| 7,856,940 | B2 | 12/2010 | Wendler |
| 7,913,938 | B2 | 3/2011 | Cooper |
| 7,922,107 | B2 | 4/2011 | Fox |
| D637,269 | S | 5/2011 | Wang |
| D638,121 | S | 5/2011 | Villasana |
| D639,863 | S | 6/2011 | Langan |
| D641,067 | S | 7/2011 | Wang |
| D644,716 | S | 9/2011 | Gehrung |
| D644,803 | S | 9/2011 | Schmon |
| D645,094 | S | 9/2011 | Langan |
| 8,042,402 | B2 | 10/2011 | Brown et al. |
| D649,196 | S | 11/2011 | Langan |
| 8,052,071 | B2 | 11/2011 | Kruse |
| D655,347 | S | 3/2012 | Gehrung |
| 8,127,963 | B2 | 3/2012 | Gerson et al. |
| D657,276 | S | 4/2012 | Brose |
| D661,492 | S | 6/2012 | Ranschau |
| D661,742 | S | 6/2012 | Clark |
| D663,960 | S | 7/2012 | Jeronimo |
| 8,225,892 | B2 | 7/2012 | Ben-Tzvi |
| D664,773 | S | 8/2012 | Papin |
| 8,240,579 | B1 | 8/2012 | Bennett |
| 8,297,536 | B2 | 10/2012 | Ruda |
| D670,085 | S | 11/2012 | Brookman et al. |
| 8,308,086 | B2 | 11/2012 | Micheli |
| D671,988 | S | 12/2012 | Leipold |
| D672,012 | S | 12/2012 | Brose et al. |
| D674,880 | S | 1/2013 | Schmon |
| 8,352,744 | B2 | 1/2013 | Kruse |
| 8,360,345 | B2 | 1/2013 | Micheli |
| D681,162 | S | 4/2013 | Kruse |
| 8,444,067 | B2 | 5/2013 | Schmon et al. |
| 8,454,759 | B2 | 6/2013 | Selsvik |
| 8,481,124 | B2 | 7/2013 | Nolte et al. |
| D689,590 | S | 9/2013 | Brose |
| D689,593 | S | 9/2013 | Schmon |
| D690,799 | S | 10/2013 | Maier |
| D692,530 | S | 10/2013 | Gehrung |
| D692,532 | S | 10/2013 | Li et al. |
| 8,616,434 | B2 | 12/2013 | Wilen |
| D697,584 | S | 1/2014 | Schmon |
| D698,008 | S | 1/2014 | Schmon et al. |
| 8,626,674 | B2 | 1/2014 | Whitehouse |
| 8,642,131 | B2 | 2/2014 | Nolte |
| D703,293 | S | 4/2014 | Price |
| 8,690,083 | B2 | 4/2014 | Drozd |
| D704,300 | S | 5/2014 | Li et al. |
| 8,757,182 | B2 | 6/2014 | Schmon |
| 8,807,460 | B2 | 8/2014 | Charpie et al. |
| 8,857,732 | B2 | 10/2014 | Brose |
| 8,870,097 | B2 | 10/2014 | Micheli |
| D720,015 | S | 12/2014 | Kruse |
| D720,041 | S | 12/2014 | Robinson |
| 8,899,501 | B2 | 12/2014 | Fox et al. |
| D721,785 | S | 1/2015 | Gehrung |
| 8,925,836 | B2 | 1/2015 | Dettlaff |
| 8,926,836 | B2 | 1/2015 | Dettlaff |
| D726,982 | S | 4/2015 | Campelli |
| D733,369 | S | 6/2015 | Tschan |
| D733,453 | S | 7/2015 | Tschan |
| D734,428 | S | 7/2015 | Wang |
| D734,429 | S | 7/2015 | Wang |
| D734,571 | S | 7/2015 | Tschan |
| 9,073,068 | B2 | 7/2015 | Krayer et al. |
| D737,126 | S | 8/2015 | Tschan |
| D740,393 | S | 10/2015 | Gehrung |
| D745,636 | S | 12/2015 | Lin |
| 9,220,853 | B2 | 12/2015 | Vogt |
| D757,216 | S | 5/2016 | Gherung |
| 9,333,519 | B2 | 5/2016 | Brose |
| D758,533 | S | 6/2016 | Dettlaff |
| D758,537 | S | 6/2016 | Gehrung |
| 9,433,953 | B2 | 9/2016 | Ghesla |
| D768,820 | S | 10/2016 | Binz |
| D770,593 | S | 11/2016 | Gehrung |
| 9,498,788 | B2 | 11/2016 | Kosaka |
| D773,609 | S | 12/2016 | Morita |

(56) References Cited

U.S. PATENT DOCUMENTS 9,533,317 B2 1/2017 Gehrung et al.
D792,557 S 7/2017 Wang
D794,756 S 8/2017 Wang
9,782,784 B2 10/2017 Schmon et al.
D803,354 S 11/2017 Negri
9,878,336 B2 1/2018 Gehrung
9,878,340 B2 1/2018 Schmon et al.
D812,719 S 3/2018 Kosaka
D820,389 S 6/2018 Gehrung
D830,506 S 10/2018 Gehrung
D831,792 S 10/2018 Gehrung
D835,235 S 12/2018 Gehrung et al.
D839,386 S 1/2019 Ghorbani
10,189,037 B2 1/2019 Schmon et al.
10,247,313 B2 4/2019 Chien
D861,130 S 9/2019 Caris
10,464,076 B2 11/2019 Kruse
10,471,449 B2 11/2019 Gehrung
D877,294 S 3/2020 Johnston
D888,196 S 6/2020 Okajima
10,702,879 B2 7/2020 Gehrung
10,940,498 B2 3/2021 Fideler
11,000,872 B2 5/2021 Speck
D927,645 S 8/2021 Davies
D929,539 S 8/2021 Stech
D929,838 S 9/2021 Tschan
D934,383 S 10/2021 Stech
11,141,747 B2 10/2021 Schmon
D937,385 S 11/2021 Takeshita
D943,061 S 2/2022 Mcintyre, II
D950,679 S 5/2022 Wu
D968,568 S 11/2022 Shih
D1,004,055 S 11/2023 Chen
11,865,558 B2 1/2024 Volk
2001/0004996 A1 6/2001 Schmon
2001/0040192 A1 11/2001 Kaneko et al.
2002/0092928 A1 7/2002 Conroy
2002/0121135 A1 9/2002 Rediniotis
2002/0134861 A1 9/2002 Petrie et al.
2002/0148501 A1 10/2002 Shish
2002/0170978 A1 11/2002 Mohn
2003/0006322 A1 1/2003 Hartle et al.
2003/0025000 A1 2/2003 Schmon
2003/0066218 A1 4/2003 Schweikert
2003/0121476 A1 7/2003 McIntyre et al.
2003/0127046 A1 7/2003 Zehner et al.
2003/0164408 A1 9/2003 Schmon
2003/0173419 A1 9/2003 Huang
2003/0177979 A1 9/2003 Crum et al.
2003/0189105 A1 10/2003 Schmon
2003/0209568 A1 11/2003 Douglas et al.
2003/0213857 A1 11/2003 Schmon et al.
2003/0218596 A1 11/2003 Eschler
2003/0230636 A1 12/2003 Rogers
2004/0046051 A1 3/2004 Santa Cruz et al.
2004/0050432 A1 3/2004 Breda
2004/0104194 A1 6/2004 Dennison
2004/0129738 A1 7/2004 Stukas
2004/0140373 A1 7/2004 Joseph et al.
2004/0155063 A1 8/2004 Hofeldt
2004/0159720 A1 8/2004 Komornicki
2004/0177890 A1 9/2004 Weinmann
2004/0191406 A1 9/2004 Crum et al.
2004/0195382 A1 10/2004 Anderson
2004/0217201 A1 11/2004 Ruda
2004/0233223 A1 11/2004 Schkolne et al.
2004/0245208 A1 12/2004 Dennison
2005/0001060 A1 1/2005 Robinson
2005/0056613 A1 3/2005 King
2005/0082249 A1 4/2005 King
2005/0127201 A1 6/2005 Matsumoto
2005/0145723 A1 7/2005 Blette et al.
2005/0145724 A1 7/2005 Blette et al.
2005/0161525 A1 7/2005 Johansson
2005/0178854 A1 8/2005 Dodd
2005/0189445 A1 9/2005 Hartle et al.
2005/0215284 A1 9/2005 Su
2005/0218246 A1 10/2005 Chatron
2005/0220943 A1 10/2005 Abrams et al.
2005/0242207 A1 11/2005 Tejeda
2005/0248148 A1 11/2005 Schenck et al.
2005/0252993 A1 11/2005 Rogers
2005/0252994 A1 11/2005 Rogers
2005/0268949 A1 12/2005 Rosa
2005/0284963 A1 12/2005 Reedy
2006/0000927 A1 1/2006 Ruda
2006/0007123 A1 1/2006 Wilson et al.
2006/0048803 A1 3/2006 Jessup et al.
2006/0081060 A1 4/2006 Forster
2006/0108449 A1 5/2006 Sodemann
2006/0113409 A1 6/2006 Camilleri et al.
2006/0118661 A1 6/2006 Hartle
2006/0131151 A1 6/2006 Marchand
2006/0171771 A1 8/2006 Kruse
2006/0192377 A1 8/2006 Bauer et al.
2006/0196891 A1 9/2006 Gerson et al.
2007/0029788 A1 2/2007 Adler
2007/0055883 A1 3/2007 Kruse
2007/0131795 A1 6/2007 Abbate et al.
2007/0158349 A1 7/2007 Schmon et al.
2007/0205305 A1 9/2007 Vagedes
2007/0221754 A1 9/2007 Gehrung
2007/0228190 A1 10/2007 Tanner
2007/0252378 A1 11/2007 Chambers
2007/0262169 A1 11/2007 Wang
2007/0262172 A1 11/2007 Huffman
2008/0011879 A1 1/2008 Gerson et al.
2008/0019789 A1 1/2008 Dunaway et al.
2008/0029619 A1 2/2008 Gohring et al.
2008/0128533 A1 6/2008 Gehrung
2008/0179763 A1 7/2008 Schmon et al.
2008/0251607 A1 10/2008 Krayer
2008/0251977 A1 10/2008 Naruse et al.
2008/0264892 A1 10/2008 Nozawa
2008/0272213 A1 11/2008 Ting
2008/0295410 A1 12/2008 Carey et al.
2009/0014557 A1 1/2009 Schmon et al.
2009/0026288 A1 1/2009 Shih
2009/0026290 A1 1/2009 Fox
2009/0045623 A1 2/2009 Schmon
2009/0072050 A1 3/2009 Ruda
2009/0078789 A1 3/2009 Kruse
2009/0078790 A1 3/2009 Camilleri et al.
2009/0143745 A1 6/2009 Langan et al.
2009/0152382 A1 6/2009 Charpie
2009/0179081 A1 7/2009 Charpie
2009/0183516 A1 7/2009 Appler et al.
2009/0235864 A1 9/2009 Khoury et al.
2009/0266915 A1 10/2009 Fedorov
2009/0302133 A1 12/2009 Micheli
2010/0021646 A1 1/2010 Nolte et al.
2010/0059533 A1 3/2010 Unger et al.
2010/0084493 A1 4/2010 Troudt
2010/0108783 A1 5/2010 Joseph et al.
2010/0126541 A1 5/2010 Schmon
2010/0163649 A1 7/2010 Bass et al.
2010/0206963 A1 8/2010 Huang
2010/0270390 A1 10/2010 Reitz
2010/0270400 A1 10/2010 Evar et al.
2011/0024524 A1 2/2011 Fox
2011/0121103 A1 5/2011 Carleton et al.
2011/0125607 A1 5/2011 Wilen
2011/0127767 A1 6/2011 Wicks et al.
2011/0168811 A1 7/2011 Fox et al.
2011/0174901 A1 7/2011 Dettlaff et al.
2012/0012671 A1 1/2012 Brose et al.
2012/0097762 A1 4/2012 Gehrung et al.
2012/0097765 A1 4/2012 Drozd
2012/0132550 A1 5/2012 Gerson et al.
2012/0160935 A1 6/2012 Krayer et al.
2012/0187220 A1 7/2012 Micheli et al.
2013/0056556 A1 3/2013 Schmon et al.
2013/0074864 A1 3/2013 Nuzzo et al.
2013/0092760 A1 4/2013 Joseph

(56) References Cited

U.S. PATENT DOCUMENTS

| | | | |
|---|---|---|---|
| 2013/0266734 A1 | 10/2013 | Nolte et al. | |
| 2013/0320110 A1 | 12/2013 | Brose et al. | |
| 2013/0327850 A1 | 12/2013 | Joseph | |
| 2014/0034757 A1 | 2/2014 | Maaru | |
| 2014/0048627 A1 | 2/2014 | Schmon et al. | |
| 2014/0059905 A1 | 3/2014 | Raming | |
| 2014/0145003 A1 | 5/2014 | Schmon et al. | |
| 2014/0246516 A1* | 9/2014 | Huang | B05B 7/0815 239/375 |
| 2014/0263686 A1 | 9/2014 | Hedger | |
| 2014/0305962 A1 | 10/2014 | Tschan | |
| 2014/0339322 A1 | 11/2014 | Freers | |
| 2014/0346257 A1 | 11/2014 | Reetz, III et al. | |
| 2015/0108254 A1 | 4/2015 | Commette | |
| 2015/0165463 A1 | 6/2015 | Gehrung | |
| 2015/0231655 A1 | 8/2015 | Adams et al. | |
| 2015/0260600 A1 | 9/2015 | Hata | |
| 2016/0030960 A1 | 2/2016 | Gehrung | |
| 2016/0243567 A1 | 8/2016 | Brose | |
| 2017/0252771 A1 | 9/2017 | Young | |
| 2017/0304852 A1 | 10/2017 | Bierie | |
| 2018/0050355 A1 | 2/2018 | Delsard | |
| 2018/0050356 A1 | 2/2018 | Gehrung | |
| 2018/0050358 A1 | 2/2018 | Ruda | |
| 2018/0050361 A1 | 2/2018 | Gehrung | |
| 2018/0050362 A1 | 2/2018 | Gehrung et al. | |
| 2018/0111142 A1 | 4/2018 | Joaquim | |
| 2018/0133727 A1 | 5/2018 | Schmon et al. | |
| 2018/0200740 A1 | 7/2018 | Rossbach et al. | |
| 2018/0236465 A1 | 8/2018 | Krayer | |
| 2020/0038889 A1 | 2/2020 | Volk et al. | |
| 2020/0038892 A1 | 2/2020 | Volk | |
| 2021/0162438 A1 | 6/2021 | Zaki | |
| 2021/0379612 A1 | 12/2021 | Volk | |
| 2022/0048054 A1 | 2/2022 | Maier | |
| 2022/0080448 A1 | 3/2022 | Volk | |
| 2022/0193703 A1 | 6/2022 | Stech | |
| 2023/0087047 A1 | 3/2023 | Maier | |
| 2023/0107860 A1 | 4/2023 | Maier | |
| 2023/0149955 A1 | 5/2023 | Maier | |
| 2024/0408626 A1 | 12/2024 | Tschan | |

FOREIGN PATENT DOCUMENTS

| | | | |
|---|---|---|---|
| AT | 250467 | | 10/2003 |
| AT | 322645 | | 4/2006 |
| AT | 383910 | | 2/2008 |
| AT | 461752 | | 4/2010 |
| AT | 461753 | | 4/2010 |
| AT | 475488 | | 8/2010 |
| AU | 637187 | | 5/1993 |
| AU | 2002352235 | | 9/2003 |
| AU | 2004315547 | | 8/2005 |
| AU | 2005205899 | | 8/2005 |
| AU | 2011257605 | | 11/2012 |
| AU | 2011361295 | | 5/2013 |
| CA | 521511 | | 2/1956 |
| CA | 2126957 | | 1/1995 |
| CA | 2277096 | | 7/1998 |
| CA | 2445183 | | 10/2002 |
| CA | 2552390 | | 8/2005 |
| CA | 2555607 | | 8/2005 |
| CA | 2690112 | | 5/2009 |
| CA | 2797990 | | 12/2011 |
| CA | 2812684 | | 9/2012 |
| CA | 102917803 | | 2/2013 |
| CA | 2850401 | A1 | 5/2013 |
| CH | 200754 | A | 10/1938 |
| CH | 203 668 | | 6/1939 |
| CH | 523098 | A | 5/1972 |
| CH | 542104 | A | 9/1973 |
| CH | 676208 | | 12/1990 |
| CN | 2136077 | Y | 6/1993 |
| CN | 1738310 | A | 2/2006 |
| CN | 1802002 | | 1/2007 |
| CN | 1899704 | A | 1/2007 |
| CN | 1909970 | | 2/2007 |
| CN | 1909971 | | 2/2007 |
| CN | 1917960 | | 2/2007 |
| CN | 200954482 | | 10/2007 |
| CN | 101126316 | | 2/2008 |
| CN | 201064746 | Y | 5/2008 |
| CN | 100430150 | | 11/2008 |
| CN | 100455360 | | 1/2009 |
| CN | 101367066 | | 2/2009 |
| CN | 100478080 | | 4/2009 |
| CN | 101516523 | A | 8/2009 |
| CN | 101646500 | | 2/2010 |
| CN | 102211070 | | 4/2011 |
| CN | 102139249 | A | 8/2011 |
| CN | 102211069 | | 10/2011 |
| CN | 202667052 | U | 1/2013 |
| CN | 103 521 378 | A | 1/2014 |
| CN | 203508251 | U | 4/2014 |
| CN | 203737474 | U | 7/2014 |
| CN | 204074345 | U | 1/2015 |
| CN | 204294401 | U | 4/2015 |
| CN | 105377447 | A | 3/2016 |
| CN | 205966208 | U | 2/2017 |
| CN | 107427851 | A | 12/2017 |
| CN | 107666966 | A | 2/2018 |
| CN | 108223901 | A | 6/2018 |
| CN | 207493903 | U | 6/2018 |
| CN | 108438227 | A | 8/2018 |
| DE | 259621 | C | 5/1913 |
| DE | 460381 | | 5/1928 |
| DE | 510362 | | 10/1930 |
| DE | 611325 | C | 3/1935 |
| DE | 1425890 | | 11/1968 |
| DE | 2559036 | | 9/1976 |
| DE | 2653981 | | 6/1978 |
| DE | 2950341 | | 7/1980 |
| DE | 2926286 | A1 | 1/1981 |
| DE | 3016419 | | 11/1981 |
| DE | 8024829.9 | | 9/1982 |
| DE | 3111571 | A1 | 10/1982 |
| DE | 3238149 | A1 | 4/1984 |
| DE | 34 02 097 | | 8/1985 |
| DE | 3402945 | A1 | 8/1985 |
| DE | 3517122 | | 5/1986 |
| DE | 3505618 | | 8/1986 |
| DE | 3526819 | | 2/1987 |
| DE | 3016419 | C2 | 8/1987 |
| DE | 8702559 | | 10/1987 |
| DE | 3708472 | A1 | 10/1988 |
| DE | 8902223 | | 5/1989 |
| DE | 3742308 | | 6/1989 |
| DE | 8905681 | | 11/1989 |
| DE | G 90 01 265 | | 5/1990 |
| DE | 3906219 | | 8/1990 |
| DE | 4302911 | | 8/1993 |
| DE | 4208500 | A1 | 9/1993 |
| DE | 4230535 | | 3/1994 |
| DE | G 94 16 015.5 | U1 | 11/1994 |
| DE | 4321940 | | 1/1995 |
| DE | 69110099 | T2 | 2/1996 |
| DE | 69211891 | T2 | 10/1996 |
| DE | 19516485 | | 11/1996 |
| DE | 19727884 | | 2/1999 |
| DE | 69505433 | T2 | 4/1999 |
| DE | 19807973 | | 7/1999 |
| DE | 19824264 | | 12/1999 |
| DE | 19832990 | | 1/2000 |
| DE | 20000483 | | 8/2000 |
| DE | 10004105 | | 10/2000 |
| DE | 19958569 | | 2/2001 |
| DE | 199 41 362 | | 3/2001 |
| DE | 19945760 | | 3/2001 |
| DE | 10103221 | A1 | 8/2001 |
| DE | 10031857 | | 1/2002 |
| DE | 10031858 | | 1/2002 |
| DE | 20114257 | | 2/2002 |
| DE | 10058406 | | 6/2002 |

(56) References Cited

FOREIGN PATENT DOCUMENTS

| | | | |
|---|---|---|---|
| DE | 10135104 | | 9/2002 |
| DE | 10135104 | C1 | 9/2002 |
| DE | 10205831 | | 8/2003 |
| DE | 10311238 | | 10/2004 |
| DE | 10 2004 027 789 | | 2/2005 |
| DE | 29825120 | | 2/2005 |
| DE | 102004027789 | A1 | 2/2005 |
| DE | 69827994 | T2 | 4/2005 |
| DE | 20320781 | | 6/2005 |
| DE | 10 2004 014 646 | | 7/2005 |
| DE | 10 2004 003 438 | | 8/2005 |
| DE | 102004003439 | | 8/2005 |
| DE | 10 2004 007 733 | | 9/2005 |
| DE | 10 2004 021 298 | | 11/2005 |
| DE | 69928944 | T2 | 9/2006 |
| DE | 69535077 | T2 | 11/2006 |
| DE | 202007001031 | | 3/2007 |
| DE | 601 20 633 | T2 | 5/2007 |
| DE | 60200500 1173 | | 8/2007 |
| DE | 60206956 | T2 | 8/2008 |
| DE | 102007006547 | | 8/2008 |
| DE | 102007013628 | A1 | 9/2008 |
| DE | 102007039106 | | 2/2009 |
| DE | 102007052067 | | 5/2009 |
| DE | 10 2008 010 169 | A1 | 9/2009 |
| DE | 10 2009 020 194 | A1 | 11/2010 |
| DE | 20 2010 012 449 | U1 | 12/2010 |
| DE | 202010012449 | | 12/2010 |
| DE | 10 2009 032 399 | A1 | 1/2011 |
| DE | 102009053449 | | 2/2011 |
| DE | 102010060086 | | 4/2012 |
| DE | 10 2010 056 263 | A1 | 6/2012 |
| DE | 10 2011 100 806 | A1 | 11/2012 |
| DE | 102011106060 | | 1/2013 |
| DE | 20 2013 002 228 | U2 | 5/2013 |
| DE | 102011118120 | | 5/2013 |
| DE | 10 2011 120 717 | A1 | 6/2013 |
| DE | 112007001824 | B4 | 7/2013 |
| DE | 10 2012 013 464 | A1 | 11/2013 |
| DE | 10 2015 114202 | A1 | 1/2017 |
| DE | 10 2018 118737 | A1 | 2/2020 |
| DE | 102021124139 | A1 | 3/2023 |
| DE | 102021124140 | A1 | 3/2023 |
| DE | 102021124141 | A1 | 3/2023 |
| EM | 002066910-0001 | | 3/2013 |
| EM | 002066910-0002 | | 3/2013 |
| EM | 002066910-0003 | | 3/2013 |
| EM | 002066910-0004 | | 3/2013 |
| EM | 002066910-0005 | | 3/2013 |
| EM | 002066910-0006 | | 3/2013 |
| EM | 002066910-0007 | | 3/2013 |
| EM | 002066910-0008 | | 3/2013 |
| EM | 002066910-0009 | | 3/2013 |
| EM | 002066910-0010 | | 3/2013 |
| EP | 0092043 | A2 | 10/1983 |
| EP | 0092392 | | 10/1983 |
| EP | 0114064 | A2 | 7/1984 |
| EP | 0313958 | A2 | 5/1989 |
| EP | 524408 | | 1/1993 |
| EP | 567325 | | 10/1993 |
| EP | 0631821 | | 1/1995 |
| EP | 0650766 | | 5/1995 |
| EP | 0650766 | A2 | 5/1995 |
| EP | 678334 | | 10/1995 |
| EP | 0706832 | | 4/1996 |
| EP | 0706832 | A1 | 4/1996 |
| EP | 0710506 | | 5/1996 |
| EP | 801002 | | 10/1997 |
| EP | 0846498 | A1 | 6/1998 |
| EP | 987060 | | 3/2000 |
| EP | 1081639 | | 3/2001 |
| EP | 1106262 | | 6/2001 |
| EP | 1247586 | | 10/2002 |
| EP | 1277519 | | 1/2003 |
| EP | 1294490 | | 3/2003 |
| EP | 1299194 | | 4/2003 |
| EP | 1366823 | | 12/2003 |
| EP | 1412669 | | 4/2004 |
| EP | 1424135 | | 6/2004 |
| EP | 1477232 | A1 | 11/2004 |
| EP | 1479447 | A1 | 11/2004 |
| EP | 1504823 | A1 | 2/2005 |
| EP | 1563913 | | 8/2005 |
| EP | 1574262 | | 9/2005 |
| EP | 1602412 | | 12/2005 |
| EP | 1658902 | A1 | 5/2006 |
| EP | 1708822 | | 10/2006 |
| EP | 1708823 | | 10/2006 |
| EP | 1718415 | | 11/2006 |
| EP | 1880771 | A1 | 1/2008 |
| EP | 1902766 | A1 | 3/2008 |
| EP | 1902786 | | 3/2008 |
| EP | 1902876 | | 3/2008 |
| EP | 1930084 | | 6/2008 |
| EP | 1964616 | | 9/2008 |
| EP | 1964616 | A2 | 9/2008 |
| EP | 1987886 | A2 | 11/2008 |
| EP | 1997561 | A2 | 12/2008 |
| EP | 2017010 | A2 | 1/2009 |
| EP | 2027931 | | 2/2009 |
| EP | 1 270 081 | B1 | 3/2009 |
| EP | 2092987 | A1 | 8/2009 |
| EP | 2106298 | | 10/2009 |
| EP | 2111920 | | 10/2009 |
| EP | 2127758 | A1 | 12/2009 |
| EP | 2451586 | A1 | 5/2012 |
| EP | 2490819 | | 8/2012 |
| EP | 2576079 | | 4/2013 |
| EP | 2608890 | | 7/2013 |
| EP | 2 669 213 | A1 | 12/2013 |
| EP | 2703089 | A1 | 3/2014 |
| EP | 2736651 | B1 | 6/2014 |
| EP | 2 828 000 | A | 1/2015 |
| EP | 2 828 000 | A1 | 1/2015 |
| EP | 3184177 | A1 | 6/2017 |
| EP | 2828000 | B1 | 8/2019 |
| FR | 398333 | | 6/1909 |
| FR | 789762 | | 11/1935 |
| FR | 1410519 | | 9/1964 |
| FR | 2444501 | | 7/1980 |
| FR | 2462200 | A1 | 2/1981 |
| FR | 2 570 140 | | 3/1986 |
| FR | 2 774 928 | | 8/1999 |
| FR | 2863512 | A1 | 6/2005 |
| FR | 2927824 | A1 | 8/2009 |
| GB | 190900523 | | 6/1909 |
| GB | 657854 | A | 9/1951 |
| GB | 2 132 916 | | 7/1984 |
| GB | 2153260 | | 8/1985 |
| GB | 2372465 | | 8/2002 |
| GB | 2411235 | | 8/2005 |
| GB | 2416141 | A | 1/2006 |
| GB | 2444909 | A | 6/2008 |
| GB | 2508446 | A | 6/2014 |
| HK | 1100405 | | 6/2009 |
| HK | 1096057 | | 7/2009 |
| HK | 1125067 | | 8/2012 |
| HK | 1138533 | | 11/2012 |
| JP | S49-136868 | U | 11/1974 |
| JP | S55-107258 | U | 7/1980 |
| JP | S5654328 | | 5/1981 |
| JP | S57-75246 | | 5/1982 |
| JP | S57128346 | A | 8/1982 |
| JP | 58-119862 | | 5/1983 |
| JP | S5998757 | | 6/1984 |
| JP | S601722 | | 1/1985 |
| JP | S62160156 | A | 7/1987 |
| JP | H01-87805 | | 6/1989 |
| JP | H02258076 | A | 10/1990 |
| JP | H04-176352 | A | 6/1992 |
| JP | H0530749 | | 4/1993 |
| JP | H05172678 | | 7/1993 |
| JP | 674850 | | 3/1994 |
| JP | H06215741 | | 8/1994 |

(56) References Cited

FOREIGN PATENT DOCUMENTS

| | | | |
|---|---|---|---|
| JP | H07204542 | A | 8/1995 |
| JP | H08196950 | | 8/1996 |
| JP | H08196950 | A | 8/1996 |
| JP | H09117697 | | 5/1997 |
| JP | 11-047643 | A | 2/1999 |
| JP | 2000015150 | A | 1/2000 |
| JP | 2000070780 | A | 3/2000 |
| JP | 2001259487 | | 9/2001 |
| JP | 2003042882 | | 2/2002 |
| JP | 2003088780 | | 3/2003 |
| JP | 2004-501763 | A | 1/2004 |
| JP | 2004017044 | | 1/2004 |
| JP | 2003-211034 | A | 5/2004 |
| JP | 2005000735 | A | 1/2005 |
| JP | 2005-052830 | A | 3/2005 |
| JP | 2005138885 | | 6/2005 |
| JP | 2007516831 | | 6/2007 |
| JP | 2008018296 | A | 1/2008 |
| JP | 2008161789 | A | 7/2008 |
| JP | 2010-528837 | A | 8/2010 |
| JP | 2014124274 | A | 7/2014 |
| JP | 2017-135647 | A | 8/2017 |
| JP | 2017/176962 | A | 10/2017 |
| JP | 2018-505779 | A | 3/2018 |
| KR | 20140064644 | A | 5/2014 |
| RU | 2523816 | C1 | 1/2014 |
| TW | 491092 | | 6/2002 |
| TW | 510253 | U | 11/2002 |
| TW | I220392 | | 8/2004 |
| TW | I303587 | | 12/2008 |
| TW | I309584 | | 5/2009 |
| TW | 201020031 | A | 6/2010 |
| WO | 90/008456 | | 8/1990 |
| WO | 91/16610 | | 10/1991 |
| WO | 1992/07346 | | 4/1992 |
| WO | 9522409 | | 8/1995 |
| WO | 1998/32539 | | 7/1998 |
| WO | 01/012337 | | 2/2001 |
| WO | 2001/12337 | | 2/2001 |
| WO | 0166261 | | 9/2001 |
| WO | 01/099062 | | 12/2001 |
| WO | 02/000355 | | 1/2002 |
| WO | 0202242 | | 1/2002 |
| WO | 02/018061 | | 3/2002 |
| WO | 02/085533 | | 10/2002 |
| WO | 03/007252 | | 1/2003 |
| WO | 03/045575 | | 6/2003 |
| WO | 03/069208 | | 8/2003 |
| WO | 03069208 | A1 | 8/2003 |
| WO | 03/086654 | A1 | 10/2003 |
| WO | 04/037433 | | 5/2004 |
| WO | 2004/37433 | | 5/2004 |
| WO | 04/052552 | | 6/2004 |
| WO | 05/018815 | | 3/2005 |
| WO | 05/068220 | | 7/2005 |
| WO | 05/070557 | | 8/2005 |
| WO | 05/070558 | | 8/2005 |
| WO | 05/077543 | | 8/2005 |
| WO | 05/115631 | | 12/2005 |
| WO | 2006065850 | | 6/2006 |
| WO | 07/128127 | | 11/2007 |
| WO | 2007133386 | A2 | 11/2007 |
| WO | 2007/149760 | A2 | 12/2007 |
| WO | 2008/093866 | A1 | 8/2008 |
| WO | 2009015260 | | 1/2009 |
| WO | 2009015260 | A2 | 1/2009 |
| WO | 2009/054986 | A1 | 4/2009 |
| WO | 2009056424 | | 5/2009 |
| WO | 2010019274 | A1 | 2/2010 |
| WO | 2010/044864 | A1 | 4/2010 |
| WO | 2011047876 | | 4/2011 |
| WO | 2011147555 | | 12/2011 |
| WO | 2012/013574 | A1 | 2/2012 |
| WO | 2012/052255 | A1 | 4/2012 |
| WO | 2012/119578 | A1 | 9/2012 |
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013/142045 | A1 | 9/2013 |
| WO | 2014/006593 | A1 | 1/2014 |
| WO | 2015/125619 | A1 | 8/2015 |
| WO | 2016/127106 | A1 | 8/2016 |
| WO | 2016/188804 | A1 | 12/2016 |
| WO | 2017/096740 | A1 | 6/2017 |
| WO | 2018/197025 | A1 | 10/2017 |
| WO | 2020/053153 | A | 3/2020 |
| WO | 2020/0053153 | A1 | 3/2020 |
| WO | 2020/086977 | A1 | 4/2020 |

OTHER PUBLICATIONS

Final Office Action dated Nov. 23, 2021 for U.S. Appl. No. 15/679,533.

Response to Election of Species Requirement and Amendment filed Oct. 15, 2018 from U.S. Appl. No. 15/679,482.

Chinese Search Report dated Jul. 18, 2018 for Application No. 2014103745834 filed Jul. 31, 2014.

DesignView of CN302452159 registered Jun. 5, 2013, printed Oct. 18, 2018.

Response to Office Action filed Feb. 16, 2016 for U.S. Appl. No. 13/698,417.

Screen shot of a SATA product (SATAjet B) description retrieved on Feb. 12, 2016 from www.sata.com/index.php.

"The Hot Rolling Process;" California Steel; retrieved on Feb. 12, 2016 from http://www.californiasteel.com/GetPublicFile.aspx?id=53.

Office Action dated Feb. 19, 2016 for U.S. Appl. No. 14/113,649.

Notice of Allowance dated Apr. 18, 2016 for U.S. Appl. No. 14/572,998.

Response filed Apr. 27, 2016 to Office Action dated Jan. 29, 2016 for U.S. Appl. No. 13/380,949.

German Search Report dated Apr. 12, 2016 for related German Application No. 10 2015 008 735.5.

Notice of Allowance dated Jun. 27, 2023 for U.S. Appl. No. 16/524,740.

SATA—X5500 Rp Spray Gun 1.3 I W/Rps Cups, Dec. 19, 2022, amazon.com,May 17, 2024, URL: https:IIwww.amazon.com/SATA-X5500-Spray-Cups-1 061564/dp/BOBOJ NCL921 (Year: 2022).

For Design U.S. Appl. No. 29/834,813: Interview Summary dated May 17, 2024 Notice of Allowance dated May 24, 2024.

For Chinese Patent Application No. 2019800593031 First Office Action dated Apr. 25, 2022 (Eng. translation) Chinese Search Report dated Apr. 19, 2022.

Second Chinese Office Action dated Jun. 24, 2015 for Chinese Application No. 2011800266029.

Third Chinese Office Action dated Nov. 30, 2015 for Chinese Application No. 2011800266029.

Final Office Action dated Aug. 29, 2016 for U.S. Appl. No. 14/113,649.

Office Action dated Nov. 2, 2016 for U.S. Appl. No. 11/949,122.

Search Report dated Feb. 22, 2019 for German Patent Application No. 10 2018 118 738.6.

Search Report dated Feb. 8, 2019 for German Patent Application No. 10 2018 118 737.8.

Notice of Allowance dated Jul. 1, 2019 for U.S. Appl. No. 15/379,972.

Notice of Allowance dated Jul. 9, 2019 for U.S. Appl. No. 15/679,482.

Office Action dated May 10, 2024 for European Patent Application No. 19 768 753.6.

International Search Report and Written Opinion for PCT/EP2021/53940, filed Feb. 18, 2021.

Notification of the First Office Action with search report dated Aug. 24, 2015 for Chinese Application No. 201280020519.5 (related to U.S. Appl. No. 14/113,649), 13 pages.

Notification of the Second Office Action dated May 16, 2016, for Chinese Application No. 201280020519.5 (related to U.S. Appl. No. 14/113,649), 5 pages.

(56) References Cited

OTHER PUBLICATIONS

Japanese Office Action for JP2014-517485 (related to U.S. Appl. No. 14/113,649), dated Jul. 5, 2016, 16 pages.
Response restriction requirement filed May 23, 2016 for Design U.S. Appl. No. 29/516,082.
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
For U.S. Appl. No. 16/524,740: Interview Summary and Advisory Action dated Aug. 30, 2021.
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Japanese Office Action dated Sep. 25, 2019 for Japanese Publication No. 2015-149405, 4 pages.
Final Rejection dated Jul. 22, 2021 for U.S. Appl. No. 16/524,838.
Office Action dated Dec. 9, 2021 for U.S. Appl. No. 16/524,838.
Office Action dated Mar. 30, 2020, for U.S. Appl. No. 15/679,533.
German Search Report dated Apr. 21, 2017 for application No. 10 2016 009 957.7 .
German Search Report dated Mar. 15, 2016 for Application No. 20 2015 003 664.3, 8 pages.
Chinese Search Report dated Feb. 21, 2019 for Application No. 2016800293781, 3 pages.
Notification of the Third Office Action dated Feb. 14, 2023 for Chinese Patent Application No. 2019107032612, 15 pages.
Office Action dated Mar. 21, 2023 for European Patent Application No. 19 183 382.1, (12 pages).
International Search Report dated Apr. 12, 2019 for PCT/DE2018/100679 filed Aug. 1, 2018.
Written Opinion for PCT/DE2018/100679 filed Aug. 1, 2018.
Office Action dated Jun. 30, 2017 for U.S. Appl. No. 14/815,210.
Notice of Allowance dated May 20, 2024 for U.S. Appl. No. 17/410,124.
International Preliminary Report on Patentability for PCT/EP2015/001728 filed Aug. 25, 2015.
Final Office Action dated Mar. 16, 2017 from U.S. Appl. No. 13/698,417, 9 pages.
International Search Report dated Nov. 13, 2019 for PCT/EP2019/074000, filed Sep. 9, 2019.
Written Opinion or PCT/EP2019/074000, filed Sep. 9, 2019.
Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
International Search Report dated Jul. 14, 2016 for International Application No. PCT/EP2016/000809, filed May 17, 2016.
Written Opinion for International Application No. PCT/EP2016/000809, filed May 17, 2016.
International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
Final Office Action dated Dec. 7, 2017 for U.S. Appl. No. 14/815,210.
Final Office Action dated Sep. 4, 2020 for U.S. Appl. No. 15/679,533.
Response to Restriction Requirement filed Oct. 29, 2019 for U.S. Appl. No. 15/575,549.
Notice of Allowance dated Sep. 17, 2020 for U.S. Appl. No. 15/679,461.
Re. U.S. Appl. No. 17/410,124: Office Action dated Oct. 30, 2023.
Examination Report from the European Patent Office dated Nov. 23, 2021 for European Patent Application No. 19183380.5.
Response to Restriction Requirement filed in U.S. Appl. No. 14/815,210 dated Jun. 19, 2017 .
Search Report dated Jan. 7, 2022, for Chinese Patent Appl. No. 2018800961965, with translation.
Office Action dated Apr. 26, 2022 for U.S. Appl. No. 15/679,533.
Office Action dated Feb. 19, 2021 for U.S. Appl. No. 15/575,549.
For Chinese Application No. 2018800961965: Search Report, dated Aug. 1, 2022 (English translation) Second Office Action, dated Aug. 12, 2022 (English translation).
Notice of Allowance dated Jan. 27, 2016 for Design U.S. Appl. No. 29/510,723.
Response filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Search Report dated Jan. 26, 2022, for Chinese Patent Appl. No. 2019107032612 with translation.
Final Office Action dated Sep. 23, 2020, for U.S. Appl. No. 15/575,549.
Office Action, dated Jan. 15, 2019, for U.S. Appl. No. 15/679,533.
Office Action, dated Jan. 15, 2019, for U.S. Appl. No. 15/679,461.
Response to Office Action dated Jun. 25, 2018 for U.S. Appl. No. 14/815,210.
Response to Final Office Action dated Aug. 22, 2018 for U.S. Appl. No. 14/113,649.
For U.S. Appl. No. 15/679,533: Interview Summary dated Jun. 17, 2020 Response to Office Action, filed Jun. 30, 2020.
Office Action dated Jun. 12, 2020, for U.S. Appl. No. 15/575,549.
RCE Reply filed Oct. 11, 2019 for U.S. Appl. No. 15/679,461.
Written Opinion dated Sep. 8, 2016 for International Application No. PCT/EP2016/061057 filed May 18, 2016.
Third Office Action dated Feb. 15, 2023 for Chinese Patent Application No. 20191070444.X.
Chinese Search Report for Application No. 2017107135569 dated Aug. 24, 2020 and English translation.
Final Office Action dated Feb. 27, 2020 for U.S. Appl. No. 15/575,549.
Office Action dated Feb. 5, 2021 for U.S. Appl. No. 16/524,740.
Office Action dated Feb. 5, 2021 for U.S. Appl. No. 16/524,838.
Final Office Action in U.S. Appl. No. 14/113,649 dated Jun. 22, 2017.
Response filed in U.S. Appl. No. 15/143,698 dated Jul. 3, 2017.
International Search Report dated Apr. 12, 2019 and Written Opinion for PCT/DE18/100679, filed Aug. 1, 2018 (21 pages).
Restriction/Species requirement dated Dec. 7, 2020 for U.S. Appl. No. 16/524,838.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
International Preliminary Report on Patentability, dated Mar. 9, 2021,with Written Opinion for PCT/EP2019/074000, filed Sep. 9, 2019 (English translation) (7 pages).
Office Action dated Aug. 12, 2021 for U.S. Appl. No. 15/679,533.
International Search Report dated Aug. 31, 2016 for PCT/EP2016/061057 filed May 18, 2016.
Written Opinion for PCT/EP2016/061057 filed May 18, 2016.
Office Action from U.S. Appl. No. 15/143,698 dated Jan. 5, 2017.

(56) References Cited

OTHER PUBLICATIONS

German Search Report for German Application No. 10 2015 016 474.0 dated Aug. 9, 2016, 14 pages ).
Notice of Allowance in U.S. Appl. No. 29/556,463, filed Mar. 1, 2016, 9 pages.
Notice of Allowance in U.S. Appl. No. 29/555,656, filed Feb. 24, 2016, 5 pages.
Second Office Action dated Aug. 26, 2022 for Chinese Patent Application No. 2019107032612.
International Preliminary Report on Patentability dated Jan. 31, 2023 with Written Opinion for International Application No. PCT/EP2021/071252 filed Jul. 29, 2021.
Printout from Internet www.ehow.com explaining how to choose a spray gun and stating in item 2 "Nozzle sizes vary between about 1 mm and 2 mm.", printed Sep. 7, 2012 (Exhibit 1023 in IPR 2013-0111).
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012 (Exhibit 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in IPR 2013-0111).
Printout from Internet of p. 28 from current 3Mtm brochure showing Tip/Nozzle/Air Cap Selection Guide with nozzle sizes from 0.5 mm to 3.0 mm., (Exhibit 1027 in IPR 2013-0111).
Decision by EPO regarding opposition proceedings to revoke patent No. 99926841.0-2425/ 1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6—51pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised Mar. 1, 1991 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRielsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al., A conceptual design . . . , Mechatrronics 17 (2007) p. 1-13 (Exhibit 2015 in IPR 2013-0111).
On line ad from Amazon.com printed Oct. 14, 2013 (Exhibit 2017 in IPR 2013-0111).
Rone et al., MEMS-Baed Microdroplet Generation with Integrated Sensing, COMSOL, 2011 (Exhibit 2018 in IPR 2013-0111).
For Chinese Application No. 201910704447.X: Search Report, dated Aug. 25, 2022 Second Office Action, dated Sep. 1, 2022.
Japanese Office Action dated Jun. 28, 2023 for Japanese Patent Application No. 2021-537499 with translation.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement dated Jan. 9, 2015 for Design U.S. Appl. No. 29/469,049
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012, [online], [site visited Jan. 7, 2015], <http://www.herkules.us/pdfs/1.00761-Hercules-Gun_Washers-4-page-brochure.pdf>.
Jetclean GUn Cleaner Terry's Auto Supply, google publish date Aug. 4, 2011, [online], [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22. 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for Design U.S. Appl. No. 29/486,232.
Response filed Mar. 31. 2015 to Office Action dated Dec. 31, 2014 for U.S. Appl. No. 13/380,949.
Japanese Office Action dated Jun. 11, 2014 for Japanese Patent Application No. 2012-618769.
Australian Examination Report dated Nov. 11, 2014 for Australian patent Application No. 2011257606.
Japanese Notice of Allowance mailed Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18. 2014 for U.S. Appl. No. 14/113,649.
Application filed Dec. 17, 2014 for U.S. Appl. No. 14/572,998.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29. 2015 for Design U.S. Appl. No. 29/516,082.
Application filed Mar. 3, 2015, 2015 for Design U.S. Appl. No. 29/519,198.
Final Office Action dated Jul. 20, 2015 for U.S. Appl. No. 14/113,649.
Response filed Dec. 21, 2015 to Office Action dated Jul. 20, 2015 for U.S. Appl. No. 14/113,649.
German Search Report for Application No. 10 2016 009 957.7 dated Apr. 21, 2017.

(56) References Cited

OTHER PUBLICATIONS

European Search Report dated May 8, 2017 for Application No. EP16203544.
"Spray Guns/SATA.COM", Oct. 18, 2015, XP055364928 URL:http://web.archive.org/web/20151018205307/http://www.sata.com/index.php?id=lackierpistolen&L=11 [gefunden am Apr. 13, 2017]; reprinted on Dec. 8, 2017.
"SATAjet 5000 B Lackierpistolen | Bechersysteme | Atemschutz | Filtertechnik | Zubehor So flexibel wie Ihre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.
Amendments submitted to European Patent Office on Dec. 3, 2017 for Application No. EP16203544 (with English translation of chart on p. 3).
Office Action dated Mar. 29, 2023 for U.S. Appl. No. 17/264,372.
Office Action dated Apr. 21, 2025 for U.S. Appl. No. 17/909,142.
Office Action dated Apr. 14, 2025 for U.S. Appl. No. 17/908,959.
Examination Report from the European Patent Office dated Nov. 8, 2021 for European Patent Application No. 19183382.1.
German Search Report dated May 26, 2021, for DE 10 2020 123 769.3, with machine translation.
Final Office Action dated May 2, 2022 for U.S. Appl. No. 16/524,740.
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
Search Report dated Jan. 29, 2022, for Chinese Patent Appl. No. 201910704447X, with translation.
Decision on Rejection dated Feb. 10, 2023 for Chinese Patent Application No. 2018800961965.
Search Report dated Jan. 30, 2023 for Chinese Patent Application No. 2018800961965.
For U.S. Appl. No. 16/524,838: Response and Request for Continued Exam filed Oct. 22, 2021.
German Search Report dated May 7, 2019 for Application No. 10 2018 122 004.9.
Husky Gravity Feed HVLP Spray Gun (2016) https://www.homedepot.com/husky-gravity-feed-hvlp-spray-gun-H4840GHVSG/203497519.
Northern Industrial Paint Spray Gund and Hoses (2008) https://www.northerntool.com/products/northern-industrial-paint-spray-gun-and-hoses-158970.
Notice of Allowance dated Jul. 26, 2021, for U.S. Appl. No. 15/575,549.
Office Action for European Patent Application No. 21 706 892.3-1009 dated Apr. 24, 2025.
European Search Report dated Feb. 4, 2022 for Application No. 21191428.8.
International Preliminary Report on Patentability with Written Opinion dated Mar. 9, 2021 for PCT/EP2019/074000 filed Sep. 9, 2019.
Response to Office Action dated Mar. 9, 2020 for U.S. Appl. No. 14/815,210.
Notice of Allowance for U.S. Appl. No. 14/815,210 dated Mar. 25, 2020.
Office Action of U.S. Appl. No. 15/679,461 dated Mar. 31, 2020.
Response filed May 28, 2019 for U.S. Appl. No. 15,379,972.
Final Office Action for U.S. Appl. No. 15/679,461 dated Jun. 11, 2019.
Final Office Action for U.S. Appl. No. 15/679,533 dated Jul. 12, 2019.
International Preliminary Report on Patentability dated Sep. 6, 2022 with Written Opinion for PCT/EP2021/053940 (English Translation).
International Preliminary Report on Patentability dated Sep. 6, 2022 with Written Opinion for PCT/EP2021/054059 (English Translation).
International Preliminary Report on Patentability dated Sep. 6, 2022 with Written Opinion for PCT/EP2021/054061 (English Translation).
Final Office Action dated Aug. 12, 2019 from U.S. Appl. No. 14/815,210.
Office Action dated Jan. 25, 2019 for U.S. Appl. No. 15/379,972.
Restriction Requirement dated Mar. 18, 2019, for U.S. Appl. No. 29/596,869.
Office Action dated Mar. 15, 2019, for U.S. Appl. No. 14/815,210.
Search Report for German Application No. 10 2021 124 140.5, filed Sep. 17, 2021.
International Search Report, Written Opinion and International Preliminary Report on Patentability for PCT/EP2022/075664, filed Sep. 15, 2022.
Search Report for German Application No. 10 2021 124 139.1, filed Sep. 17, 2021.
International Search Report, Written Opinion and International Preliminary Report on Patentability for PCT/EP2022/075666, filed Sep. 15, 2022.
For U.S. Appl. No. 17/410,124: Final Office Action dated Mar. 14, 2024.
European Search Report, dated Jan. 20, 2020, for European Application No. 19183380.
For German Patent Application No. 19 183 380.5: Office Action dated Nov. 4, 2022 Office Action dated May 19, 2023.
Response filed May 5, 2021 for U.S. Appl. No. 16/524,740.
Response filed May 5, 2021 for U.S. Appl. No. 16/524,838.
International Preliminary Report on Patentability dated Feb. 2, 2021 and Written Opinion for PCT/DE2018/100679 filed Aug. 1, 2018 (English Translation).
Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps://web.archive.org/web/20150127025402lhttp://www.autorefinishdevilbiss.com.spray-gun-setup.aspx.
Anonymous: "DeVilbiss—Spray Gun Tool on the AppStore", Oct. 19, 2015 (Oct. 19, 2015), XP055580448, retrieved from the Internet: URLhttps://itunes .apple.comlus/app/ devilbiss-spray-gun-tool/id590404917?mt=8.
Final Office Action dated Jun. 1, 2021 for U.S. Appl. No. 16/524,740.
European Search Report dated Feb. 21, 2020 for Application No. 19183382.1.
Response dated Feb. 19, 2020 for U.S. Appl. No. 15/575,549.
International Search Report and Written Opinion for PCT/EP2021/054061, filed Apr. 16, 2021.
Zhu Zhifu, "Simulation and Experimental Study on Spray Characteristics of Gas-Assisted Urea Spray Gun", Aug. 6, 2019, pp. 1-6.
International Search Report and Written Opinion for PCT/EP2021/54059, filed Feb. 18, 2021.
Notice of Allowance dated Aug. 25, 2023 for U.S. Appl. No. 16/524,838.
May 22, 2018 Final Office Action for U.S. Appl. No. 14/113,649.
Jun. 25, 2018 Response to Office Action for U.S. Appl. No. 14/815,210.
Office Action dated Feb. 24, 2023 for U.S. Appl. No. 16/524,740.
Final Office Action dated May 12, 2022, for U.S. Appl. No. 16/524,838.
Office Action for U.S. Appl. No. 14/815,210 , dated Apr. 3, 2018.
Response for U.S. Appl. No. 14/113,649, filed Mar. 3, 2018.
German Search Report dated Apr. 10, 2018 for Application No. 10 2017 118 599.2.
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
European Office Action dated Mar. 15, 2024 for European Patent Application No. 21 706 892.3.
European Office Action dated Mar. 7, 2024 for European Patent Application No. 21 706 572.1.

(56) References Cited

OTHER PUBLICATIONS

European Office Action dated Mar. 6, 2024 for European Patent Application No. 21 191 428.8.
European Office Action dated Mar. 14, 2024 for Eiuropean Patent Application No. 21 706 923.6.
For U.S. Appl. No. 17/410,124: Response filed May 8, 2024.
Final Office Action dated Sep. 12, 2018 in U.S. Appl. No. 14/815,210.
European Search Report dated Jan. 24, 2018 for U.S. Appl. No. 17/186,905.
Office Action dated Dec. 2, 2022 for U.S. Appl. No. 16/524,838.
Office Action dated May 8, 2025 for European Patent Application No. 21 706 923.6-1009.
Japanese Office Action dated Mar. 6, 2024 for Japanese Patent Application No. 2021-537499 (11 pages).
Office Action dated Apr. 25, 2024 for U.S. Appl. No. 17/274,710.
Office Action, dated Jan. 9, 2019, for U.S. Appl. No. 15/679,482.
Response to Final Office Action, dated Nov. 11, 2019, for U.S. Appl. No. 14/815,210 20 pages.
Office Action, dated Nov. 20, 2019, for U.S. Appl. No. 15/575,549 12 pages.
Office Action, dated Dec. 9, 2019, for U.S. Appl. No. 14/815,210 6 pages.
Response to Final Office Action, filed Jan. 4, 2021, for U.S. Appl. No. 15/679,533 (18 pages).
Response to Restriction Requirement, filed Jan. 25, 2021, for U.S. Appl. No. 16/524,740 (9 pages).
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.
International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 on Feb. 25, 2014 with English translation.
Response to Final Office Action and RCE dated Nov. 29, 2016 in U.S. Appl. No. 14/113,649.
Office Action dated Aug. 7, 2015 for U.S. Appl. No. 13/991,285.

* cited by examiner

PAINT SPRAY GUN WITH TWO-PART MATERIAL NEEDLE, MATERIAL NEEDLE, FRONT NEEDLE OF A MATERIAL NEEDLE, AND METHOD FOR EXCHANGING A FRONT NEEDLE

FIELD OF THE INVENTION

The invention relates to a paint spray gun and to a material needle, a front needle, and to a method for exchanging a front needle.

BACKGROUND

Material needles in paint spray guns serve for opening and closing nozzle openings, and thereby for controlling the dispensing of sprayable material such as lacquers, primers, and paints from a material nozzle. In particular in the case of abrasive materials, the material needles are subject to wear and thus influence the spray pattern of the paint spray gun. Therefore, in order to maintain a desired spray pattern, the material needles must be regularly exchanged. For this purpose, it is usually sufficient to exchange the part of the material needle that engages the nozzle opening, for example a needle head. Exchangeable needle heads are known, for example, from U.S. Pat. No. 3,463,363A or DE69110099T2:

U.S. Pat. No. 3,463,363A discloses an exchangeable needle head which is releasably connected to a needle shaft via a screw connection.

DE69110099T2 teaches a material needle having an exchangeable needle head (valve tip) which is releasably connected to the needle head via a clamping sleeve screwed onto a needle shank. The needle head engages with an end-side ball head in an elastically deformable receptacle of the clamping sleeve. The needle head is thus mounted like a ball joint.

Such solutions satisfy the demand for rapid exchange of the needle tip, but are complicated to manufacture in terms of production technology and require either the use of technically complex fine threads to ensure sufficient positioning accuracies of the needle head or do not ensure a sufficiently precise axial alignment of the needle head.

SUMMARY

Starting from this background, an object of the invention is to further develop paint spray guns or the material needles thereof in such a way that a simple and rapid exchange of a needle tip with simultaneously high production tolerances is possible. Furthermore, another object of the invention is to provide an exchangeable needle tip of a material needle wherein an unintentional release of the needle tip from the remaining material needle in an operating state of the paint spray gun can be reliably prevented, and wherein a centering of the material needle in a channel of the paint spray gun can be ensured.

Accordingly, embodiments of a paint spray gun, a material needle, a front needle, and a method for exchanging a front needle are disclosed herein.

Paint spray guns according to the invention are preferably designed as a high-pressure paint spray guns or as low-pressure paint spray guns. High pressure paint spray guns atomize material under high pressure. The material pressure is generally between 50 and 400 bar. High pressure paint spray guns are subdivided into conventional high pressure paint spray guns in which no compressed air is used, and air-assisted high pressure paint spray guns in which air is additionally employed for support. The latter require a lower material pressure than high pressure paint spray guns without air support. High pressure paint spray guns generally have a slot-shaped nozzle which, without further shaping, generates a flat spray jet, wherein a material valve is provided which serves to control the dispensing of material.

Low-pressure paint spray guns are operated with low material pressure and supplied with material either by means of gravity, negative pressure or a low-pressure material feed (less than 40 bar material pressure). The low-pressure paint spray guns include so-called cup spray guns in which the material is supplied via a cup fastened to the paint spray gun. A material container can also be provided from which the material—which is, for example, under a material pressure of between 1 and 20 bar—is pumped to the paint spray gun. Low-pressure paint spray guns atomize the material by means of a gas or gas mixture, preferably compressed air, which exits at an air gap surrounding the material nozzle, whereby the material is entrained and atomized from the material nozzle.

In a particularly preferred embodiment, the paint spray gun according to the invention is designed as automatic or as hand-guided paint spray guns. Automatic paint spray guns are activated via an external signal source and not activated directly by a user. Hand-guided paint spray guns are held and actuated in the hand by a user.

Furthermore, the paint spray gun according to the invention can preferably be designed as a single-axis and two-axis paint spray gun. In the case of single-axis paint spray guns, the air valve for controlling the dispensing of air and the material valve for controlling the dispensing of material share a common axis. In the case of two-axis paint spray guns, the axes for controlling the dispensing of air and the material valve for controlling the dispensing of material are not arranged coaxially. Automatic and hand-guided paint spray guns can be designed both as single-axis and two-axis paint spray guns.

According to the invention, a paint spray gun is proposed which is equipped with a material nozzle for dispensing a coating material along a material dispensing direction and with a material needle for controlling the quantity of dispensed coating material via the material nozzle. In an operating state of the paint spray gun, the material needle is axially movably mounted within a defined needle stroke for releasing or closing a nozzle opening in a channel that extends in an axial direction. The material needle comprises a front needle and a rear needle which are releasably connectable or connected together. The connection is a quick-acting connection.

The quick-acting connection is characterized in that, in an operating state, i.e., when the paint spray gun is used for and during dispensing of a sprayable material, it cannot be released, and the connection for transferring the paint spray gun into a maintenance state, in which the paint spray gun cannot be used to dispense a sprayable material, can be released so that the front needle can be removed in a material dispensing direction in the maintenance state.

The quick-acting connection is furthermore characterized in that the material needle has at least one contact surface, wherein this contact surface rests against a wall of the surrounding channel in the operating state so that the contact surface and the channel or the channel wall form a sliding bearing.

The contact surface is either arranged in a region of the front needle around which coating material flows, in particular within a paint channel, and/or the contact surface is arranged in the region of the connection between the front needle and the rear needle.

In contrast to the connection between the front needle and the rear needle via a thread, which is known from U.S. Pat. No. 3,463,363A, it can thereby be ensured that the connection in the operating state of the paint spray gun cannot be inadvertently released during operation, for example by vibration-induced rotation of the needle tip.

A precise position alignment of the front needle can be ensured by means of the sliding bearing. In particular, the front needle is positioned in a radially precise manner via the slide bearing so that an axis of the material nozzle and a central axis of the front needle, or the needle tip, are aligned at a precise angle-regardless of whether a needle tip is centered over a valve seat or lifted off of the valve seat—and thus a radially symmetrical spray pattern can be achieved.

"Quick-acting connection" is to be understood as a connection which is releasable in seconds and preferably without tools. Quick-acting connections can be subsumed under, in particular, clip connections, latching connections, snap connections, press fits, and bayonet connections.

"Exchange" is not only to be understood as the exchange of a front needle for another front needle, but also the removal of the front needle with subsequent insertion of the same front needle as is done, for example, when cleaning the front needle and/or the material-carrying regions of the paint spray gun.

The front end of the front needle and/or the rear needle is to be understood as the end that, in the material dispensing direction, is situated downstream from the rear end of the same part substantially along the longitudinal axis of the material needle. The rear end, on the other hand, is situated in the material dispensing direction upstream from the front end. Analogously, this also applies to the designations front and rear, which are also in relation to the material dispensing direction.

Further features and advantageous modifications of the invention are also disclosed herein.

In an advantageous embodiment, the connection is preferably releasable exclusively in the axial direction of the channel, i.e., in or counter to the material dispensing direction. This can be achieved, for example, by the connection being designed as a latching and/or snap connection, which is preferably form-fitting in the axial direction. Latching and/or snap connections are to be understood as quick-acting connections in which snap or latching means interact between the front and rear needles in such a way that a release of the connection is prevented. The quick-acting connection can expediently act in a form-fitting and/or frictional manner.

A form-fit (positive lock) is to be understood as a direct or indirect form-fitting connection between at least two connection partners, in this case the front needle and the rear needle, which interlock in such a way that the connection does not release in the direction of the impeded movement even in the absence of normal force (perpendicular to the surfaces of the connection partners or in the direction of the impeded movement).

A force-fit (frictional connection) is to be understood as a direct or indirect frictional connection between at least two connection partners—in this case the front needle and the rear needle—which is caused by a frictional connection between the contact surfaces of the connection partners caused by means of a normal force (perpendicular to the surfaces of the connection partner or to the direction of the impeded movement).

The connection between the front needle and the rear needle can be both a form-fit and a force-fit, or a combination of both connection techniques.

A frictional engagement can in particular be achieved by an interference fit in a connection region of the connection between the front and the rear needle so that a connection region of the front needle is elastically compressed, and a connection region of the rear needle is elastically widened, or vice versa.

In an expedient embodiment, the connection between the front needle and the rear needle is designed as a latching connection which comprises corresponding latching means on the front and rear needles. In this case, the connection is substantially designed as a form-fit (positive lock), wherein a latching means of the front and/or the rear needle engages radially in a latching means of the rear or front needle. By means of a latching means, a form-fitting connection can be achieved which, even in a maintenance state, cannot be released between the front and the rear needle without the action of axially acting release forces. As a result, for example, unintentional release or dropping of the front needle from the rear needle can be avoided.

The connection can be designed such that the front needle and/or the rear needle has a recess, preferably in the form of an axially extending longitudinal opening, in the region of the connection. The longitudinal opening causes a targeted change in the elasticity or the radial deflectability of the quick-acting connection means. A closing and opening of the quick-acting connection can thereby be facilitated.

Additionally or alternatively, a sectional reduction of a material thickness of the front needle can be provided in a radial direction. The reduction can extend over 30%, 50% or even 80% of the axial length of the connection, for example. The radial deflection of the front or rear needle can also be advantageously influenced thereby. In particular in combination with the sliding bearing acting as a securing device or the contact surface acting as a securing device, a non-releasable connection can thus be produced in the operating state even at high axial forces, but can be released with just slight forces in order to initiate the maintenance state.

It is advantageous if the front needle and/or the rear needle has a latching means projection which, in relation to a central axis of the material needle, extends in the radial direction from the outside to the inside and engages in a corresponding latching recess in the rear needle and/or the front needle. The latching means projection can be designed (in the radial direction) circumferentially without interruption(s) or circumferentially with interruption(s). The latching recess can, for example, be designed as a circumferential annular groove in the front or rear needle. The latching means designed in this way forms a form-fitting, quick-acting connection means for connecting the front needle and the rear needle.

In a useful embodiment, the front and/or rear needles can have, for example, two or three latching means projections which project uniformly radially inwardly over the circumference and which can engage, for example, in a circumferential annular groove or an otherwise designed latching means recess. Although this does not guarantee a non-rotatable connection between the front and rear needle, a connection between the front and rear needle is also possible without a radial alignment of the front and rear needles relative to one another.

If a precise radial fixing of the front needle relative to the rear needle is required, however, the latching means projections and latching means recesses can also be numerically matched to one another such that the latching means projections can engage in the latching means recesses only in a specific angular position or a limited number of angular positions.

Advantageously, the sliding bearing forms an opening protection to prevent a release of the connection between the front needle and the rear needle in the operating state, preferably as a form-fitting securing device. This is realized in that the sliding bearing formed in the operating state secures the form fitting and/or the frictional locking of the connection-which is realized by the contact between the contact surfaces of the front needle and the rear needle-against release so that a radial relative movement (radially with respect to the axis of the material needle or the channel) between the contact surfaces is not possible.

Particularly preferably, the securing force which, in the operating state of the paint spray gun, acts on the connection in a directed manner in such a way that it blocks a movement of a quick-acting connection means of the connection—in particular designed as a latching element—in the radial direction and away from the central axis of the material needle. As described above, the securing force can as one option be conveyed through the wall of the channel onto the sliding surface. However, it could also be produced by an additional mediating element, for example a clamping sleeve arranged in the channel and acting radially, which elastically deforms when the material needle is inserted into the clamping sleeve, and thereby brings about a securing force for blocking a radial deflection movement of one of the latching elements.

In addition, the opening protection can also be improved by virtue of an additional prestressing force being exerted on the connection via the sliding bearing in the operating state, which generates normal forces necessary for a frictional connection, for example by an additional prestressing force in the radial direction which is generated by the sliding bearing or the sliding bearing surface being introduced into the channel as an interference fit. This means that the radial or diametrical extension of the front needle is slightly greater than the radial or diametrical extension of the channel, so that the front needle is compressed radially upon being introduced into the channel, and corresponding spring forces are introduced into the connection via the sliding bearing.

The opening protection can also be achieved by a combination of frictional connection and form-fit.

It is advantageous that the contact surface of the material needle generates a securing force acting on the connection by abutting against the wall of the channel, which securing force prevents the connection from opening in the operating state. This force can preferably act, at least substantially, perpendicularly to the axial direction, wherein non-perpendicular force components are advantageously avoided, insofar as non-perpendicularly acting forces adversely affect the sliding forces acting in the sliding bearing in the material dispensing direction and counter to the material dispensing direction. Embodiments of the connection in which the sliding bearing also generates relative axial forces between the front needle and the rear needle depending on movement direction or independently of the movement direction are also conceivable, for example in order to set a minimum actuating force for moving the material needle. Movement-direction-dependent axial forces can be realized, for example, by a conical cross-sectional design of the channel and/or contact surfaces of oblique or wedge-shaped design or the like. This can be used, for example, to control an axial play between the front needle and the rear needle.

It is particularly advantageous if the sliding bearing is not realized over an entire circumference of the preferably cylindrical channel. This is the case, for example, if the material needle has a plurality of contact surfaces, wherein contact surfaces of the material needle in the operating state of the paint spray gun bear against the wall of the channel at two diametrically opposite contact positions or in at least three contact positions spaced apart from one another in the circumferential direction. As a result, frictional forces can be minimized, and a smooth movement of the sliding bearing can be optimized. Furthermore, the additional contact surfaces can prevent the front needle from tilting in the channel when the front needle is removed from or inserted into the channel.

By designing the sliding bearing with at least two contact surfaces, a mirror-symmetrically precise centering of the material needle in the channel, i.e., a coincidence of the material needle axis and a longitudinal axis of the channel, can also be brought about by three or more contact surfaces, a radially symmetrical precise centering.

In an advantageous embodiment, a front needle stabilization device can furthermore be provided which, in the operating state, rests against a wall of the channel and is spaced apart from the sliding bearing in the axial direction. In this way, at least two sliding bearings are provided which, when viewed in the axial direction, form a first and a second tilting bearing which ensure a coaxial alignment of the front needle within the channel. This ensures that the front needle and in particular the needle tip of the front needle forming the valve seat is always aligned concentrically with respect to the channel so that a uniform spray pattern can be achieved when material is dispensed through the nozzle opening and a sealed closure of the nozzle opening can be achieved by the tip of the front needle. Wear of the material needle can thereby be prevented, and longer service lives can be achieved.

Preferably, the connection between the front needle and the rear needle is designed such that the connection for the transfer of the paint spray gun into the maintenance state can be released in the material dispensing direction without the rear needle having to be removed from the paint spray gun. This allows the front needle to be exchanged quickly and without impediments.

In an alternative embodiment, which can advantageously be used in a high-pressure paint spray gun with supporting air atomization, the rear needle or at least one region of the rear needle, in particular in the region of the connection to the front needle, rests against a wall of the channel in the operating state and secures the connection against opening. The region of the rear needle resting against the wall forms the sliding bearing. The sliding bearing is arranged outside the paint channel in which the material to be sprayed is guided. In a high-pressure paint spray gun with supportive air atomization, the sliding bearing can thus be arranged outside the high-pressure region of the paint channel and thereby protected from wear.

The paint spray gun expediently has a material nozzle component which can be removed from a main body of the paint spray gun and which, in the operating state of the paint spray gun, is mounted on the paint spray gun and is removed in the maintenance state. In the operating state, the removable material nozzle component can be a component of the channel in which the material to be sprayed is guided. In the case of the material nozzle component attached to the main body of the paint spray gun, the axial mobility of the material needle within the paint channel is limited in the predefined needle stroke in the operating state. The material nozzle component can thus in particular form an axially front stop for the material needle and advantageously also form an axially front stop for the stop surfaces of the material needle.

To exchange the front needle, the material nozzle component can be removed from the main body of the paint spray gun so that the front needle can be pulled out of the paint channel in the material dispensing direction. The material nozzle component can be fastened indirectly to the main body of the paint spray gun via a nozzle cap releasably arranged on the main body so that the nozzle cap can first be removed, and then the material nozzle component can be pulled out of the main body of the paint spray gun in the material dispensing direction. This breaks the contact between the contact surface(s) of the contact surface projection(s) of the material needle and the wall of the channel so that the connection between the front needle and the rear needle is no longer secured via the sliding bearing. This represents a maintenance state of the paint spray gun. In the maintenance state, the front needle can then be pulled forward in the material dispensing direction, and the cleaned needle or a new front needle can be placed onto the rear needle. In order to restore an operational state, the material nozzle component is finally inserted again axially into the main body of the paint spray gun and secured to the main body via the installation of the nozzle cap. On the other hand, the material nozzle component can also be made in one piece with the nozzle cap or be fixedly connected thereto. In this case, the nozzle cap and the material nozzle component are jointly inserted, whereby the contact between the contact surface(s) of the contact surface projection(s) of the material needle and the wall of the channel is established and the connection is secured. For example, a thread can be used for the connection between the nozzle cap and the main body. The thread of the nozzle cap is preferably located on a ring that surrounds the nozzle cap and is rotatable independently of the nozzle cap. Alternatively, however, a releasable latching connection or the like can also be used.

In addition, a rear cover removable from the main body of the paint spray gun can be provided at an axially rear end of the rear needle, which rear cover is mounted in the operating state of the paint spray gun and removed in the maintenance state, wherein this rear cover preferably forms an axially rear end stop for the rear needle and thereby defines a rear limitation of the needle stroke of the material needle in the operating state. After removal or disassembly of the rear cover, the material needle is axially displaceable toward the rear beyond the defined needle stroke so that, for example, a radial securing of the connection between the front needle and the rear needle can be broken by removing the rear cover from the main body of the paint spray gun and then retracting the material needle.

In the case of a low-pressure paint spray gun, the channel of the paint spray gun can be a material-carrying channel of the paint spray gun, i.e., a paint channel. The entire front needle is preferably located in the material-carrying channel. Insofar as the channel is formed by the previously described material nozzle component, the securing of the connection between the front and rear needle can therefore be broken by removing the material nozzle component. This enables a structurally simple design of the securing means and/or of the paint channel.

The connection between the front and rear needles may also be located axially outside of the material-carrying region of the paint spray gun. As a result, the sliding bearing can be kept free of influence by the material to be atomized. Such an embodiment is particularly advantageous in a high-pressure paint spray gun in which the material to be atomized is under high pressure. This can be, for example, a conventional high-pressure paint spray gun or an air-assisted high-pressure paint spray gun in which a combination of airless atomization and air atomization of the material to be sprayed takes place, and the material is supplied to the paint spray gun with an inlet pressure of usually between 30 and 100 bar, but in extreme cases also with up to 250 bar, and the paint jet created by the atomization is formed with additional air flows.

In the embodiment of a high-pressure paint spray gun having a connection between the front needle and the rear needle arranged behind the material-carrying region, a front end of the rear needle can be designed as a fork having at least one latching means projection which extends in the radial direction from the outside to the inside and engages in a corresponding latching recess designed as a groove, especially an annular groove of the front needle, or vice versa. A region that can be elastically deflected in the radial direction for the releasable connection can thus advantageously be arranged in the rear needle, which region in this embodiment is free of influences of the high-pressure material dispensing. As a result, a connection with high rigidity to withstand axial forces operative during material dispensing, for example, and/or radially acting deflection forces can be achieved, which leads to a better spray pattern.

In this case, a “fork” is understood to mean a device on the rear needle which engages in at least two radially or circumferentially different positions in the latching recess of the front needle, and thus causes the front needle to be centered with respect to the rear needle.

In an expedient embodiment of the invention, a first part of the material needle is made of a metallic material and a second part of the material needle is made, at least in regions, from a non-metallic material, preferably a plastic or a ceramic. By means of a technically advantageous choice of the materials, the connection can be designed to be dimensionally stable, whereas the properties of the contact surfaces can be produced with regard to a minimal friction material pair between the channel and the contact surface. Likewise, a needle tip forming the valve seat can also be manufactured from a material that is advantageous for sealing the nozzle opening without exerting adverse influences on the contact surface or the sliding bearing and/or the connection between the front and rear needles.

In particular, the material of the needle tip can be formed from a wear-resistant ceramic. The contact surfaces can be made from an abrasion-resistant plastic such as polyamide (PA6). In addition, the contact surfaces of the connection of the front and the rear needle can consist of a low-friction material, such as a polyamide-polyamide compound. The wall of the channel is preferably made of a harder material than the contact surfaces of the material needle so that wear phenomena primarily occur on the contact surfaces of the exchangeable material needle and not on the wall of the channel.

Another object of the invention is a material needle for a paint spray gun, in particular for a paint spray gun according to any of the preceding embodiments, in which the material needle extends along an axial direction and has at least one front needle and one rear needle which can be releasably connected together via a quick-acting connection, wherein the front needle can be released from the rear needle in a maintenance state, while the rear needle can remain in the paint spray gun.

The front needle has at least one contact surface which, in the operating state, rests against a wall of a surrounding channel of the paint spray gun, as a result of which the contact surface and the channel form a sliding bearing.

The front needle expediently has a cylindrical main body and comprises at least one contact surface projection projecting from the main body in the radial direction on which projection the contact surface is formed.

Particularly advantageously, the front needle has a latching means projection, preferably in the form of a convex bulge, which extends in the radial direction from the outside to the inside into an open connection space within the front needle. An open connection space is to be understood here as an open space of the front needle which has a recess to receive a part of the rear needle. The open space can e.g., be completely closed or have gaps or recesses extending in the longitudinal direction.

Alternatively or additionally, the rear needle can have a preferably concave notch running along the circumference, which notch is equipped with a latching means projection of the front needle to form a form-fitting connection.

A connection between the front needle and the rear needle can be realized, for example, by the front needle and the rear needle overlapping in a connection region, wherein the front needle surrounds a portion of the rear needle, or the rear needle surrounds a portion of the front needle.

In order to produce a stable connection between the front needle and the rear needle, the connection region is preferably larger in the axial direction than twice the diameter of the front needle, preferably larger than four times the diameter of the front needle. The connection region is thus longer than the material needle diameter. The material needle diameter is to be understood as the smallest diameter of the front needle over the entire length of the front needle, except for the needle tip.

The invention furthermore relates to an exchangeable front needle of a multipart material needle. The front needle can in particular be part of the above-described material needle and part of the above-described paint spray gun. The front needle extends in an axial direction and has quick-acting connection means, in particular in the form of latching elements, for forming a connection, which is releasable in the axial direction, with a second part of the material needle, especially a rear needle. The front needle comprises a cylindrical main body and at least one contact surface projection projecting in the radial direction from the main body and having a radially outer contact surface for contact with a wall of a channel of a paint spray gun.

Expediently, the contact surface on the contact surface projection of the front needle is designed such that, in an operating state of a paint spray gun into which the multipart material needle is inserted, it can come to rest against a wall of the paint spray gun surrounding a channel in order to form a sliding bearing in interaction with the wall in the axial direction. If the front needle comprises a plurality of contact surface projections with associated contact surfaces, a radial position of the front needle and in particular a centering in the channel of the paint spray gun can be precisely set.

If the front needle is arranged in a material-carrying region, especially a paint channel, of the paint spray gun, the front needle advantageously has through-flow gaps through which a coating material, such as paint, can flow in the axial direction. The through-flow gaps are expediently arranged at the height of the contact surface projection. As a result, the contact surface projection does not form a substantial narrowing or even a closure of the channel.

The contact surface projection can, for example, be designed in a wing-like manner. However, the contact surface projection can also be designed in the form of a circular disk arranged around the main body of the front needle and projecting radially from the main body with openings forming flow gaps. A wing-like design of the contact surface projection has the advantage that a wing represents only minor flow obstacles. A circular disk-shaped design allows exact centering of the front needle in the channel.

In an expedient embodiment, the front needle has at least one axially accessible and open connection space for receiving a part of the rear needle, wherein the connection space extends from an axially rear end of the front needle along the axial direction into the interior of the front needle. A portion of a rear needle for forming the releasable connection between the front needle and the rear needle can be inserted into the connection space in the axial direction.

The front needle advantageously comprises quick-acting connection means, such as at least one latching means projection which extends radially from the outside into the interior of the connection space and serves to receive the second part of the material needle, in particular the front part of a rear needle, and to fix it in the connection space.

The latching means projection can have a convex bulge which extends into the interior of the connection space. By virtue of the bulge, an axially precise and play-free fixing of the latching means projection or the front needle with respect to the rear needle can be achieved.

To achieve a coaxial alignment of the front needle and the rear needle, the front needle can have a guide region for guiding a part of the rear needle. For forming the guide region, for example, the connection space for receiving a part of the rear needle can be closed circumferentially at least over a predetermined length of the front needle. The guide region is thereby designed like a sleeve. The guide region thereby forms a tilting bearing for the rear needle, which prevents tilting of the front needle relative to the rear needle.

The guide region is preferably arranged in the region of a connecting end, i.e., at an axially rear end of the front needle, in which the front needle and the rear needle overlap. The guide region is preferably arranged axially behind the contact surface projection.

The quick-acting connection means for connecting the front needle to the rear needle can be arranged at the axial height of the guide region. However, the quick-acting connection means are preferably spaced apart from the connecting end so that the guide region extends over a first portion of the front needle which is located axially to the rear and to which the connection space is axially connected via a second axial portion in which the quick-acting connection means are arranged.

The quick-acting connection means, which in particular comprise latching elements, can enter into a form-fitting and/or frictional connection with a second part of the material needle, in particular with the rear needle.

The front needle can advantageously be made, at least in regions, from plastic and especially as an injection molded part in an injection molding process. The front needle can be made of a first material which differs from a second material of the second part of the material needle, in particular of the rear needle. The second part of the material needle can be manufactured, for example, from a metallic or ceramic material in an ablating process, a sintering process or by means of an injection molding process. As a result, the requirements for a different service life of the parts of the material needle, i.e., of the front needle and the rear needle, can be taken into account.

In an advantageous embodiment, the connection space of the front needle has a recess on a longitudinal side (longitudinal connection space side), for example in the form of a longitudinal opening which extends along the front needle at least over a certain length in the axial direction. The elasticity of the quick-acting connection means, in particular the radial deflectability of the connection space in which the quick-acting connection means are arranged, can thereby be increased. As a result, prestressing forces acting in the releasable connection, which arise when the rear needle is inserted into the connection space, can be set in a targeted manner, for example.

The front needle preferably has a plurality of contact surface projections with contact surfaces molded thereon, wherein these are preferably arranged at diametrically opposite points in the circumferential direction of the front needle. The radial position of the front needle in the channel of the paint spray gun can thereby be precisely fixed.

The or each contact surface projection comprises at least one contact surface. The or each contact surface is advantageously arranged on a radial outer surface of one of the contact surface projections, wherein the contact surface projections extend away from a cylindrical main body of the front needle in the radial direction.

It is particularly advantageous if the channel is hollow-cylindrical and closed in the circumferential direction, i.e., forms a circumferential contact for the contact surfaces of the material needle in the circumferential direction. The entire wall of the channel thus forms a potential sliding bearing surface for the sliding bearing from the contact surface and the wall. In addition to improved centering, the material needle can thereby also be inserted into the channel in any desired radial alignment. This simplifies handling for exchanging the front needle.

The contact surface projections—as seen in longitudinal section—can have a curved and especially involute profile. As a result, the compressibility of the contact surface projections can be controlled, and stress peaks can be reduced by an improved force flow. On the one hand, this reduces the risk of crack formation in the contact surface projections, on the other hand, manufacturing tolerances for the contact surfaces can advantageously be increased.

In order to improve a position alignment of the front needle in the channel, the front needle can furthermore have a front needle stabilization device with an additional sliding bearing surface for interaction with a wall of the channel of the paint spray gun, wherein the front needle stabilization device is spaced apart from the contact surface of the contact surface projection in the axial direction. A second, axial sliding bearing can thereby be realized so that a first sliding bearing is formed by the contact of the contact surface with the channel wall, and a second sliding bearing is formed by a contact of the front needle stabilization device with the channel wall, whereby a coaxial alignment of the front needle within the channel of the paint spray gun can be ensured.

The contact surface or the contact surface in the sliding bearing between the contact surface and the wall is preferably designed to be substantially punctiform as seen in longitudinal section. In cross section, the contact surface or the contact surface is preferably substantially curved, wherein the sum of the contact surfaces in contact with the wall of the channel makes up no more than 50%, preferably no more than 25%, and especially no more than 10% of a circumference of the channel. As a result, sliding friction effects can be minimized, and undesired stick-and-slip effects can be prevented.

Particularly preferably, the contact surface projections can be designed to be elastically deformable, as a result of which when the contact surfaces abut against the wall of the channel of the paint spray gun, a resilient bracing and thereby a securing force acting on the releasable connection perpendicularly to the axial direction is created, which securing force prevents the connection from opening in operating state.

In an advantageous embodiment, the quick-acting connection means are designed as pairs of latching elements, wherein in each case two latching elements are opposite one another in the radial direction. By virtue of the pairing, tilting of the front needle in the releasable connection can be avoided or at least reduced.

The front needle preferably comprises a plurality of quick-acting connection means which are spaced apart axially from one another, in particular a plurality of axial latching elements with latching means projections. This redundancy of the quick-acting connection means can increase the reliability of the material needle, i.e., especially to prevent an unintentional release of the connection.

Advantageously, the axially spaced-apart quick-acting connection means are in each case designed in pairs, thus, for example, each have two radially opposite latching elements.

Advantageously, viewed axially, the contact surfaces are arranged between the axially spaced-apart quick-acting connection means. As a result, securing forces introduced by the contact surface, for example, can be transmitted uniformly to the axially spaced-apart quick-acting connection means.

The latching elements can have at least one convex curvature, wherein the or each convex bulge projects into a connection space formed in the front needle.

The front needle expediently has a needle tip which can form a valve seat for opening and closing a nozzle opening. The needle tip can thereby be designed integrally with the main body of the front needle. However, the needle tip can also be designed as a separate and releasably or non-releasably connected part to the main body of the front needle. The entire front needle and/or the needle tip alone is expediently formed from a wear-resistant material, in particular a metal, preferably a hard metal, an alloy or a technical ceramic. The main body of the front needle can be formed from a material different from the material of the needle tip, especially a plastic.

The needle tip is preferably integrally molded (one-piece) onto the main body of the front needle. Multi-component injection molding is possible for the production of a one-piece front needle with a needle tip which is different from the main body.

Alternatively, the needle tip can also be fastened to the main body of the front needle, e.g., glued, screwed or clipped, in an integral, frictional or form-fit.

The needle tip can be designed as a ball. It can also run in a needle-like manner to a front needle sealing end, i.e., toward the valve seat or toward the nozzle opening, in the manner of a conventional needle valve.

The invention also relates to an above-described paint spray gun having an above-described material needle, especially with an above-described exchangeable front needle.

Another object of the invention is a first method for exchanging a front needle, in particular in an above-described paint spray gun, wherein the paint spray gun can be converted between an operating state and a maintenance state.

In the operating state, the paint spray gun is assembled ready for use, wherein the front needle is releasably connected to a rear needle via a connection, and the front needle is located in a channel of the paint spray gun that extends along an axial direction. The front and rear needles are thereby jointly movable axially within a needle stroke in the channel. The front needle has a contact surface which in this operating state rests against a wall of the channel, and remains in contact with the wall of the channel over the entire needle stroke.

To exchange the front needle, the front needle is first removed, and then the same or another front needle is inserted into the channel, wherein at least the following steps are preferably carried out in this order:

a) removing an air cap or a nozzle cap of the paint spray gun,
b) and/or removing a material nozzle component,
c) gripping and removing the front needle in the axial direction and along a material dispensing direction from the channel, wherein the connection between the front needle and the rear needle is released, and the rear needle remains in the paint spray gun,
d) inserting the same or another front needle, wherein the front needle is connected to the rear needle via a connection, and the at least one contact surface of the front needle comes to rest against the wall of the channel,
e) attaching the material nozzle component, as a result of which the front needle is centered by contacting the contact surface on the wall of the channel in the material nozzle component,
f) attaching the air cap or the nozzle cap.

With steps a) and b), the paint spray gun is transferred from the operating state into the maintenance state, wherein the maintenance state is characterized in that a contact between the contact surface of the front needle and the wall of the channel is broken.

With steps e) and f), the paint spray gun is returned to the operating state in which a contact is established between the contact surface of the other front needle and the wall of the channel.

The material nozzle component can be a part of the paint spray gun at least partially comprising the channel. The channel can be part of a paint channel through which a material to be sprayed, in particular paint, is supplied to the paint spray gun and is dispensed via a nozzle opening of a material nozzle along the material dispensing direction.

The air cap or the nozzle cap can be a functional component of the paint spray gun for conducting air for the atomization of the material and/or shaping of a spray jet of the dispensed material. The air cap or the nozzle cap can, for example, be connected to a spray gun main body via a screw ring.

However, it is also conceivable and possible to connect the material nozzle component to the pistol main body in such a way that it can be removed from the spray gun main body without removing the air cap or the nozzle cap, for example by integrally forming the air and/or nozzle cap with the material nozzle component. Steps a) and f) are therefore to be understood as expedient for a method according to the invention, but only optional.

In an alternative, second method for exchanging a front needle in a paint spray gun, especially a high pressure paint spray gun, the paint spray gun comprises a material needle which is movable in the axial direction within a needle stroke in a channel, and which consists at least of a front needle releasably connected to a rear needle, wherein the replacement of the front needle comprises the establishment of a maintenance state of the paint spray gun having the following steps:

a) removing an air cap or a nozzle cap of the paint spray gun,
b) removing a material nozzle component,
c) removing a rear cover at the free end of the rear needle.

In the maintenance state, the front needle is then exchanged, which takes place by carrying out at least the following steps:

d) retracting the material needle counter to a material dispensing direction in which a coating material is discharged from the paint spray gun, thereby releasing the connection between the front needle and the rear needle,
e) gripping and removing the front needle from the paint spray gun in the material dispensing direction,
f) inserting the same or a different front needle into the paint spray gun counter to the material dispensing direction, thereby establishing a releasable connection between the front needle and the rear needle,
g) displacing the rear needle together with the front needle in the material dispensing direction back into the channel of the paint spray gun, whereby the connection is secured against opening by contacting the contact surface with a wall of the channel, wherein thereafter, the operating state is reproduced by the following steps:

h) attaching the rear cover,
i) attaching the material nozzle component and
j) attaching the air cap or the nozzle cap.

In the second method as well, the front needle has a contact surface which, in an operating state, rests against a wall of the channel, and remains in contact with the wall of the channel over the entire needle stroke. The maintenance state and the operating state are to be understood analogously to the above-mentioned definition of the first method.

Preferably, the releasable connection between the front and the rear needle in the second method is thereby secured against opening by a securing force acting substantially perpendicularly to the axial direction. This means that the front needle is prestressed radially elastically in the channel and transmits a prestressing force to the releasable connection via the contact surface.

In contrast to the first method, in the second method, the needle stroke is limited axially to the rear by the rear cover in the operating state, wherein the needle stroke, during the conversion of the paint spray gun into the maintenance state, is released to the rear by the removal of the rear cover, which allows a rearward translation of the material needle or at least a connection region of the material needle from the channel.

The channel in the second method is preferably a guide bushing for guiding the rear needle, which guide bushing lies axially behind the material-carrying channel. The channel designed as a guide bushing is thereby separated from the material-carrying channel and has an axial passage opening for the sealed passage of the front needle into the material-conveying channel.

Expediently, an opening diameter of the passage opening is smaller than a maximum diameter of the rear needle (relative to a cross section of the rear needle), so that the rear needle cannot be removed toward the front through the passage opening. An unintentional removal of the rear needle from the paint spray gun can thereby be prevented.

BRIEF DESCRIPTION OF THE DRAWINGS

The invention is described by way of example below on the basis of exemplary embodiments with reference to the drawings.

In the drawings.

DETAILED DESCRIPTION

Figure 1:
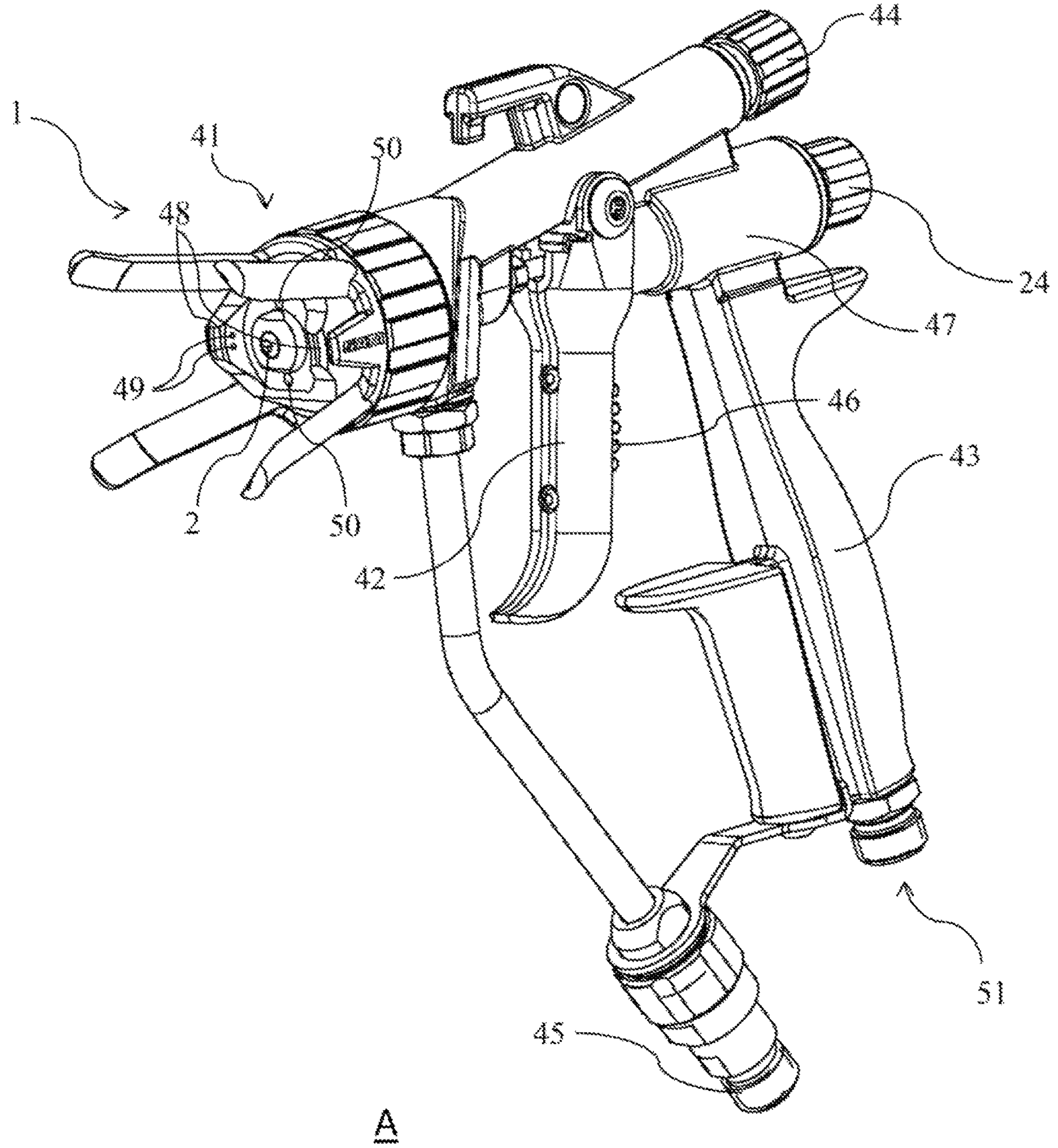
FIG. 1 shows a first paint spray gun according to the invention in a perspective view in an operating state A.

FIGS. 1 to 7 show a first embodiment of the invention. A manually guided single-axis paint spray gun 1 designed as a high-pressure paint spray gun with a compressed air connection 51 arranged on a handle 43 and a material connection 45 is shown. In an operating state A, a flow of paint, which is under a pressure of, for example, 200 bar, is fed into a channel 5 via the material connection 45 and is discharged in a material dispensing direction 10 via a nozzle opening of a material nozzle component 23 of the paint spray gun 1. In this case, the paint is atomized directly upon exiting from the nozzle opening due to pressure.

The shape of the dispensed paint jet can be set via air outlet openings of an air cap 41 designed as horn air nozzles 49 and control nozzles 50. The compressed air discharged via the air outlet openings can be regulated via adjusting screws of a spray jet shaping element 44 and a rear cover 24. The horn air nozzles 49 are arranged on air horns 48 which preferably protrude relative to the opening of the material nozzle 2.

A material needle 3 with a material needle central axis 21 along a longitudinal axis 4 of the channel is moveably mounted in the channel 5 of the paint spray gun 1 that is circular cylindrical and formed as a hollow cylinder in an axial direction 4. The longitudinal axis 4 of the channel 5 coincides with the material needle central axis 21.

Figure 2:
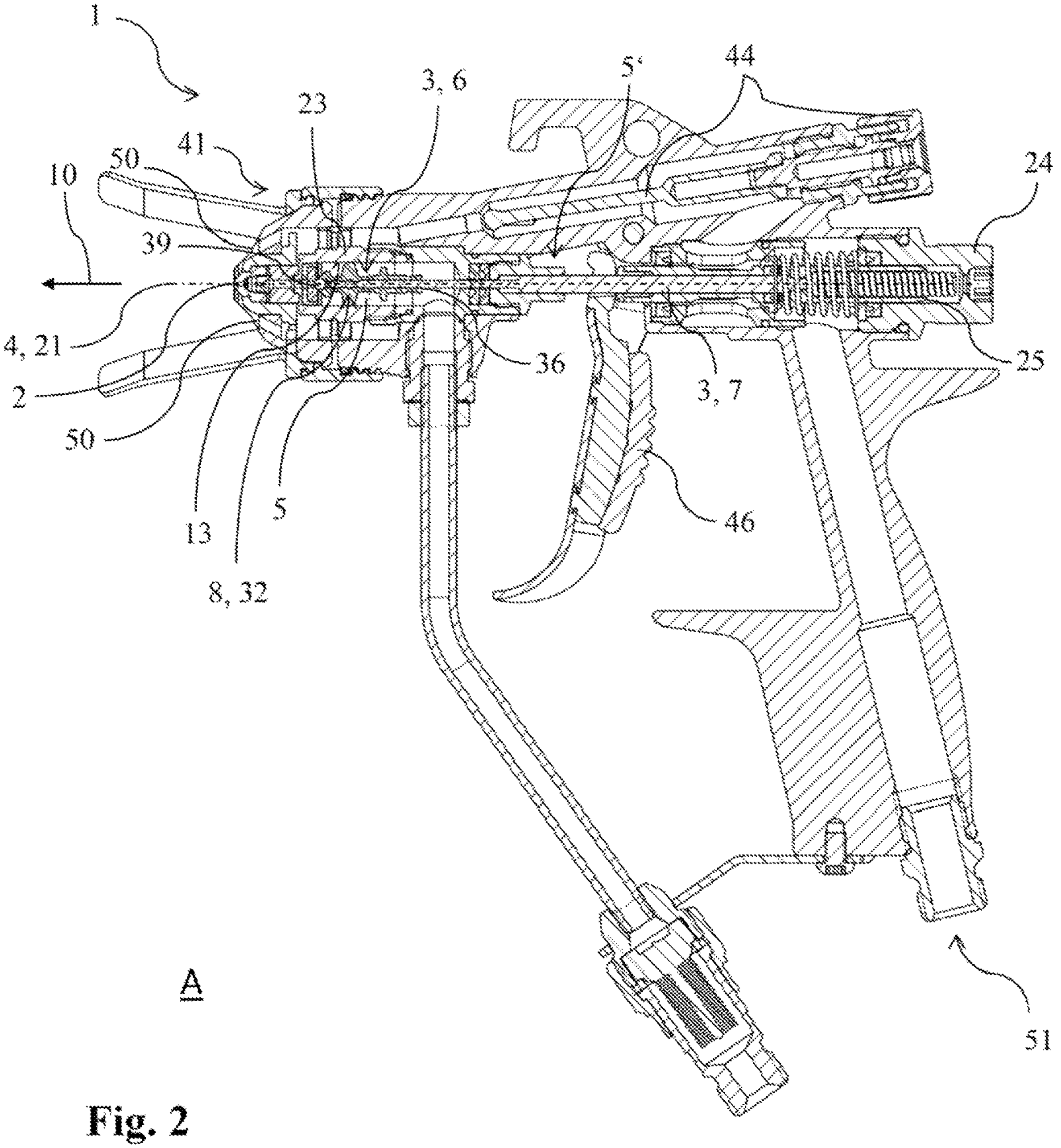
FIG. 2 shows a longitudinal section of the paint spray gun from FIG. 1.
Figure 2A:
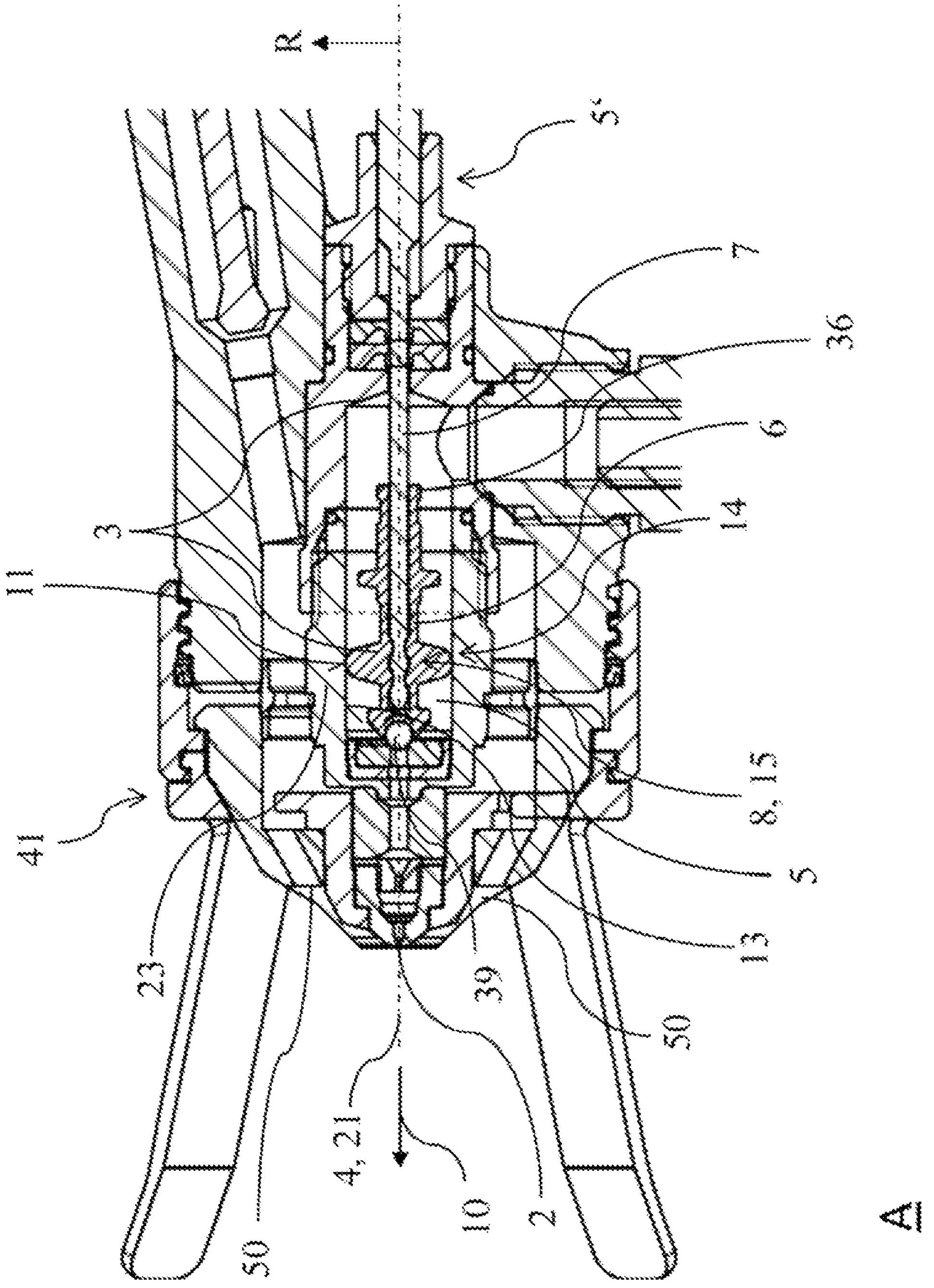
FIG. 2A shows a detail view of a front portion of the paint spray gun from FIG. 2.

In a basic state, the material needle 3 is prestressed by a restoring element designed here as a spring, as can be seen inter alia from FIG. 2, with an axial prestressing force acting in a material dispensing direction 10, and closes the material nozzle 2 or a valve seat located axially in front with a needle tip 39.

To dispense paint from the material nozzle 2 in a spraying state, a trigger 42 is manually actuated in the shown manually actuated paint spray gun 1, via which the material needle 3 is displaced axially rearward via a defined needle stroke in order to release the material nozzle 2. In the case of an automatic paint spray gun (not shown here), the axial displacement of the material needle 3 takes place by means of an external compressed air control signal or an external electrical control signal.

The material needle 3 is designed substantially in two parts with an axially front needle 6 and a rear needle 7 connected to the front needle 6 along a connection region 32. The front needle 6 and the rear needle 7 are releasably connected together in the axial direction 4 via a connection 8 shown in more detail below.

The front needle 6 has a needle tip 39 for closing the material nozzle 2 or the valve seat in the basic state, and a connection space 30 which is axially adjacent thereto for receiving an end portion of the rear needle 7 and a sleeve-shaped guide region 35 for receiving a further portion of the rear needle 7.

In this embodiment, the needle tip 39 is designed in multiple parts, in this case with a ball made of a hard metal introduced into the needle tip 39 as a separate component. The rest of the front needle 6 is made of a fiber-reinforced construction plastic. The rear needle 7 is made of a metal, a metal alloy or a ceramic with high service life properties, because removal of the rear needle 7 is complicated and is therefore to be avoided if possible.

The rear needle 7 is substantially designed as a needle shaft having a cylindrical main body and can have at the end a hollow cylindrical end piece which receives a spring element that provides the restoring force for the material needle 3.

To connect the front needle 6 to the rear needle 7, the front needle 6 is pushed onto the rear needle 7, and a releasable connection 8 is generated. The connection 8 is an axial form-fit which is formed by each interlocking quick-acting connection means attached to the front needle 6 or the rear needle 7. In the embodiment shown here, the quick-acting connection means of the rear needle 7 is in each case axially spaced, annularly grooved, concave notches 31 on the otherwise cylindrical needle shank of the rear needle 7 and act as latching recesses 22, see FIG. 4.

Figure 3:
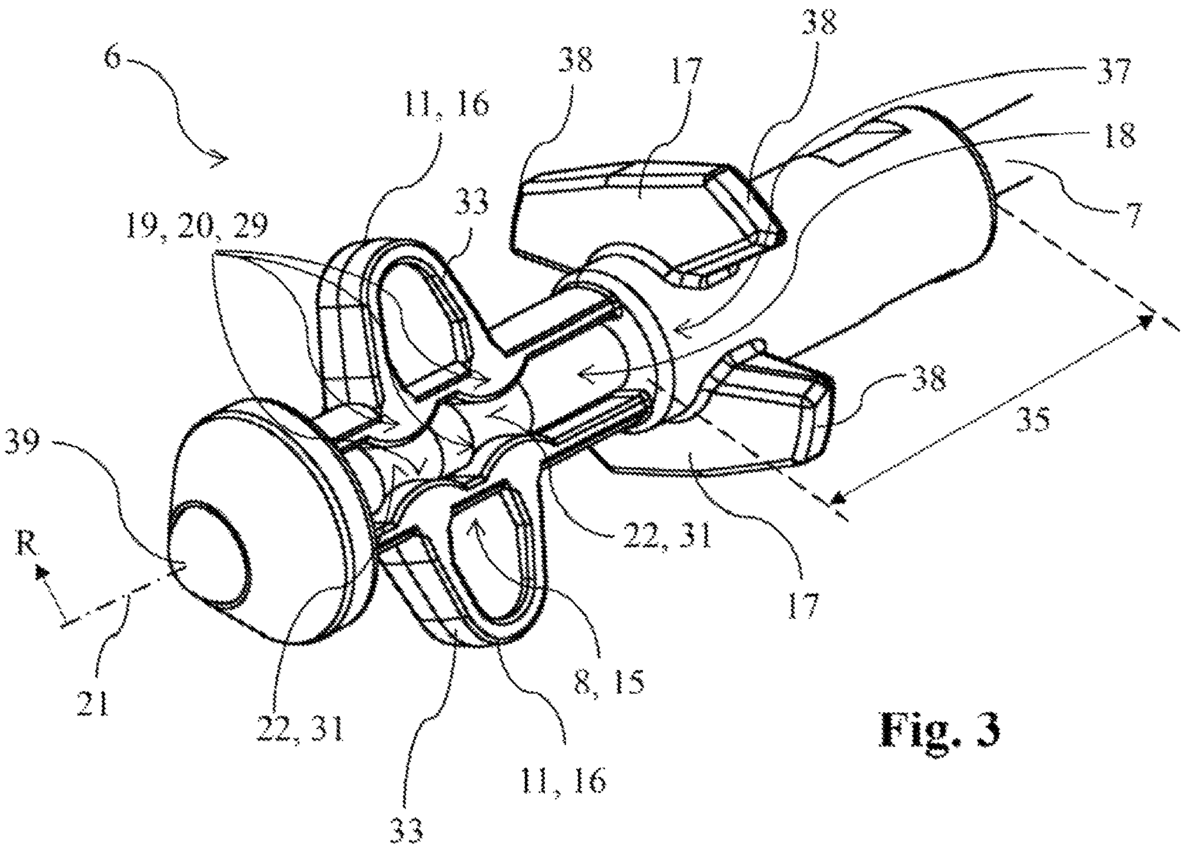
FIG. 3 shows a front detail of a material needle according to the invention of the paint spray gun from FIG. 1.

The notches 31, which serve as latching recesses 22, are each engaged by latching elements 19 of the front needle 6, which are arranged diametrically opposite one another and have a convex bulge 29 in cross-section, but do not extend over the entire circumference of the front needle 6, as can be seen from inter alia from FIG. 3. These latching elements 19 project into an inwardly open connection space 30 of the front needle 6. The latching elements 19 thus form latching means projections 20 that project radially inward. The connection space 30 and the latching elements 19 are spaced apart from one axial end, the connecting end 36 of the front needle 6.

The guide region 35 arranged axially at the connecting end 36 of the front needle 6 receives a portion of the rear needle 7, wherein a slight play is provided between the front needle 6 and the rear needle 7. A high coaxiality of the front needle 6 relative to the rear needle 7 can thereby be ensured. For this purpose, the reception can also be realized in a contacting manner via a light press fit.

Both the front needle 6 and the rear needle 7 each have two axially spaced quick-acting connection means, namely the two latching recesses 22 or notches 31 of the rear needle 7 or, in total, two times two latching means projections 20. This also makes it possible to improve the coaxiality of the front needle 6 relative to the rear needle 7.

Because the quick-acting connection means, i.e., the latching recess 22 of the notch 31 of the rear needle 7 or the latching means projections 20 of the front needle 6, are designed to be correspondingly concave or convex to each other, the quick-acting connection means form a force converter which causes tensile forces applied in the axial direction to change to radial deflection forces for decoupling the quick-acting connection means. The form-fit designed in this way is thus not designed to be self-locking or releasable in the axial direction, but is nevertheless free of play when correspondingly secured in the axial direction.

The form-fit can be produced by axially pushing the front needle 6 onto the rear needle 7 and can be released by axially pulling the front needle 6 off the rear needle 7.

In order to facilitate pulling the front needle 6 off the rear needle 7, the connection space 30 is designed to be open at least in regions on its connection space longitudinal sides 37 with a recess designed here as a longitudinal opening 18. As a result, the connection space 30 in the connection region 32 with the latching elements 19 arranged therein can be radially widened with little effort. This reduces the necessary pulling forces for releasing the releasable connection 8.

A centering of the material needle 3 in the channel 5 carrying paint under high pressure here is also achieved by a double mounting of the front needle 6 on the wall 13 of the channel 5 by the following active surface pairs:

In the connection region 32, two diametrically opposite contact surfaces 11 are provided which are located on the outer circumference of contact surface projections 33, wherein the contact surface projections 33 form a first sliding bearing 14 extending radially away from the substantially cylindrical main body of the front needle and in contact with the wall 13 of the material-carrying channel 5. The contact surfaces 11 are circumferentially spaced and are located here at circumferentially two different contact positions 16.

Figure 5A:
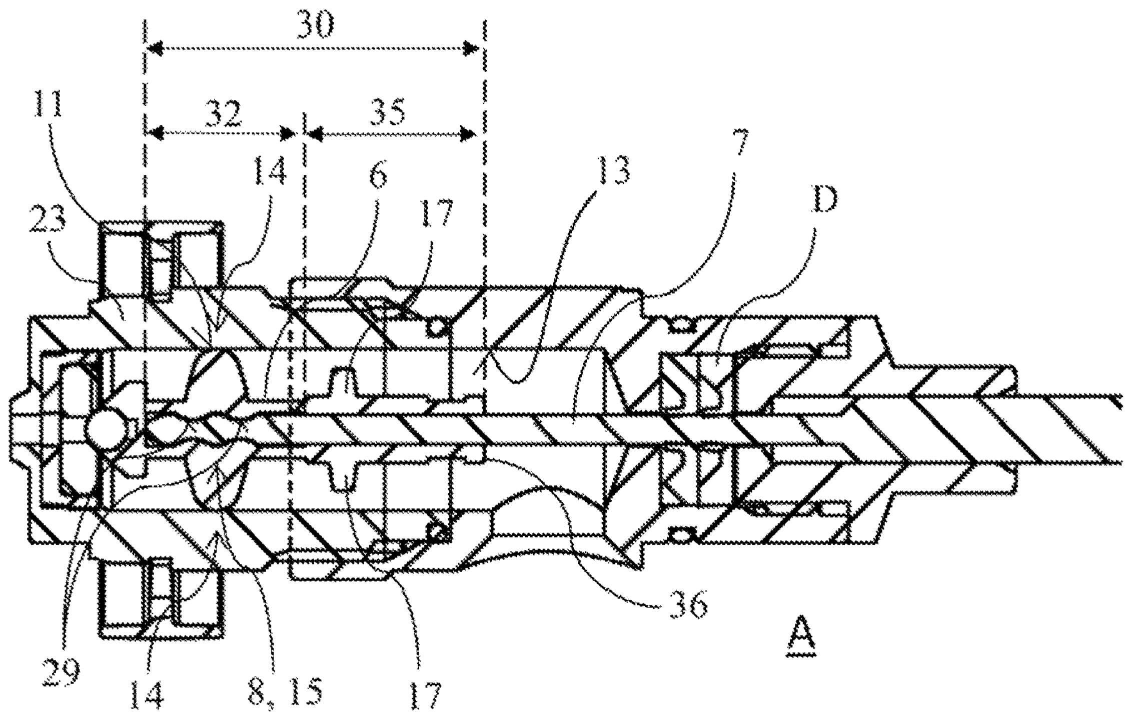
FIG. 5A shows a longitudinal section through a channel of the paint spray gun from FIG. 1 in the operating state A.
Figure 5B:
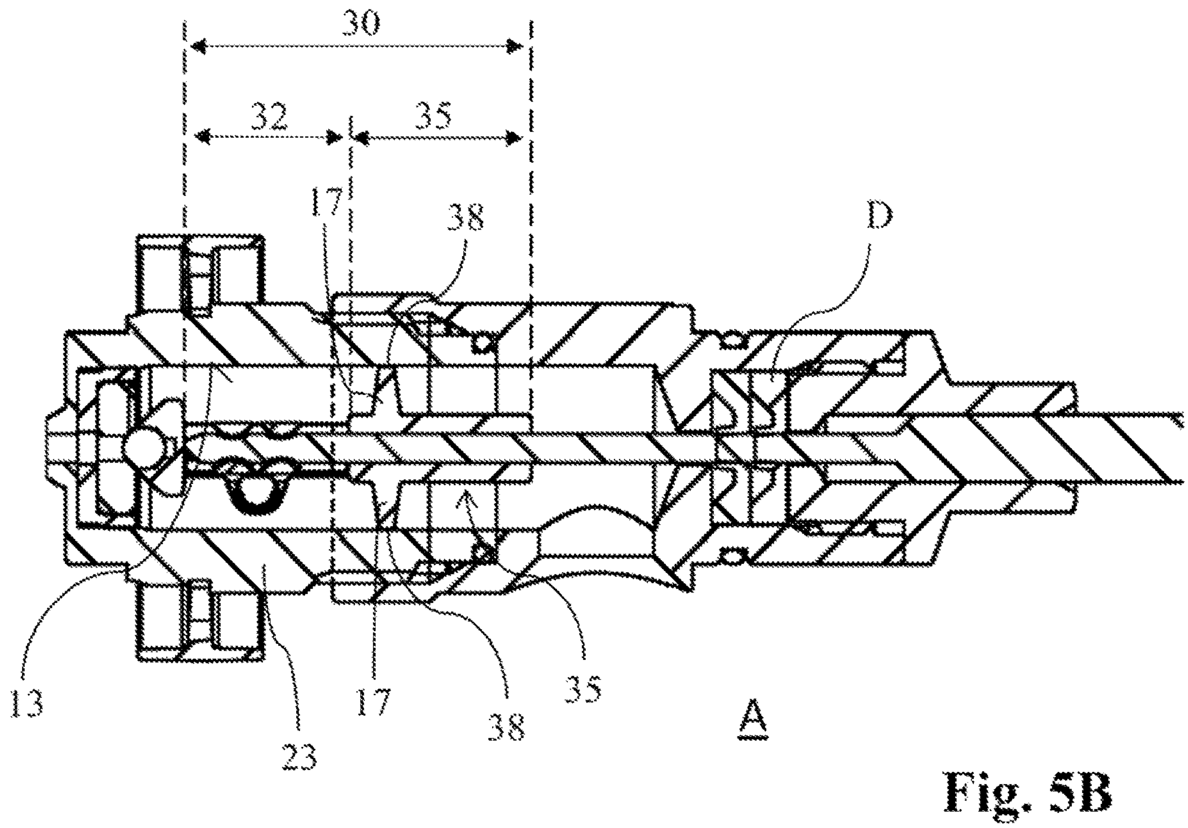
FIG. 5B shows a longitudinal section rotated 45° relative to FIG. 5A.

Two radially projecting projections, which are referred to as the front needle stabilization device 17, with two end-side sliding surfaces, each of which forms a second sliding bearing 38 in conjunction with the wall 13 of the channel 5, are arranged axially at a distance from the first sliding bearing 14 and preferably arranged on the guide region 35. The front needle stabilizing devices 17 are also circumferentially spaced apart from one another and in particular form four independent contact positions. In this case, the front needle stabilizing devices 17 are arranged opposite the contact surface 11 of the contact surface projections 33 at a different angular position in the circumferential direction. This angular position is rotated (approximately) 45° relative to a radial position (radial direction R) of the contact surfaces 11. As a result, the front needle 6 is non-tiltably mounted in the channel 5. A corresponding contact between one of the contact surfaces 11 and the wall 13 of the guide channel 5 is shown in FIG. 5A, and a corresponding contact between a front needle stabilization device 17 and the wall 13 is apparent from FIG. 5B. FIG. 5B shows a longitudinal section rotated 45° with respect to FIG. 5A.

The contact surfaces 11 thus support the front needle 6 at a first position, and the front needle stabilizing devices 17 support the front needle 6 at a second position. The first sliding bearing 14 in combination with the second sliding bearing 38 thus form an anti-tilting device for the material needle 3, which prevents the front needle 6 from tilting into the channel 5. The first sliding bearing 14 and the second sliding bearing 38 are therefore also to be understood as first and second tilting bearings.

This bearing leads to a precise centering of the front needle 6 in the material nozzle 2, which prevents the material from flowing out of the material nozzle 2 on one side. A slower and especially more uniform wear of the front needle 6, and thus a longer service life of the front needle 6, is also ensured.

In addition to the concentric alignment of the front needle 6 in the guide channel 5, the sliding bearing 14 also assumes the function of a securing means for securing the axial form-fit between the front needle 6 and the rear needle 7. Because the contact surface projections 33 are arranged at the level of the quick-acting connection means designed as latching elements 19, they prevent a radial deflection of the front needle-specific latching elements 19 or a widening of the connection space 30 in the connection region 32 and thus a release of the connection 8 designed as an axial form-fit. The form-fit between the latching elements 19 can therefore not be released as long as the contact surfaces 11 rest against the wall 13 of the channel 5.

Furthermore, a securing force acting radially inward is also exerted on the connection 8 via the contact surfaces 11. For this purpose, the diameter of the front needle 6 at the point of the contact surface 11 is only slightly smaller than the diameter of the receiving channel 5. Likewise, the front needle 6 can be slightly larger in diameter than the channel 5 receiving the front needle 6, so that the front needle 6 is radially compressed when inserted into the channel and is thereby braced or prestressed.

Figure 6:
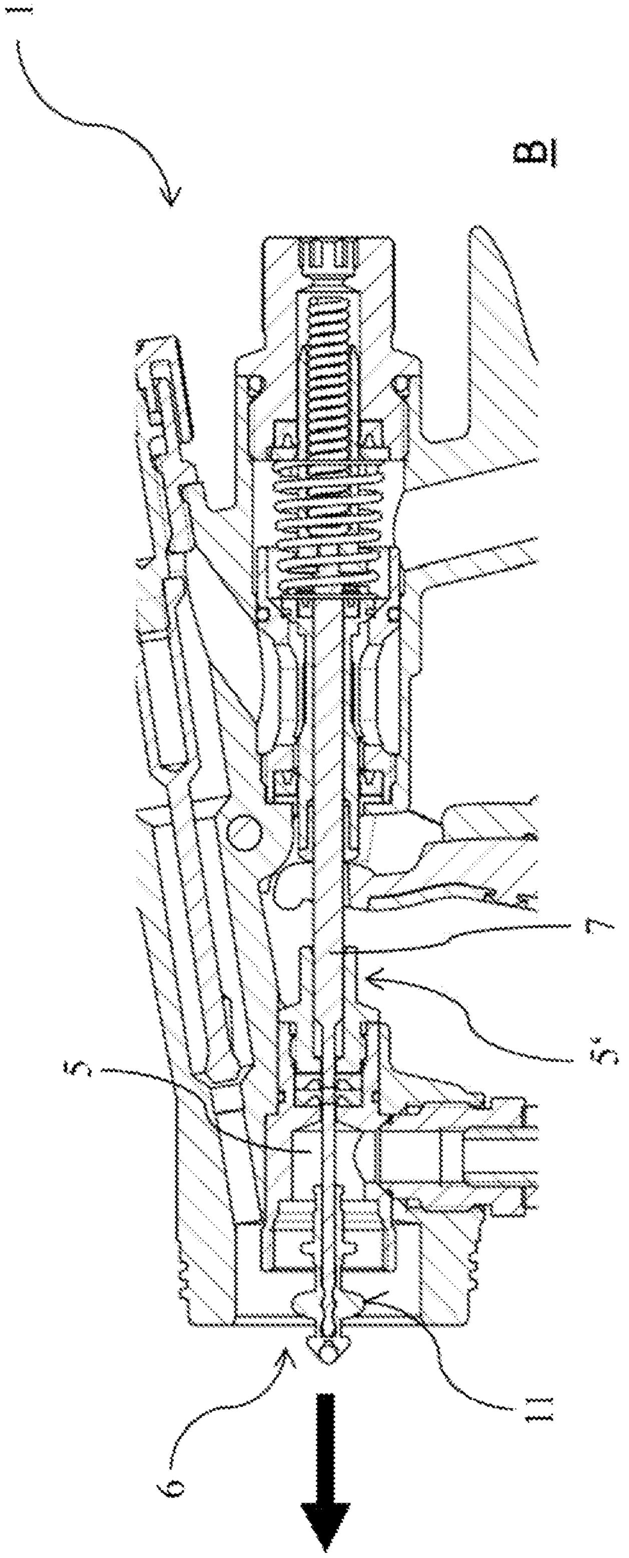
FIG. 6 shows a detail of the longitudinal section according to FIG. 2 without an air cap and material nozzle component in a maintenance state B of the paint spray gun.
Figure 7:
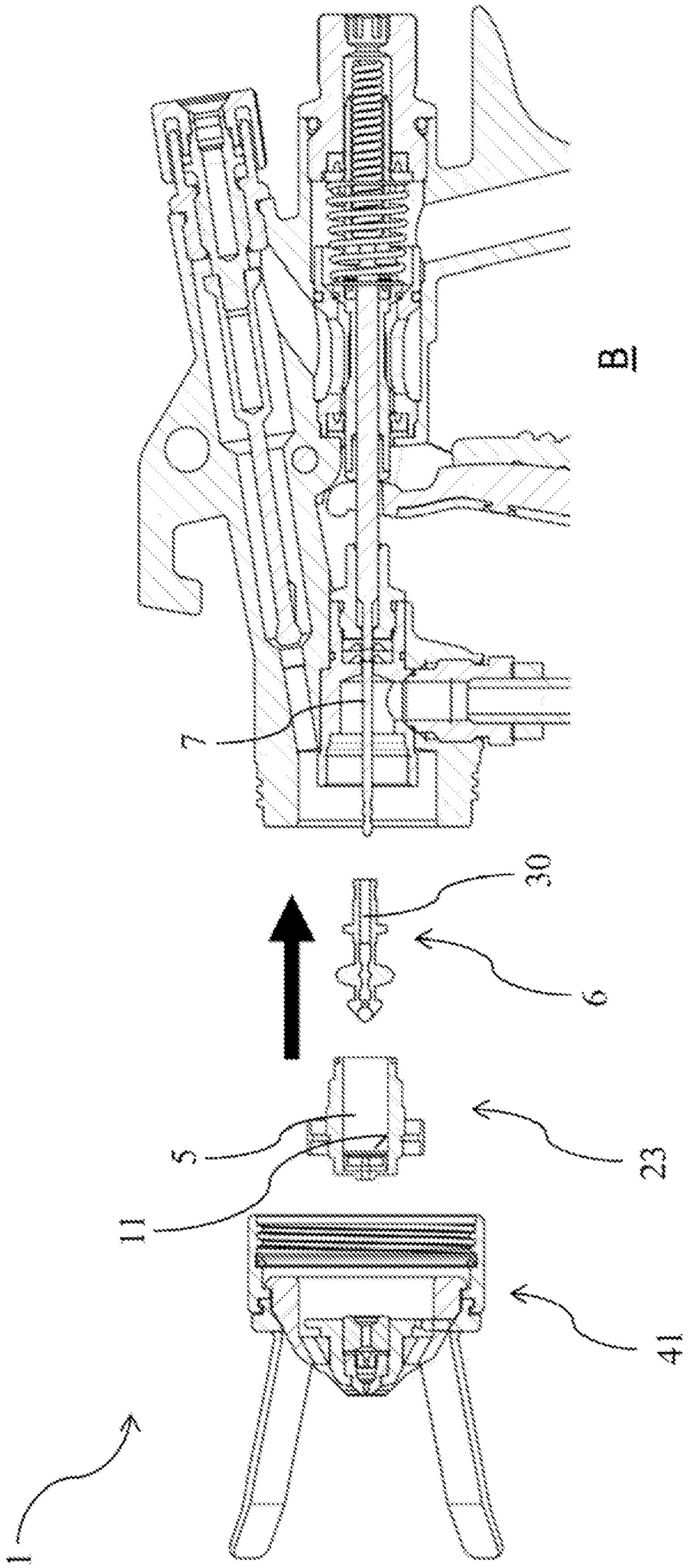
FIG. 7 shows a representation analogous to FIG. 6 with a new front needle and an air cap to be placed and a material nozzle component.
Figure 8:
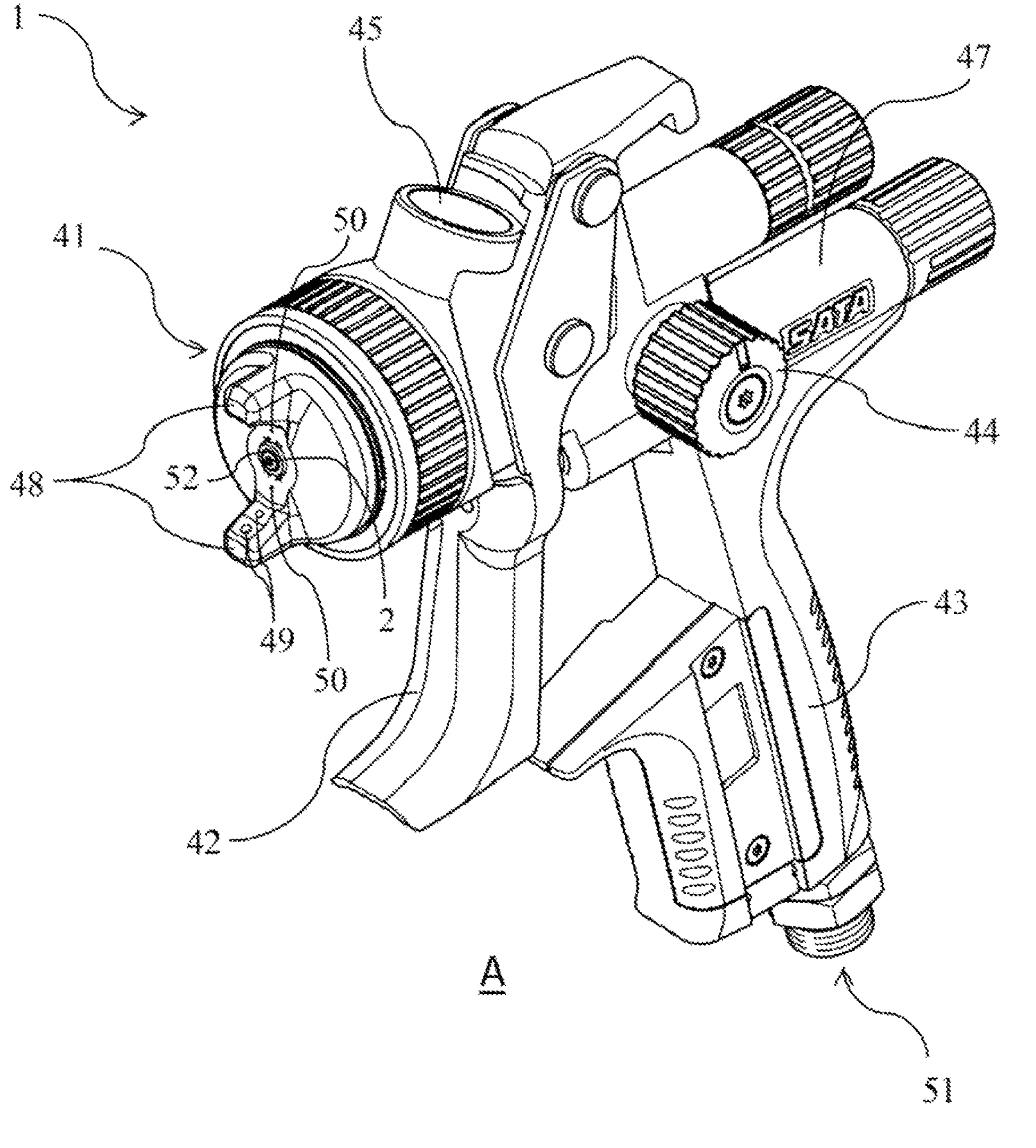
FIG. 8 shows a second paint spray gun according to the invention in a perspective view in an operating state A.
Figure 9:
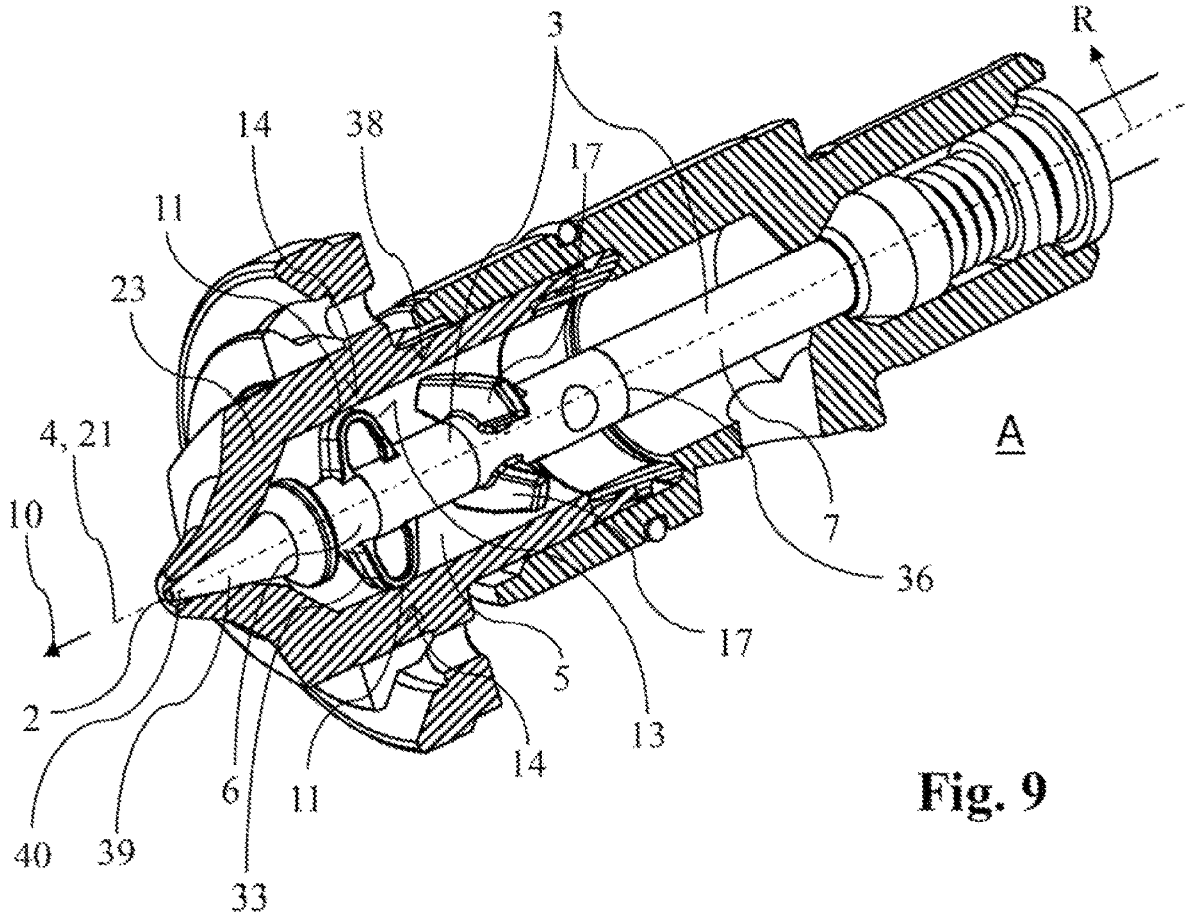
FIG. 9 shows a perspective view of a channel according to FIG. 8 and material needle inserted therein.

In order to exchange the front needle 6, the paint spray gun 1 is transferred from an operating state A into the maintenance state B shown in FIG. 6.

The maintenance state B can thereby be defined as that state of the paint spray gun 1 in which the contact between the contact surface 11 and the wall 13 is released. In contrast thereto, an operating state A can be defined as a state of the paint spray gun 1 in which the paint spray gun 1 is usable for dispensing paint from the nozzle opening of the material nozzle 2, and in which in particular the contact surface 11 and the wall 13 of the channel 5 are in touching contact.

To exchange the front needle 6 for the same or a different front needle 6, 6*a*, the maintenance state B is first established. This takes place in a first step by removing an air cap 41 of the paint spray gun 1. A material nozzle component 23 can then be removed from the spray gun body 47 of the paint spray gun 1 axially forward in the material dispensing direction 10. The material nozzle component 23 forms a part of the channel 5 so that, after removal of the material nozzle component 23, at least the first sliding bearing 14 is eliminated. In the present embodiment, the material nozzle component 23 extends counter to the material dispensing direction 10 up to behind the second sliding bearing 38, whereby the second sliding bearing 38 is also eliminated by the removal of the material nozzle component.

In the now established maintenance state B, the contact surface 11 does not rest further against the wall 13 of the channel 5, as a result of which the axial form-fit between the front needle 6 and the rear needle 7 no longer secures, so that the front needle 6 can be pulled off of the rear needle 7 by axial pulling toward the front in the material dispensing direction 10 (in the drawing plane to the left) with radially elastic deflection of the latching means 19 of the front needle 6. The removed front needle 6 can now be cleaned or exchanged with a new front needle 6, 6*a*. The same front needle or a new front needle 6, 6*a* can now be pushed onto the rear needle 7 until the latching elements 19, 20, 22, 28, 29, 31 of the front and rear needle 6 or 7 engage in one another, and the axial form-fit is produced between the same or a new front needle 6, 6*a* and the rear needle 7 remaining in the channel 5. Subsequently, the material nozzle component 23 and then the air cap 41 are first mounted again on the paint spray gun 1 or the spray gun body 47 of the paint spray gun 1.

The rear needle 7 can remain in the paint spray gun 1 during the exchange and need not be released, loosened or otherwise removed from the paint spray gun 1.

A corresponding embodiment of the paint spray gun 1 makes possible a faster, simpler, and above all tool-free exchange of a worn front needle 6 or cleaning of a soiled front needle 6.

The rear needle 7 is mounted circumferentially over the entire circumference of the needle shank of the rear needle 7 via a guide bushing 5' located axially behind the material-carrying channel 5. The guide bushing 5' is sealed relative to the material-carrying channel 5 via sealing elements D. The radial position of the rear needle 7 is precisely established via the guide bushing 5'.

FIGS. 8 to 12 show a second embodiment of the invention.

Insofar as identical or similar components are also provided with the same or similar reference signs for the second and the subsequent embodiment variants of the invention, reference is made in principle to the preceding statements, and only the essential differences are highlighted and explained.

The paint spray gun 1 shown in the second embodiment is a two-axis low-pressure paint spray gun in a paint flow cup variant, in which paint can be introduced into the paint channel 5 also formed by the material nozzle component 23 under gravity via a paint flow cup which is attachable to the material connection 45, and can be sprayed via the material nozzle 2 or the nozzle opening thereof. Alternatively to the paint flow cup, an extraction cup can be provided in which the material container is located substantially under the paint spray gun 1, wherein the material is conveyed into the paint spray gun 1 by means of negative pressure and a suction tube. In contrast to the high-pressure spray gun of the first embodiment, the paint here is not fed into the material-carrying channel 5 under pressure and atomized under pressure. The atomization of the material to be atomized takes place here via a separate air flow, so-called atomizer air, which exits close to the nozzle opening via an annular gap 52 surrounding the material nozzle 2 and entrains and atomizes the material to be sprayed from the material-carrying channel 5. In addition, horn air nozzles 49 and control nozzles 50 are provided, wherein the horn air nozzles 49 serve to selectively form a flat material jet from a substantially round material jet. The control nozzles 50 also serve to form the material jet and support the forward movement of the atomized material in the material dispensing direction 10. However, a corresponding embodiment can also be used in high-pressure paint spray guns.

Figure 10:
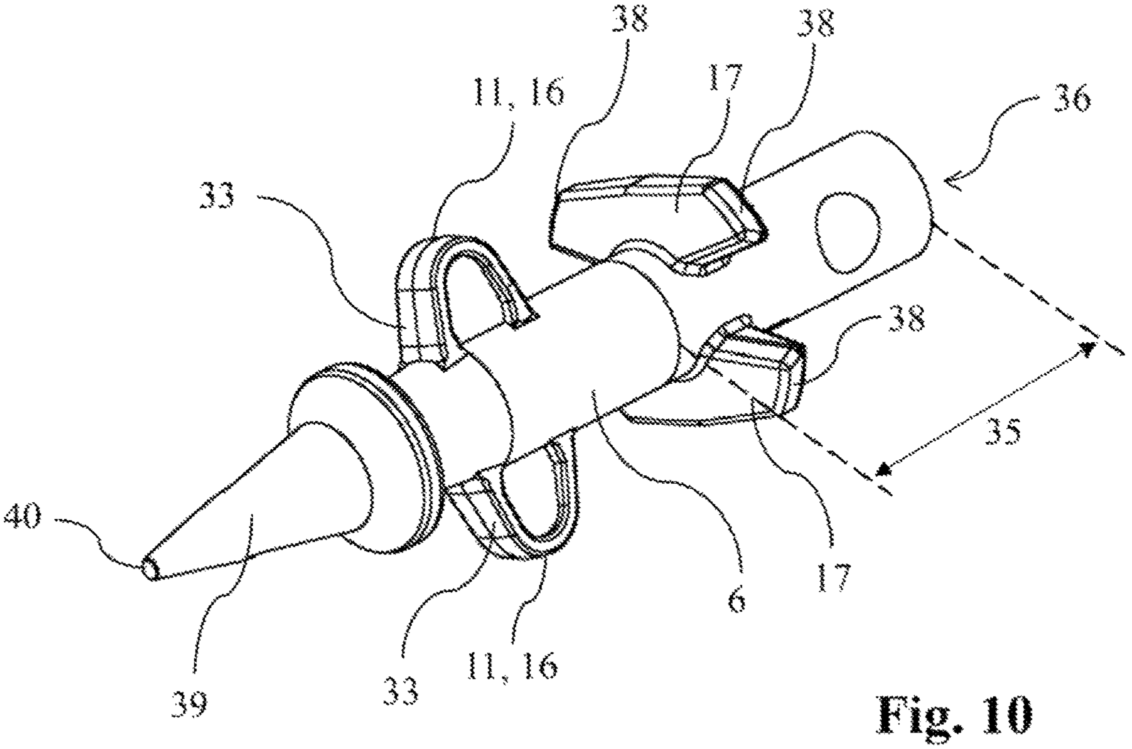
FIG. 10 shows a front needle of the paint spray gun according to the invention from FIG. 8.

In addition to the different design of the material connection 45 for the material supply through the material nozzle 2 and the compressed air distribution, the second embodiment differs furthermore via air outlet openings arranged and designed differently and with regard to a valve seat and a needle tip 39 forming the valve head, which in this case is needle-shaped, i.e., with a conically tapering end, and integrally formed with the cylindrical main body of the front needle 6, as shown in particular in FIG. 10.

A further difference relates to the embodiment of the connection space of the front needle 6 between the needle tip 39 and the guide region 35, which—in contrast to the first embodiment, in particular in the connection region 32, is not laterally open at its connection space longitudinal sides 37—but instead is designed to be closed circumferentially, so that the front needle 6 has substantially a continuous sleeve-like shape from the axial rear end 36 up to the needle tip 39, wherein a plurality of contact surfaces 11 on radially protruding and wing-like contact surface projections 33 are molded onto the connection space 30 of the front needle 6 analogously to the first embodiment. Analogous to the first embodiment, quick-acting connection means 19, 20, which can only be seen in the figures with longitudinal sections, are molded onto the inside of the connection chamber 30, pointing radially inwards.

Due to the closed configuration of the connection space 30, the radial elasticity and thus the deflectability of the latching element 19 of the front needle 6, i.e., the latching means projections 20, is reduced and made stiffer compared to the first embodiment, so that higher axial forces are necessary for the release of the axial form-fit. Likewise, the connection space 30 can also have one or more openings 18 similar to embodiments 1 and 3.

Figure 4:
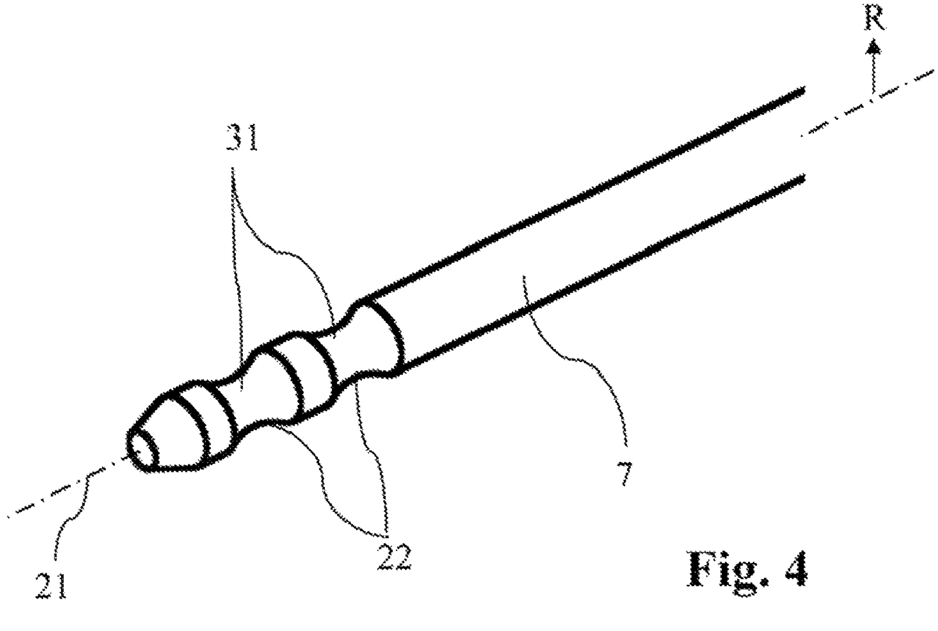
FIG. 4 shows a front detail of a rear needle of the paint spray gun from FIG. 1.
Figure 13:
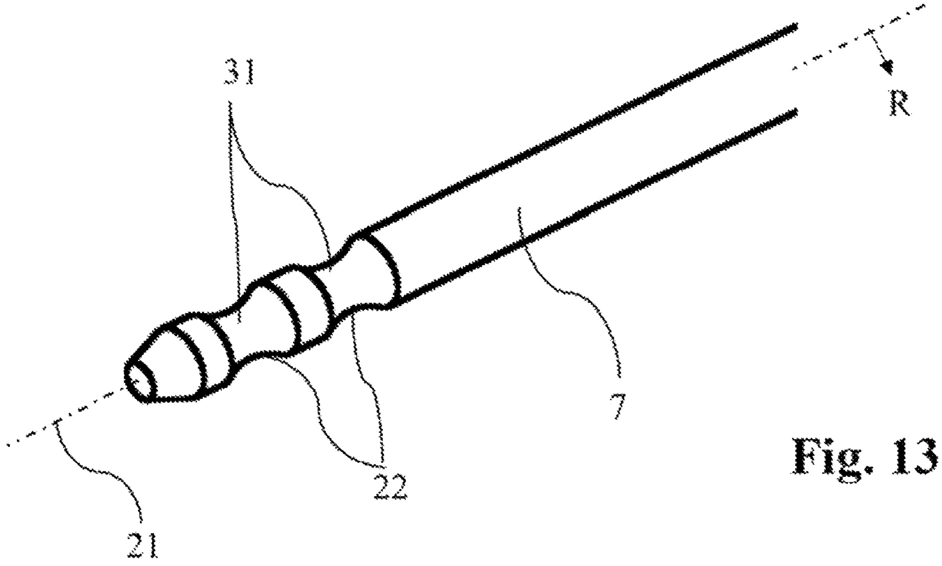
FIG. 13 shows a rear needle for the paint spray gun from FIG. 8.

The rear needle 7 of the second embodiment shown in FIG. 13 is designed to be similar to the first embodiment at least in the front half in the dispensing direction, i.e., analogous to FIG. 4.

Figure 11:
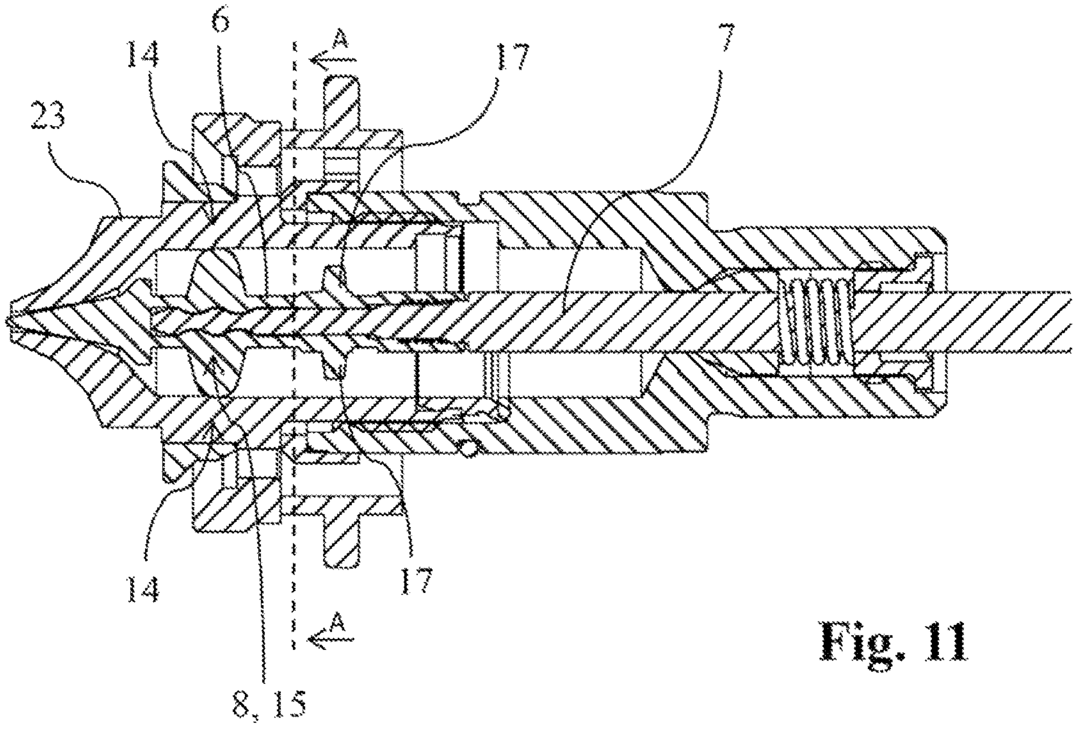
FIG. 11 shows a longitudinal section in accordance with FIG. 9.
Figure 12:
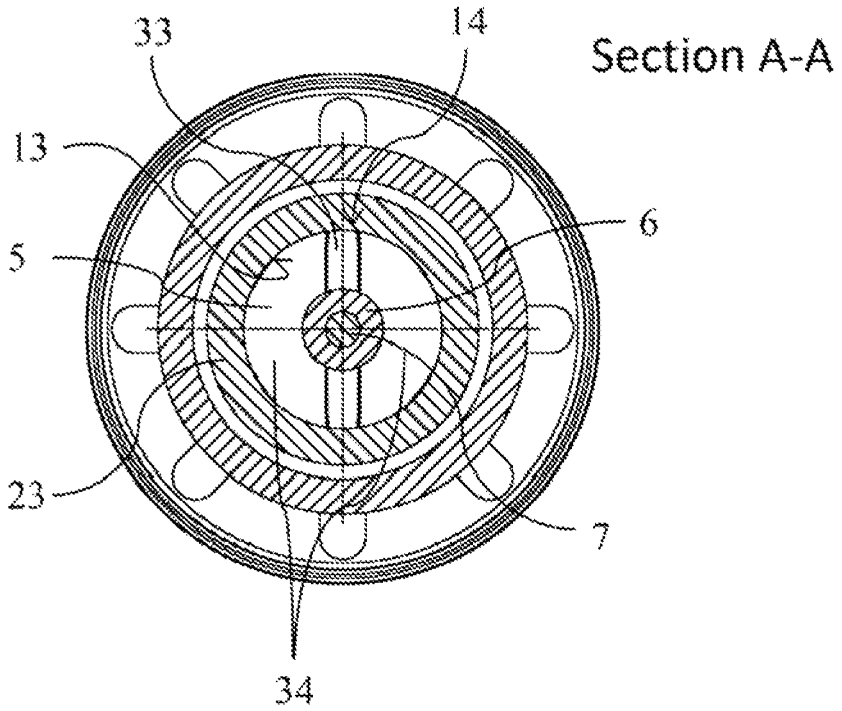
FIG. 12 shows a cross section through the paint channel according to section A-A from FIG. 11.

The design according to the cross section of the material needle 3 mounted in the channel 5 and in particular the arrangement of the contact surface projections 33 with the contact surfaces 11 can be seen in the cross-sectional view of FIG. 12 according to section A-A from FIG. 11. It can be seen in particular that the contact surface projections 33 do not extend circumferentially over the entire circumference of the channel 5, but rest only sectionally against the wall 13 of the channel 5, in this case approximately over an angular range of a few degrees. The front needle 6 thus has through-flow gaps 34 in the region of the contact surface projections 33. A material can thereby flow approximately unhindered to the side past the contact surface projections 33.

However, the functioning of the individual functional elements, and in particular the radial guidance of the front needle 6 via a first and a second sliding bearing 14 or 38, and the securing of the axial form-fit of the connection 8 in operating state A (FIG. 11) via the first sliding bearing 14 between the wall 13 of the channel 5 and the contact surfaces 11 of the contact surface projections 33 are comparable. Here too, an exchange of the front needle 6 by removing an air cap 41 and the material nozzle component 23 in the axial direction, an exchange of the front needle 6 and a subsequent re-application of the air cap 41 and the material nozzle component 23 are possible.

However, instead of a front needle 6 having two contact surface projections 33, it is also conceivable to provide any other preferably radially symmetrical arrangement of a plurality of, and especially exactly three contact surface projections 33, each with a contact surface 11.

Figure 14:
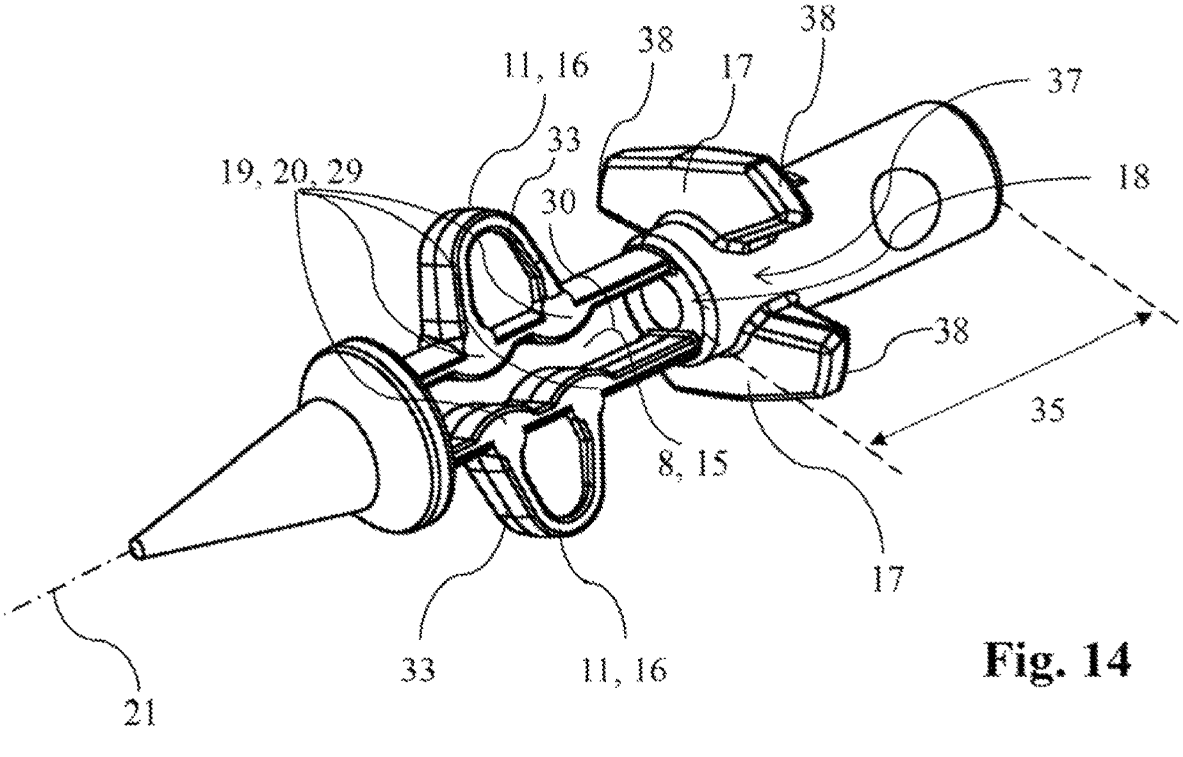
FIG. 14 shows an alternative front needle for the paint spray gun from FIG. 8.
Figure 15:
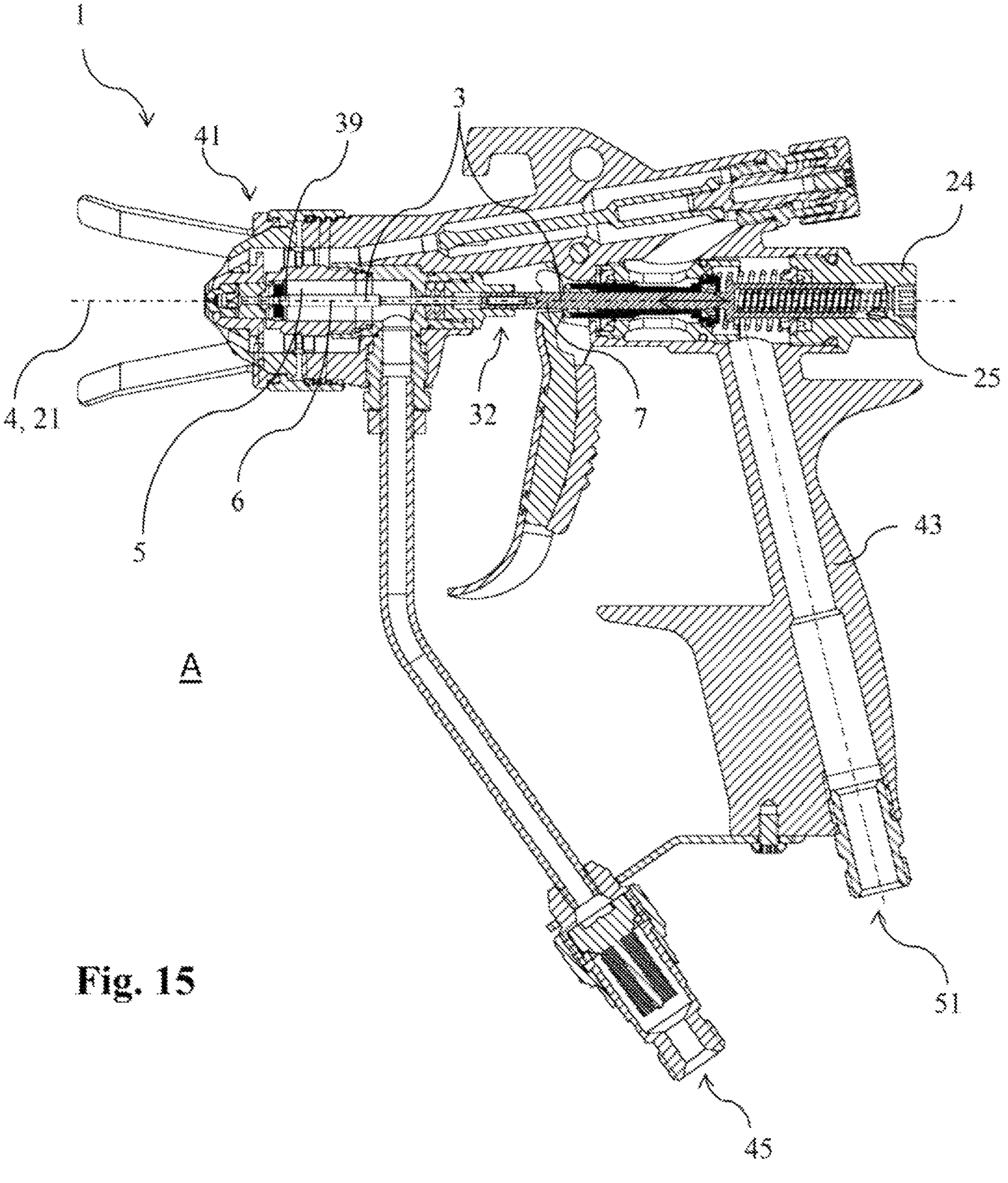
FIG. 15 shows a third paint spray gun according to the invention in a perspective view in an operating state A.
Figure 16:
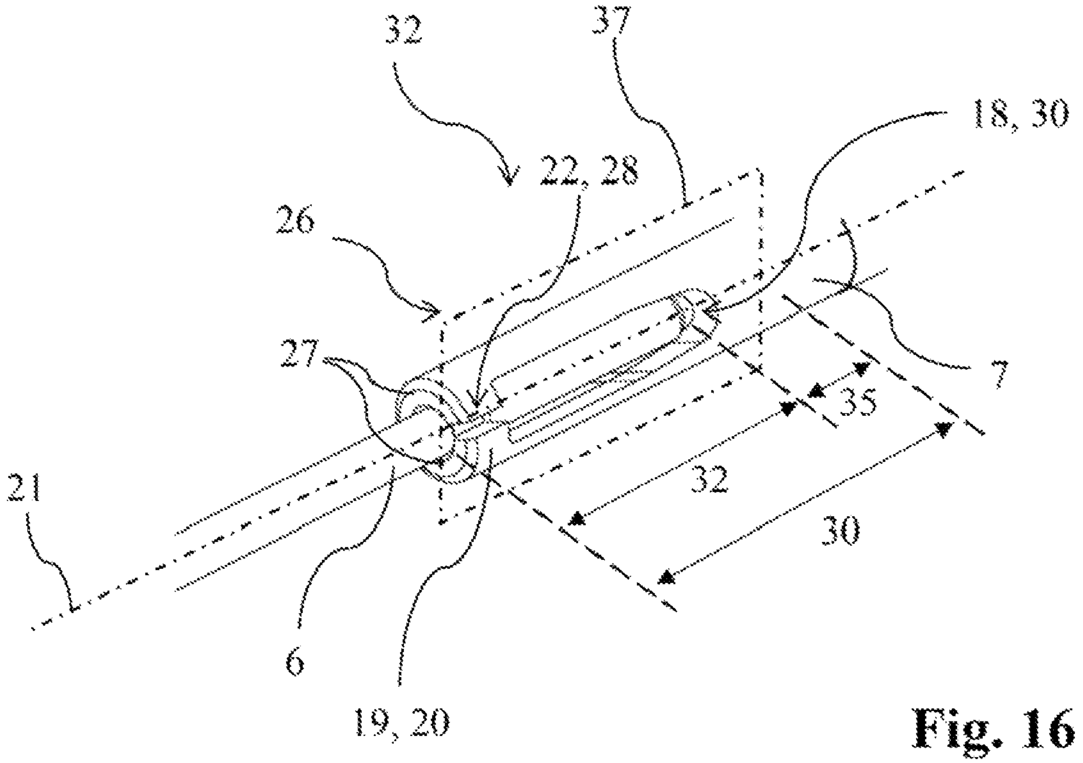
FIG. 16 shows a detail view of a connection region between a front needle and a rear needle connected to the front needle for the paint spray gun from FIG. 15.
Figure 17:
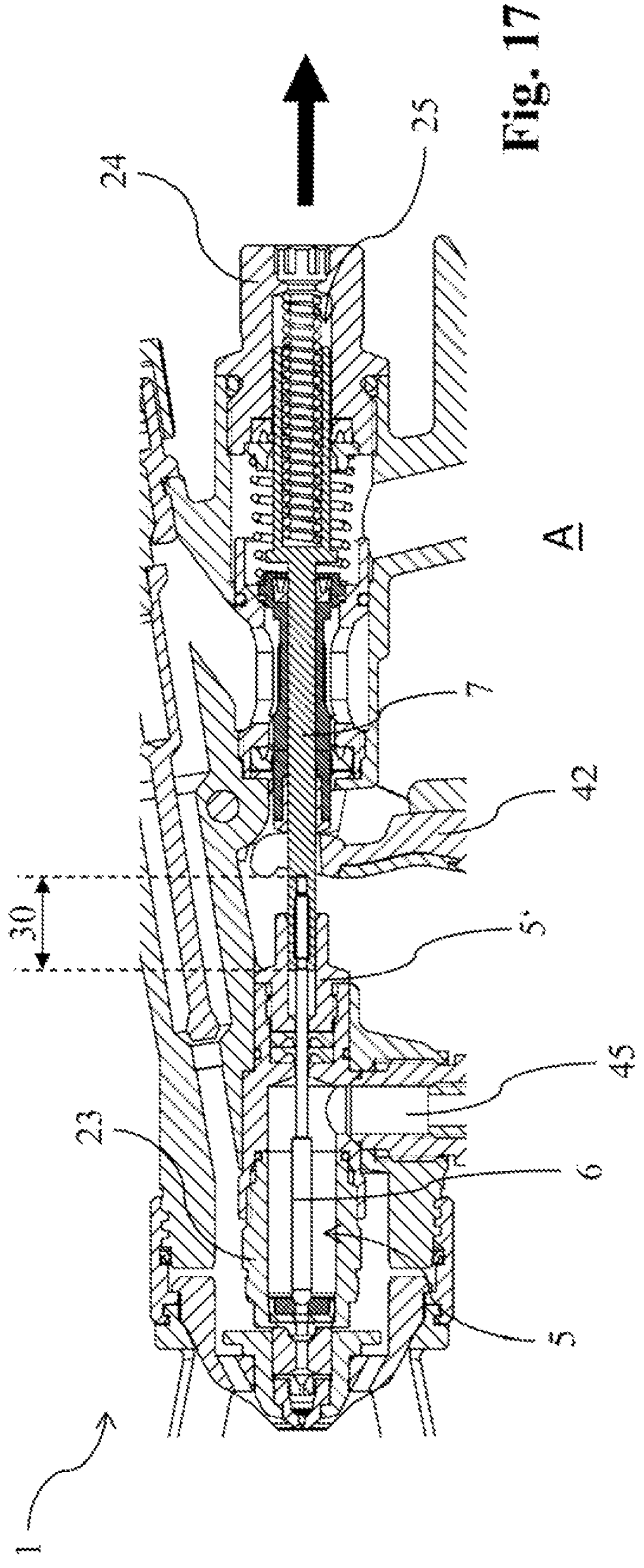
FIG. 17 shows a longitudinal section through the paint spray gun according to FIG. 15.
Figure 18:
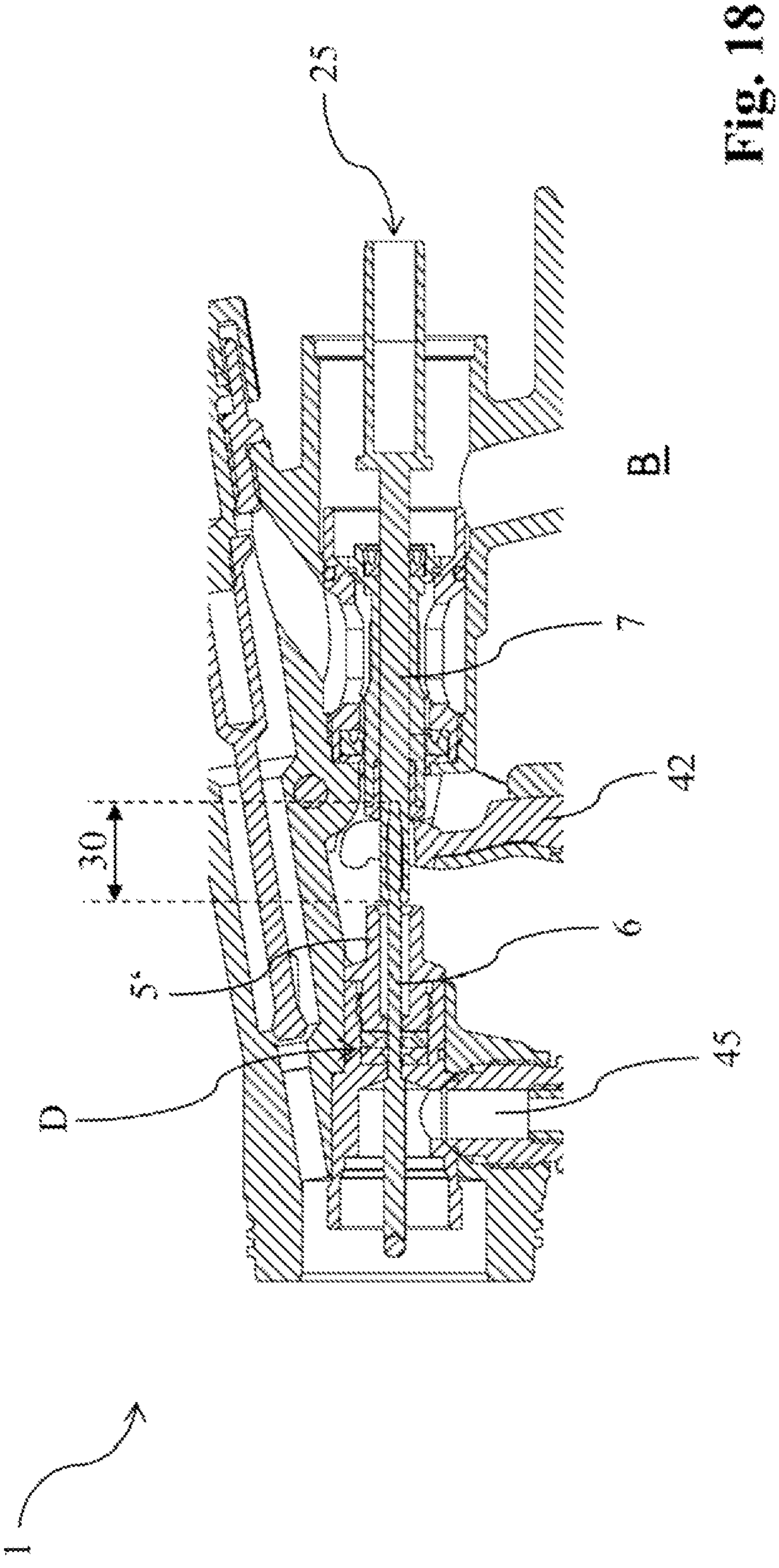
FIG. 18 shows the longitudinal section according to FIG. 17 in a maintenance state B in which an air cap, a material nozzle component, and a rear cover are removed.
Figure 19:
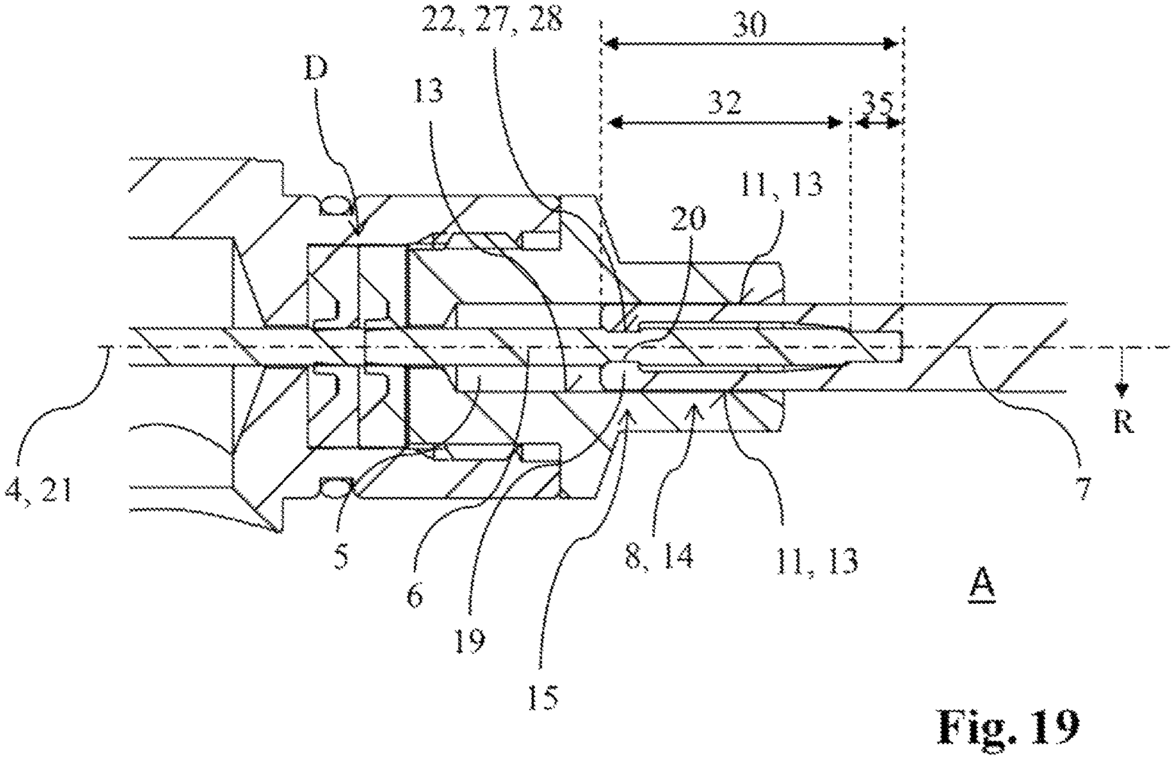
FIG. 19 shows a detail of the longitudinal section from FIG. 18 with a material needle in which a connection region is still within the channel.

FIGS. 13 and 14 show a variant of the second embodiment of FIGS. 8 to 12, which differs from the second embodiment in that the connection space 30 of the front needle 6 is designed analogously to the first embodiment on its longitudinal sides 37 with longitudinal openings 18, and is therefore open.

FIGS. 15 to 20 show a third embodiment of a paint spray gun 1 according to the invention having a material needle 3 according to the invention which is designed as a single-axis high-pressure spray gun analogously to the paint spray gun 1 of the first embodiment. In this regard, reference is made to the statements on the first embodiment. However, said embodiment can also be used in low-pressure paint spray guns.

The third embodiment differs substantially from the first embodiment in terms of the arrangement and the design of the connection region 32. In the third embodiment, the front needle 6 is also connected to the rear needle 7 via an axial form-fit which is formed by quick-acting connection means of the front needle 6 or the rear needle 7. The releasable connection 8 formed by the quick-acting connection means is a latching connection 15.

The front needle 6 is designed at the end as a needle shaft having a front needle groove 28 introduced therein which represents a latching recess 22 for the quick-acting connection means of the front needle 6. The rear needle 7 is designed with a fork 26 having a fork end 27, wherein the quick-acting connection means of the rear needle 6 are arranged at the fork end 27. The quick-acting connection means of the rear needle 6 are designed as radially inwardly projecting latching means projections 20 which engage in the circumferential front needle groove 28 of the front needle 6 at the axial rear end of the front needle 6.

The fork 26 has approximately the shape of a sleeve that is slotted at the end. This allows a radial deflection of the individual "fork prongs" of the fork 26 and thus a breaking of the connection 8 between the front needle 6 and the rear needle 7.

The connection 8 is also secured against being broken here by means of a sliding bearing 14, wherein the sliding bearing 14 here is, however, formed by a wall 13 of a non-material-carrying, circular cylindrical guide bushing 5' (which corresponds to the channel 5 from the previous embodiments) of the paint spray gun 1. In the guide bushing 5', the rear needle 7 is guided radially almost completely over the circumferential surface of the front rear needle end, i.e., the outer surface of the fork 26 of the rear needle 7.

Via the sliding bearing 14, the axial form-fit is also secured here against being broken as long as the connection region 32 is located within the guide bush 5' between the front and the rear needles 6 or 7.

By moving the connection region 32 of the material needle 3 out of the guide bushing 5', the securing can be released axially to the rear until the connection region 32 is located outside the guide bush 5'. This state characterizes maintenance state B. Depending on the design of the paint spray gun 1—as indicated here in FIGS. 17 and 18—it may be necessary to remove a rear cover 24 of the paint spray gun 1 in order to release the rear needle end of the rear needle 7 and to be able to move the material needle 3 axially toward the rear. Only in this state is the securing of the axial form-fit, i.e., the sliding bearing 14, released, and the front needle 6 can be removed from the rear needle 7 axially forward by applying an axial pulling force and can be exchanged with a cleaned or new front needle 6, **6*a*. It is also necessary in the third embodiment to remove an air cap 41 and a material nozzle component 23 forming the channel 5 before the front needle 6** is removed.

Figure 20:
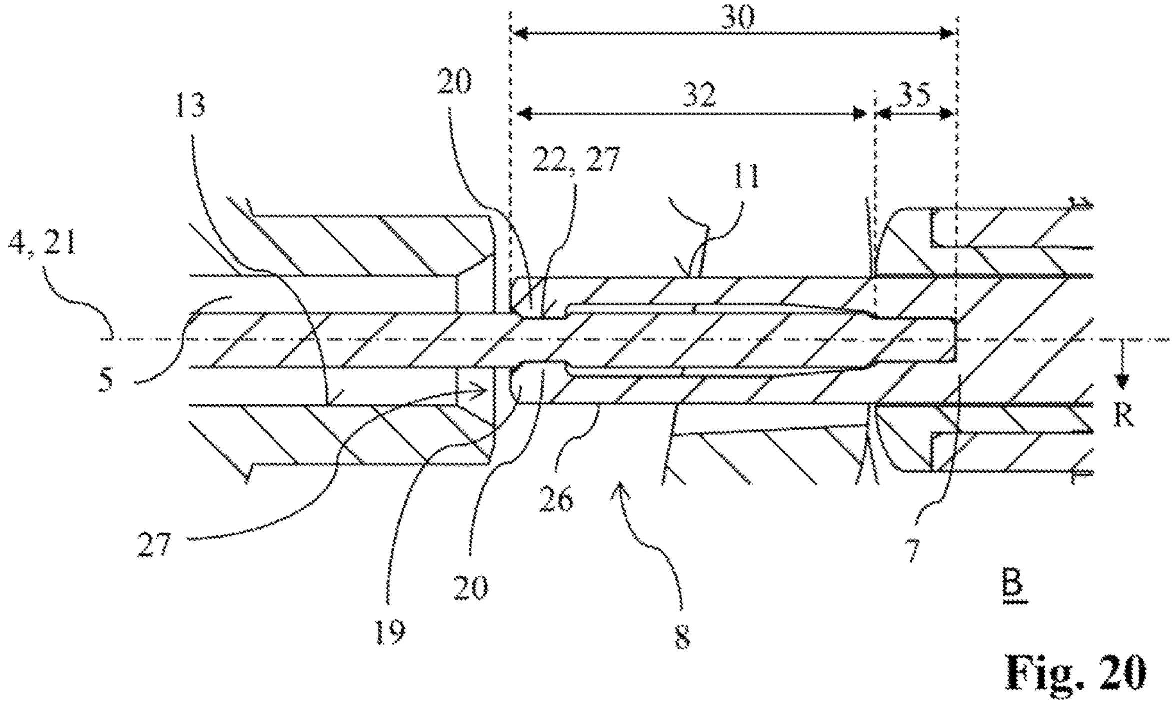
FIG. 20 shows a detail of the longitudinal section from FIG. 18 with a material needle in a maintenance state in which the connection region is located outside the channel.

As can be seen in particular in FIG. 20, the material needle 3 of the third embodiment also has a guide region 35 analogous to the preceding embodiments, which is arranged in this case, however, in the rear needle 7. The guide region 35 of the rear needle 7 is designed as a bore and receives a pin-like end of the front needle 6. In conjunction with the connection 8 of the quick-acting connection means, this ensures sufficient coaxiality between the front needle 6 and the rear needle 7.

By means of the invention shown here, it is possible to produce a front needle 6 with a rear needle 7 for use in a paint spray gun 1 that can be produced inexpensively and simply, which ensures excellent positional accuracy between a guide channel 5 and the front needle 6, as well as a front needle 6 relative to a rear needle 7.

By means of the figures and the above embodiments, preferred exemplary embodiments of the invention are described only by way of example. Other designs, materials or types of connection are conceivable and are apparent to a person skilled in the art from reading the embodiments and the prior art. All individual features of the exemplary embodiments can be combined with one another, even if this is not explicitly mentioned. This also applies to the exemplary embodiments per se. A person skilled in the art will clearly recognize if a combination is not possible or not useful. All embodiments can be applied to different types of paint spray guns, even if this is not explicitly described.

The described invention can be applied to all types of paint spray guns, even if these do not fall into the above categorization. In particular, the single-axis paint spray guns shown in the drawings 1 to 7 and 15 to 20 can also be equipped with a material valve corresponding to FIGS. 9 to 11 and 13 and 14, preferably as a low-pressure paint spray gun. Furthermore, the connection between the front needle and the rear needle of FIGS. 1 to 7 and 9 to 14 can be combined with a connection corresponding to FIGS. 15 to 20. The connection of FIGS. 15 to 20 can also be used in a paint spray gun according to FIGS. 1 to 19.

The invention claimed is:

1. A paint spray gun having a material nozzle for dispensing a coating material along a material dispensing direction and having a material needle for controlling the quantity of dispensed coating material via the material nozzle, wherein the material needle is axially movably mounted in a channel that extends in an axial direction, wherein the material needle comprises a front needle and a rear needle, wherein the front needle and the rear needle are releasably connectable together via a releasable connection in the form of a quick-acting connection, and the front needle is removable in the material dispensing direction in a maintenance state of the paint spray gun, wherein, the material needle in a region of the front needle, which is in an operating state of the paint spray gun arranged in a material-carrying region of the surrounding channel, and/or in the region of the connection between the front needle and the rear needle, has at least one contact surface, which in the operating state of the paint spray gun rests against a wall of the surrounding channel, wherein the contact surface and the channel form a sliding bearing.

2. The paint spray gun according to claim 1, wherein the connection is a releasable connection exclusively in the axial direction.

3. The paint spray gun according to claim 1, wherein the connection is designed as a latching and/or snap connection.

4. The paint spray gun according to claim 1, wherein the connection is a form-fitting and/or frictional connection.

5. The paint spray gun according to claim 1, wherein the sliding bearing, in the operating state of the paint spray gun, secures the connection against opening in a form-fitting manner.

6. The paint spray gun according to claim 1, wherein in the operating state of the paint spray gun, the contact surface or the contact surfaces rest(s) against the wall of the channel in at least two diametrically opposite contact positions or in at least three spaced apart contact positions, and thereby effects a centering of the material needle within the channel.

7. The paint spray gun according to claim 1, wherein a front needle stabilization device is provided which, in the operating state of the paint spray gun, rests against a wall of the channel and is spaced apart from the sliding bearing in the axial direction, wherein the contact surface and the wall form a first tilting bearing and the front needle stabilization device and the wall form a second tilting bearing, wherein the first tilting bearing is axially spaced apart from the second tilting bearing and the two tilting bearings ensure a coaxial alignment of the longitudinal axis of the front needle with the longitudinal axis of the channel so as to prevent tilting.

8. The paint spray gun according to claim 1, wherein the connection is designed such that, in a maintenance state of the paint spray gun, it can be released by moving the front needle relative to the rear needle in the material dispensing direction or by moving the rear needle relative to the front needle counter to the material dispensing direction without removing the rear needle from the paint spray gun.

9. The paint spray gun according to claim 1, wherein the front needle and/or the rear needle is designed such that at least one region of the front needle and/or rear needle rests against a wall of the channel in the operating state of the paint spray gun and secures the connection against opening.

10. The paint spray gun according to claim 1, wherein the front needle and/or rear needle in the region of the connection has a recess in the form of an axially extending longitudinal opening, or has a radial reduction of the material thickness of the front needle and/or rear needle in the region of the connection, wherein by the recess or by the radial reduction of the material thickness, a closing and opening of the quick-acting connection is facilitated, wherein the recess increases the elasticity of latching elements in the radial direction.

11. The paint spray gun according to claim 1, wherein the front needle or the rear needle has a latching element in the form of a latching means projection which, in relation to a central axis of the material needle extends radially from the outside to the inside and engages in a latching element in the form of a latching recess at the rear needle or the front needle.

12. The paint spray gun according to claim 1, wherein the material nozzle comprises a material nozzle component which can be removed from a main body of the paint spray gun and which, in the operating state of the paint spray gun, is mounted on the paint spray gun and is removed in maintenance state, and/or wherein a rear cover removable from a main body of the paint spray gun is provided at a rear end of the rear needle which is mounted in the operating state of the paint spray gun and removed in the maintenance state.

13. The paint spray gun according to claim 1, wherein the connection is arranged in the operating state of the paint spray gun axially outside of a material-carrying region of the channel of the paint spray gun.

14. The paint spray gun according to claim 1, wherein the channel is a material-conducting channel of the paint spray gun via which the coating material is guided to the material nozzle, wherein the entire front needle is located in the material-carrying region of the channel.

15. The paint spray gun according to claim 1, wherein a front end of the rear needle is designed as a fork, wherein the fork having latching elements with a latching means projection, wherein the latching means projection extends radially from the outside to the inside and engages in a corresponding latching recess of the front needle designed as a groove.

16. The paint spray gun according to claim 1, wherein a first part of the material needle is made of a metallic material, and a second part of the material needle, at least sectionally, is made of a non-metallic material.

17. The paint spray gun according to claim 1, wherein the channel is hollow cylindrical and closed in the circumferential direction.

18. A material needle for a paint spray gun, wherein the material needle extends along an axial direction and has at least one front needle and one rear needle which can be releasably connected together via a releasable connection in the form of a quick-acting connection, the front needle and the rear needle being releasable from one another in the axial direction, wherein the material needle in a region of the front needle which is designed for installation in a material-carrying region of a channel of the paint spray gun, and/or in the region of the releasable connection between the front needle and the rear needle has at least one contact surface which is designed to contact a wall of the surrounding channel of the paint spray gun while forming a sliding bearing, wherein the sliding bearing prevents the front needle and the rear needle from being released from each other in an operating state.

19. The material needle according to claim 18, wherein the front needle has a cylindrical main body, and the at least one contact surface is formed on a contact surface projection projecting in the radial direction from the main body.

20. The material needle according to claim 18, wherein the front needle and/or the rear needle has a latching means projection which extends radially from the outside to the inside into an open connection space within the front needle and/or the rear needle, wherein the connection space is designed to receive a part of the front needle or the rear needle, and/or wherein the front needle and/or the rear needle has a concave notch running along the circumference and is designed to form a form-fitting connection with a latching means projection of the front needle or the rear needle.

21. The material needle according to claim 18, wherein the front needle and the rear needle overlap in a connection region, wherein the front needle surrounds a portion of the rear needle, or the rear needle surrounds a portion of the front needle.

22. The material needle according to claim 18, wherein the connection region extends over a distance along the material needle which is greater than twice the diameter of the front needle.

23. An exchangeable front needle of a multipart material needle for a paint spray gun, wherein the front needle extends in an axial direction and has quick-acting connection means and which is designed to form a releasable connection with a second part of the material needle which is releasable in the axial direction, wherein the front needle has a substantially cylindrical main body and at least one contact surface projection projecting in the radial direction from the main body with a radially outer contact surface, wherein the contact surface is designed such that, in an operating state of a paint spray gun, it comes into contact with a wall of the paint spray gun surrounding a channel in order to form a sliding bearing, wherein the sliding bearing prevents the front needle and the second part of the material needle from being released from each other in the operating state.

24. The exchangeable front needle according to claim 23, wherein the contact surface is designed such that, in an operating state of a paint spray gun into which the multipart material needle is inserted, it comes into contact with a wall of the paint spray gun surrounding a channel in order to form, in interaction with the wall, a sliding bearing in the axial direction, wherein the sliding bearing secures in a form-fitting manner the connection against opening in the operating state.

25. The exchangeable front needle according to claim 23, wherein the region of the contact surface projection is designed to be flowed through or around by coating material which is guided in the axial direction, wherein through-flow gaps are provided in the region of the contact surface projection that enable flow through or around the contact surface projection.

26. The exchangeable front needle according to claim 23, wherein the front needle has at least one open connection space for receiving a part of the rear needle, wherein the connection space extends from a connecting end of the front needle facing the rear needle, along the axial direction, into the interior of the front needle.

27. The exchangeable front needle according to claim 23, wherein the quick-acting connection means comprises at least one latching means projection which extends radially relative to the axial direction from the outside into the interior of a connection space.

28. The exchangeable front needle according to claim 23, wherein the latching elements have one or more latching means projections which are preferably-formed by a convex bulge which extends into the interior of a connection space in the interior of the front needle.

29. The exchangeable front needle according to claim 23, wherein the front needle has a guide region for guiding a part of the rear needle, wherein the guide region is formed by a part of a connection space for receiving a part of the rear needle, and the connection space in the guide region is closed at least over a predetermined length of the front needle.

30. The exchangeable front needle according to claim 23, wherein the front needle has a guide region for guiding a portion of the rear needle which extends from the connecting end into the interior of the front needle, and/or wherein the quick-acting connection means are spaced apart from the connecting end.

31. The exchangeable front needle according to claim 23, wherein the quick-acting connection means enters into a form-fitting and/or frictional connection with the second part of the material needle.

32. The exchangeable front needle according to claim 23, wherein the front needle is made, at least sectionally, as an injection molded part, and/or wherein the front needle is made of a plastic, at least sectionally, and/or wherein the front needle is made of a material different from the second part of the material needle.

33. The exchangeable front needle according to claim 23, wherein the connection space has a recess in a connection space longitudinal side and extends along the front needle at least over a certain length in the axial direction.

34. The exchangeable front needle according to claim 23, wherein the contact surface is located on outer surfaces of the contact surface projections which extend substantially in the radial direction from the main body of the front needle.

35. The exchangeable front needle according to claim 23, wherein a front needle stabilization device is provided which provides a second sliding bearing in the axial direction between the front needle stabilization device and a further region of the wall, the second sliding bearing point being spaced apart from the first sliding bearing point in the axial direction.

36. The exchangeable front needle according to claim 23, wherein the contact surface projections are designed in order to generate, by the contacting of the contact surfaces with a wall of a channel of the paint spray gun, a securing force acting on the connection which prevents the opening of the connection in the operating state.

37. The exchangeable front needle according to claim 23, wherein the quick-acting connection means comprise at least one pair of latching elements which are opposite one another in the radial direction, wherein the or each convex bulge project into an open connection space formed in the front needle.

38. The exchangeable front needle according to claim 23, wherein the quick-acting connection means have at least two latching means projections which are spaced apart from one another in the axial direction.

39. The exchangeable front needle according to claim 23, wherein the front needle has a needle tip which is formed by a material that is different from the rest of the material of the front needle.

40. The exchangeable front needle according to claim 23, wherein the front needle has a needle tip which is made of a non-metallic, inorganic material and/or is manufactured integrally with the remaining front needle.

41. The exchangeable front needle according to claim 23, wherein the front needle has a needle tip which is formed by a ball, or tapers in a needle-like manner toward a front needle sealing end, and/or which is manufactured integrally with the front needle, and/or which is manufactured by an injection molding process.

42. A method for exchanging the front needle according to claim 23 as part of a material needle in a paint spray gun, wherein the paint spray gun is initially in an operating state in which the front needle is connected to a rear needle via a connection, wherein at least the front needle is arranged in a channel that extends along an axial direction, and has a contact surface which rests against a wall of the channel in the operating state, wherein removal of the front needle comprises at least the following steps:

removing a material nozzle component, thereby releasing the contact of the contact surface of the front needle with the wall, gripping and removing the front needle in the axial direction and along a material dispensing direction from the channel, wherein the connection is released and the rear needle remains in the paint spray gun, inserting the same or another front needle, wherein the front needle is connected to the rear needle via a connection, and the contact surface of the front needle comes into contact with the wall of the channel, attaching the material nozzle component, whereby the front needle is centered in the material nozzle component by contacting the contact surface with the wall of the channel.

43. A method for exchanging the front needle according to claim 23 as part of a material needle in a paint spray gun, wherein the paint spray gun is initially in an operating state in which the front needle is connected to a rear needle via a connection, wherein at least one region of the front needle and/or the rear needle is in a channel that extends along an axial direction, and the connection is secured against opening by a securing force acting at least substantially perpendicularly to the axial direction, the removal of the front needle comprising at least the following steps:

removing a material nozzle component, removing a rear cover at the free end of the rear needle, retracting the material needle counter to a material dispensing direction in which a coating material is discharged from the paint spray gun, further retracting the front needle, whereby the connection is released and the front needle is removed from the paint spray gun, inserting the same or another front needle into the paint spray gun counter to the material dispensing direction, whereby a connection is established between the front needle and the rear needle, displacing the rear needle together with the front needle in the material dispensing direction, whereby the connection is secured against opening by contacting the contact surface with a wall of the channel, attaching the rear cover and the material nozzle component.

* * * * *